(12) United States Patent
Behrens et al.

(10) Patent No.: US 7,702,362 B2
(45) Date of Patent: *Apr. 20, 2010

(54) DIGITAL ARCHITECTURE FOR RADIO-FREQUENCY APPARATUS AND ASSOCIATED METHODS

(75) Inventors: Richard T. Behrens, Lafayette, CO (US); Tod Paulus, Austin, TX (US); Mark S. Spurbeck, Superior, CO (US); Vishnu S. Srinivasan, Austin, TX (US); Donald A. Kerth, Austin, TX (US); Jeffrey W. Scott, Austin, TX (US); G. Tyson Tuttle, Austin, TX (US); G. Diwakar Vishakhadatta, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 532 days.

This patent is subject to a terminal disclaimer.

(21) Appl. No.: 11/287,995

(22) Filed: Nov. 28, 2005

(65) Prior Publication Data

US 2006/0141973 A1 Jun. 29, 2006

Related U.S. Application Data

(63) Continuation of application No. 10/075,122, filed on Feb. 12, 2002, now Pat. No. 6,970,717, which is a continuation-in-part of application No. 09/821,342, filed on Mar. 29, 2001, now Pat. No. 6,804,497.

(60) Provisional application No. 60/261,506, filed on Jan. 12, 2001, provisional application No. 60/273,119, filed on Mar. 2, 2001, provisional application No. 60/333,520, filed on Nov. 27, 2001.

(51) Int. Cl.
*H04B 1/38* (2006.01)
*H04M 1/00* (2006.01)

(52) U.S. Cl. .................. 455/553.1; 455/76; 455/88; 455/313

(58) Field of Classification Search .............. 455/553.1, 455/76, 88, 73, 313, 74, 552.1, 77, 86, 114.2, 455/303, 147, 306, 307, 311, 550.1, 127.4, 455/165.1; 375/219, 316, 346; 370/350
See application file for complete search history.

(56) References Cited

U.S. PATENT DOCUMENTS 5,859,878 A * 1/1999 Phillips et al. ............... 455/74
6,091,765 A * 7/2000 Pietzold et al. ............. 455/418

\* cited by examiner

*Primary Examiner*—John Lee
(74) *Attorney, Agent, or Firm*—Law Offices of Maximilian R. Peterson

(57) ABSTRACT

A radio-frequency (RF) receiver includes a receiver analog circuitry and a receiver digital circuitry. The receiver analog circuitry resides within a first integrated circuit and the receiver digital circuitry resides within a second integrated circuit. The second integrated circuit couples to the first integrated circuit via a one-bit digital interface. The receiver analog circuitry receives an RF signal and processes the received RF signal to generate a digital signal. The receiver analog circuitry provides the digital signal to the receiver digital circuitry. The receiver digital circuitry includes a digital down-converter circuitry that mixes the digital signal with an intermediate frequency (IF) local oscillator (LO) signal to generate a digital down-converted signal. The receiver digital circuitry also includes a digital filter circuitry that filters the digital down-converted signal to generate a filtered digital signal.

20 Claims, 47 Drawing Sheets

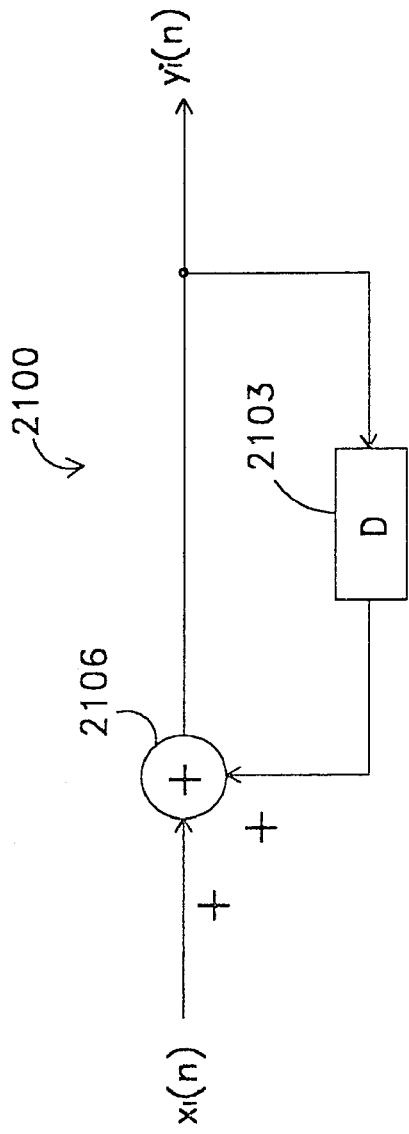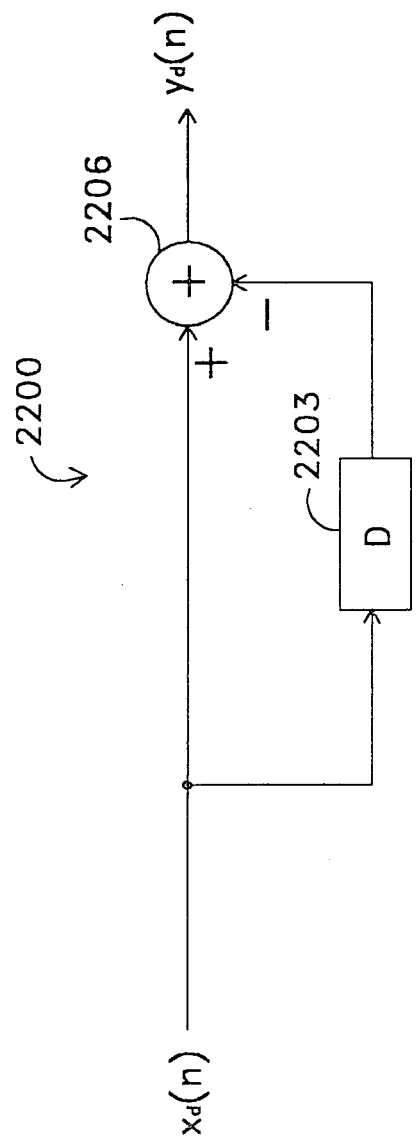

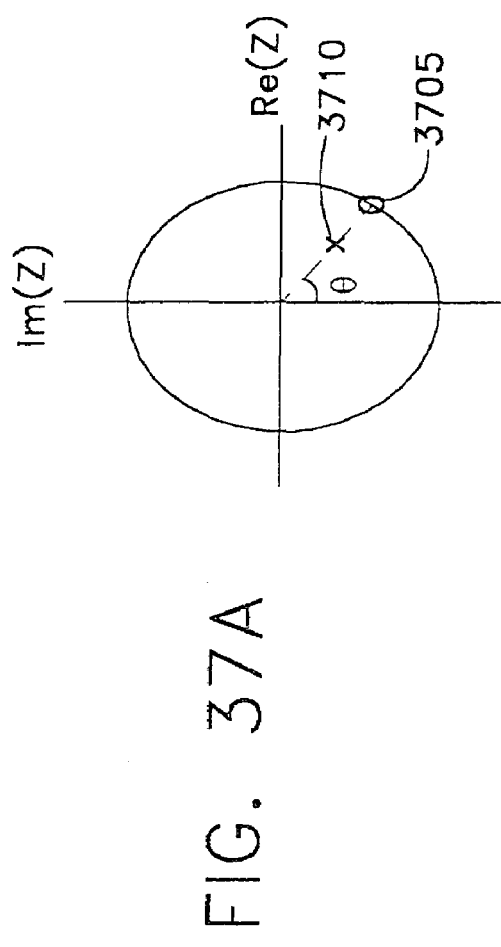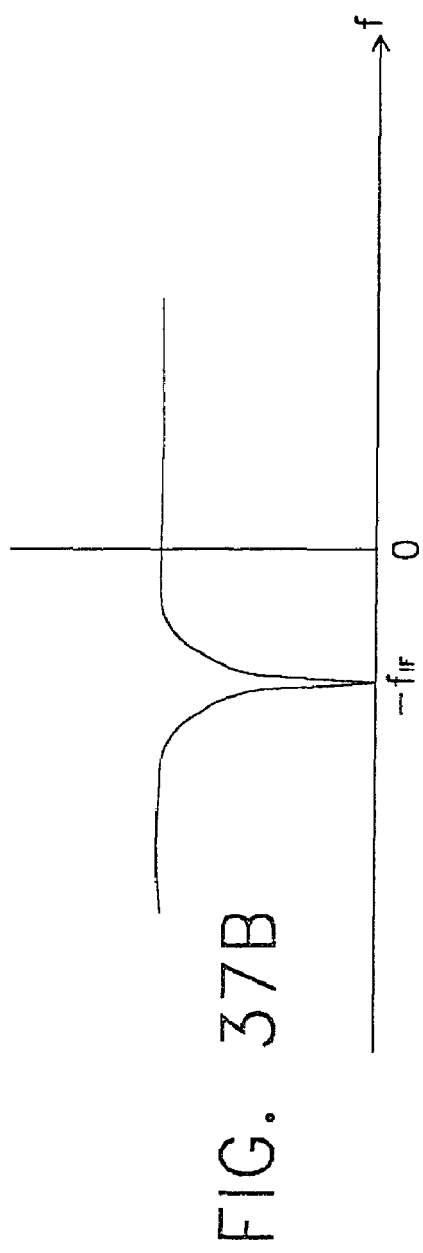
FIG. 37A
FIG. 37B

DIGITAL ARCHITECTURE FOR RADIO-FREQUENCY APPARATUS AND ASSOCIATED METHODS

CROSS-REFERENCE TO RELATED APPLICATIONS

This patent application is a continuation of, and incorporates by reference, U.S. patent application Ser. No. 10/075,122 filed Feb. 12, 2002 now U.S. Pat. No. 6,970,717, titled "Digital Architecture For Radio-Frequency Apparatus And Associated Methods," which is a continuation-in-part of U.S. patent application Ser. No. 09/821,342, titled "Partitioned Radio-Frequency Apparatus and Associated Methods," and filed on Mar. 29, 2001 now U.S. Pat. No. 6,804,497. This patent application claims priority to Provisional U.S. patent application Ser. No. 60/261,506, filed on Jan. 12, 2001; Provisional U.S. Patent Application Ser. No. 60/273,119, titled "Partitioned RF Apparatus with Digital Interface and Associated Methods," and filed on Mar. 2, 2001; and Provisional U.S. Patent Application Ser. No. 60/333,520, filed on Nov. 27, 2001.

Furthermore, this patent application incorporates by reference the following patent documents: U.S. patent application Ser. No. 10/075,099, titled "Notch Filter for DC Offset Reduction in Radio-Frequency Apparatus and Associated Methods"; and U.S. patent application Ser. No. 10/074,676, titled "DC Offset Reduction in Radio-Frequency Apparatus and Associated Methods."

TECHNICAL FIELD OF THE INVENTION

This invention relates to radio-frequency (RF) receivers and transceivers. More particularly, the invention concerns a (i) digital architecture for RF receiver or transceiver circuitry, and (ii) notch filter circuitry and architecture for offset reduction in the RF receiver or transceiver circuitry.

BACKGROUND

The proliferation and popularity of mobile radio and telephony applications has led to market demand for communication systems with low cost, low power, and small form-factor radio-frequency (RF) transceivers. As a result, recent research has focused on providing monolithic transceivers using low-cost complementary metal-oxide semiconductor (CMOS) technology. One aspect of research efforts has focused on providing an RF transceiver within a single integrated circuit (IC). The integration of transceiver circuits is not a trivial problem, as it must take into account the requirements of the transceiver's circuitry and the communication standards governing the transceiver's operation. From the perspective of the transceiver's circuitry, RF transceivers typically include sensitive components susceptible to noise and interference with one another and with external sources. Integrating the transceiver's circuitry into one integrated circuit may exacerbate interference among the various blocks of the transceiver's circuitry. Moreover, communication standards governing RF transceiver operation outline a set of requirements for noise, inter-modulation, blocking performance, output power, and spectral emission of the transceiver.

Unfortunately, no known technique for addressing all of the above issues in high-performance RF receivers or transceivers, for example, RF transceivers used in cellular and telephony applications, has been developed. A need therefore exists for techniques of partitioning and integrating RF receivers or transceivers that would provide low-cost, low form-factor RF transceivers for high-performance applications, for example, in cellular handsets.

A further aspect of RF receivers and transceivers relates to providing high-performance signal processing functions in an integrated form. Typical conventional receivers and transceivers rely on baseband processor circuitries to implement various signal processing functions, such as channelization filtering. Some baseband processor circuitries, however, do not contain their own channelization filtering. Furthermore, the system designer may choose to not implement channelization filtering in a baseband processor circuitry in order to, for example, reduce performance requirements for data converter circuitries present in the receiver or transceiver. The migration of the signal processing functions to the baseband processor circuitry may also result in its increased complexity. Moreover, front-end analog circuitry contributes DC offsets that impact the processing of the desired signal. A further need therefore exists for RF apparatus that provide high performance signal processing functions to implement functions ranging from reduction or cancellation of DC offsets to signal processing within the RF apparatus signal path, such as channelization filtering.

SUMMARY OF THE INVENTION

This invention relates to architectures, circuit arrangements for RF apparatus, such as receiver circuitry and transceiver circuitry, and methods relating to the RF apparatus. One aspect of the invention concerns apparatus for receiving RF signals.

In one embodiment, a receiver digital circuitry according to the invention includes a digital down-converter circuitry and a digital filter circuitry. The digital down-converter circuitry mixes a digital input signal provided by a receiver analog circuitry with an intermediate frequency (IF) local oscillator signal to generate a digital down-converted signal. The digital filter circuitry filters the digital down-converted signal to generate a filtered digital signal. The receiver analog circuitry resides within a first integrated circuit and the receiver digital circuitry resides within a second integrated circuit. The second integrated circuit couples to the first integrated circuit via a one-bit digital interface.

DESCRIPTION OF THE DRAWINGS

The appended drawings illustrate only exemplary embodiments of the invention and therefore do not limit its scope. The disclosed inventive concepts lend themselves to other equally effective embodiments. In the drawings, the same numerals used in more than one drawing denote the same, similar, or equivalent functionality, components, or blocks.

FIG. 21 depicts a conceptual or functional block diagram of a digital integrator circuitry for use in exemplary embodiments of digital filter circuitry according to the invention.

FIG. 22 illustrates a conceptual or functional block diagram of a digital differentiator circuitry for use in exemplary embodiments of digital filter circuitry according to the invention.

FIG. 37A depicts a pole-zero diagram of a single-sided notch-filter circuitry for use in exemplary embodiments of the invention.

FIG. 37B illustrates a frequency-domain response spectrum for a single-sided notch-filter circuitry for use in exemplary embodiments of the invention.

DETAILED DESCRIPTION OF THE INVENTION

This invention in part contemplates partitioning RF apparatus so as to provide highly integrated, high-performance, low-cost, and low form-factor RF solutions. One may use RF apparatus according to the invention in high-performance communication systems. More particularly, the invention in part relates to partitioning RF receiver or transceiver circuitry in a way that minimizes, reduces, or overcomes interference effects among the various blocks of the RF receiver or transceiver, while simultaneously satisfying the requirements of the standards that govern RF receiver or transceiver performance. Those standards include the Global System for Mobile (GSM) communication, Personal Communication Services (PCS), Digital Cellular System (DCS), Enhanced Data for GSM Evolution (EDGE), and General Packet Radio Services (GPRS). RF receiver or transceiver circuitry partitioned according to the invention therefore overcomes interference effects that would be present in highly integrated RF receivers or transceivers while meeting the requirements of the governing standards at low cost and with a low form-factor. The description of the invention refers to circuit partition and circuit block interchangeably.

Figure 1:
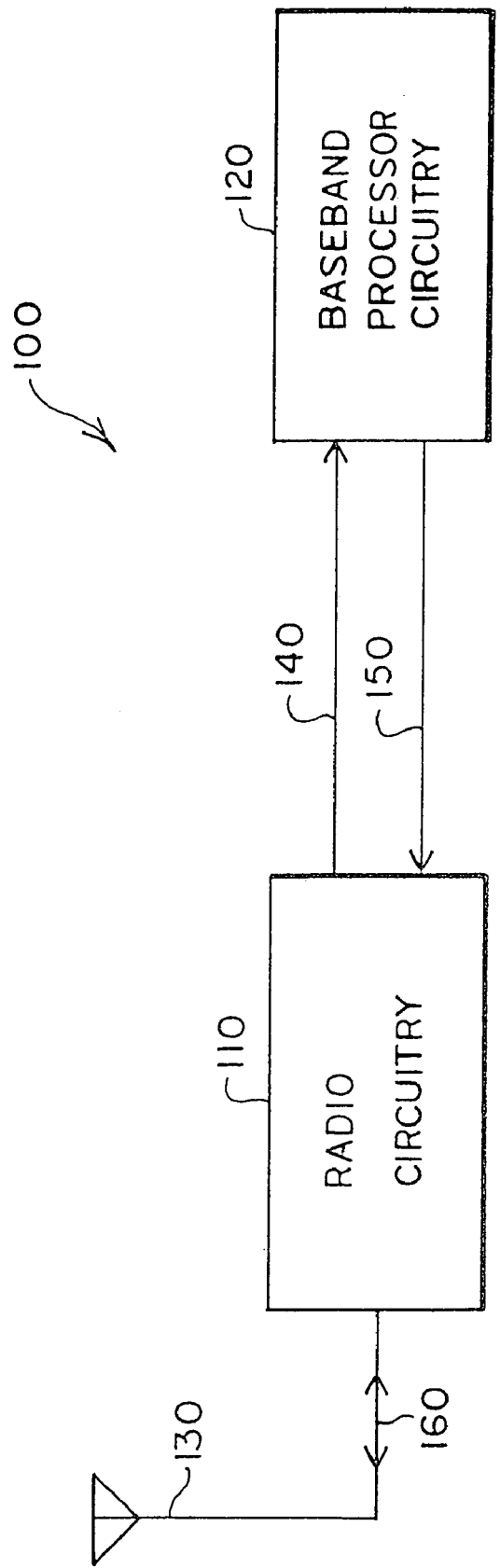
FIG. 1 illustrates the block diagram of an RF transceiver that includes radio circuitry that operates in conjunction with a baseband processor circuitry.

FIG. 1 shows the general block diagram of an RF transceiver circuitry 100 according to the invention. The RF transceiver circuitry 100 includes radio circuitry 1 0 that couples to an antenna 130 via a bi-directional signal path 160. The radio circuitry 110 provides an RF transmit signal to the antenna 130 via the bi-directional signal path 160 when the transceiver is in transmit mode. When in the receive mode, the radio circuitry 110 receives an RF signal from the antenna 130 via the bi-directional signal path 160.

The radio circuitry 110 also couples to a baseband processor circuitry 120. The baseband processor circuitry 120 may comprise a digital-signal processor (DSP). Alternatively, or in addition to the DSP, the baseband processor circuitry 120 may comprise other types of signal processor, as persons skilled in the art understand. The radio circuitry 110 processes the RF signals received from the antenna 130 and provides receive signals 140 to the baseband processor circuitry 120. In addition, the radio circuitry 110 accepts transmit input signals 150 from the baseband processor 120 and provides the RF transmit signals to the antenna 130.

Figure 2A:
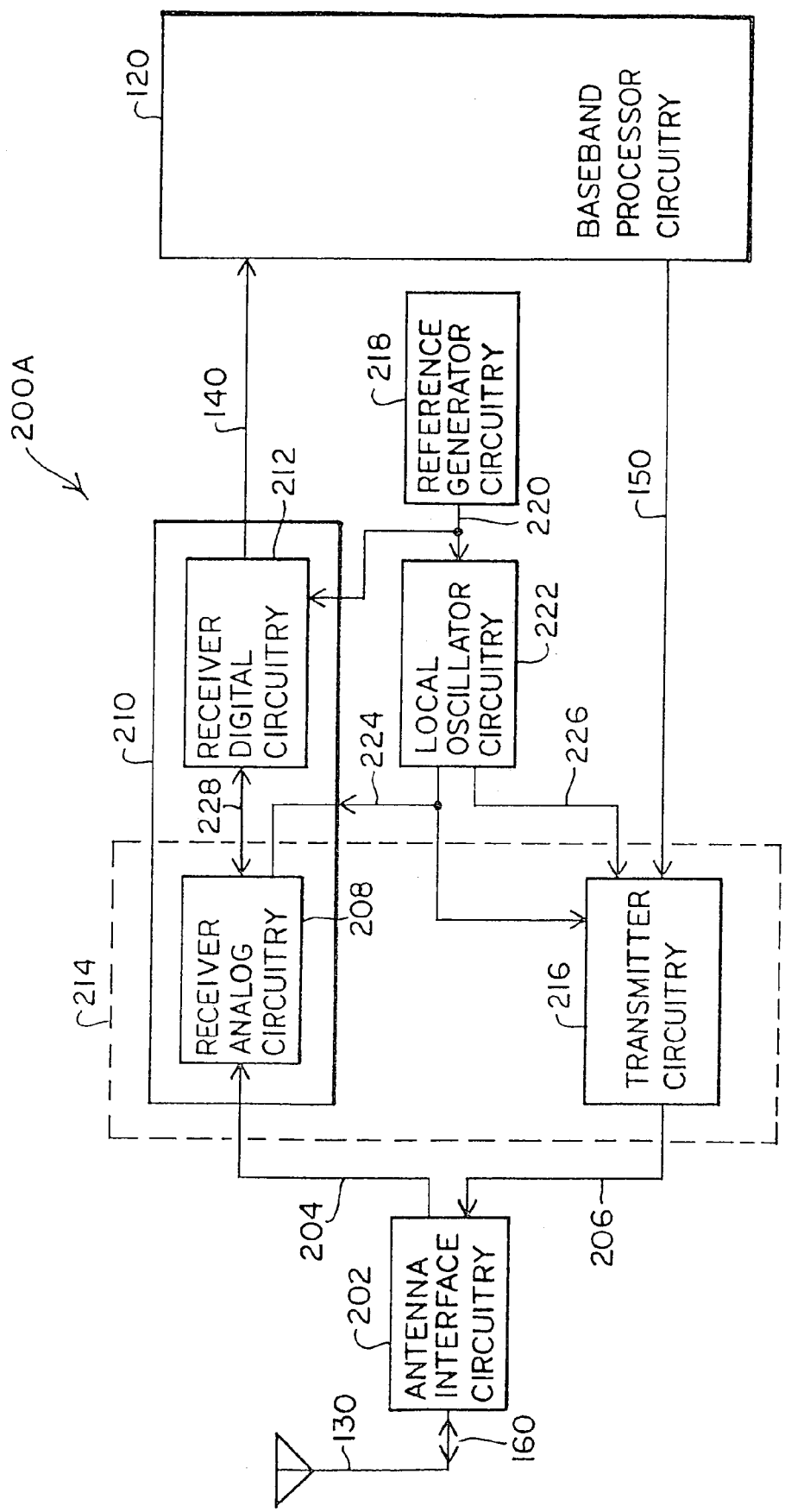
FIG. 2A shows RF transceiver circuitry partitioned according to the invention.

FIGS. 2A-2D show various embodiments of RF transceiver circuitry partitioned according to the invention. FIG. 3 and its accompanying description below make clear the considerations that lead to the partitioning of the RF transceiver circuitry as shown in FIGS. 2A-2D. FIG. 2A illustrates an embodiment 200A of an RF transceiver circuitry partitioned according to the invention. In addition to the elements described in connection with FIG. 1, the RF transceiver 200A includes antenna interface circuitry 202, receiver circuitry 210, transmitter circuitry 216, reference generator circuitry 218, and local oscillator circuitry 222.

The reference generator circuitry 218 produces a reference signal 220 and provides that signal to the local oscillator circuitry 222 and to receiver digital circuitry 212. The reference signal 220 preferably comprises a clock signal, although it may include other signals, as desired. The local oscillator circuitry 222 produces an RF local oscillator signal 224, which it provides to receiver analog circuitry 208 and to the transmitter circuitry 216. The local oscillator circuitry 222 also produces a transmitter intermediate-frequency (IF) local oscillator signal 226 and provides that signal to the transmitter circuitry 216. Note that, in RF transceivers according to the invention, the receiver analog circuitry 208 generally comprises mostly analog circuitry in addition to some digital or mixed-mode circuitry, for example, analog-to-digital converter (ADC) circuitry and circuitry to provide an interface between the receiver analog circuitry and the receiver digital circuitry, as described below.

The antenna interface circuitry 202 facilitates communication between the antenna 130 and the rest of the RF transceiver. Although not shown explicitly, the antenna interface circuitry 202 may include a transmit/receive mode switch, RF filters, and other transceiver front-end circuitry, as persons skilled in the art understand. In the receive mode, the antenna interface circuitry 202 provides RF receive signals 204 to the receiver analog circuitry 208. The receiver analog circuitry 208 uses the RF local oscillator signal 224 to process (e.g., down-convert) the RF receive signals 204 and produce a processed analog signal. The receiver analog circuitry 208 converts the processed analog signal to digital format and supplies the resulting digital receive signals 228 to the receiver digital circuitry 212. The receiver digital circuitry 212 further processes the digital receive signals 228 and provides the resulting receive signals 140 to the baseband processor circuitry 120.

In the transmit mode, the baseband processor circuitry 120 provides transmit input signals 150 to the transmitter circuitry 216. The transmitter circuitry 216 uses the RF local oscillator signal 224 and the transmitter IF local oscillator signal 226 to process the transmit input signals 150 and to provide the resulting transmit RF signal 206 to the antenna interface circuitry 202. The antenna interface circuitry 202 may process the transmit RF signal further, as desired, and provide the resulting signal to the antenna 130 for propagation into a transmission medium.

The embodiment 200A in FIG. 2A comprises a first circuit partition, or circuit block, 214 that includes the receiver analog circuitry 208 and the transmitter circuitry 216. The embodiment 200A also includes a second circuit partition, or circuit block, that includes the receiver digital circuitry 212. The embodiment 200A further includes a third circuit partition, or circuit block, that comprises the local oscillator circuitry 222. The first circuit partition 214, the second circuit partition 212, and the third circuit partition 222 are partitioned from one another so that interference effects among the circuit partitions tend to be reduced. The first, second, and third circuit partitions preferably each reside within an integrated circuit device. In other words, preferably the receiver analog circuitry 208 and the transmitter circuitry 216 reside within an integrated circuit device, the receiver digital circuitry 212 resides within another integrated circuit device, and the local oscillator circuitry 222 resides within a third integrated circuit device.

Figure 2B:
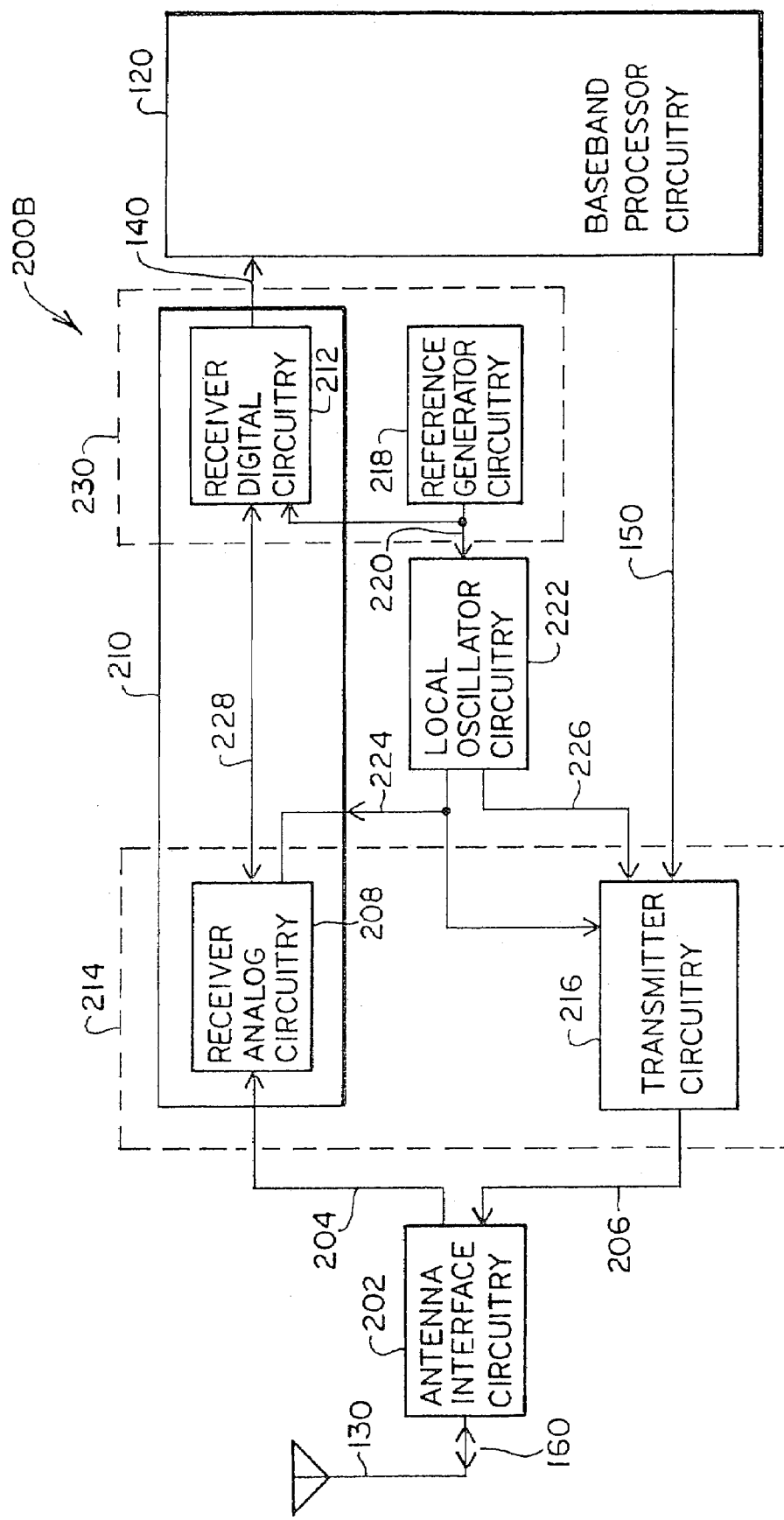
FIG. 2B depicts another embodiment of RF transceiver circuitry partitioned according to the invention, in which the reference generator circuitry resides within the same circuit partition, or circuit block, as does the receiver digital circuitry.
Figure 3:
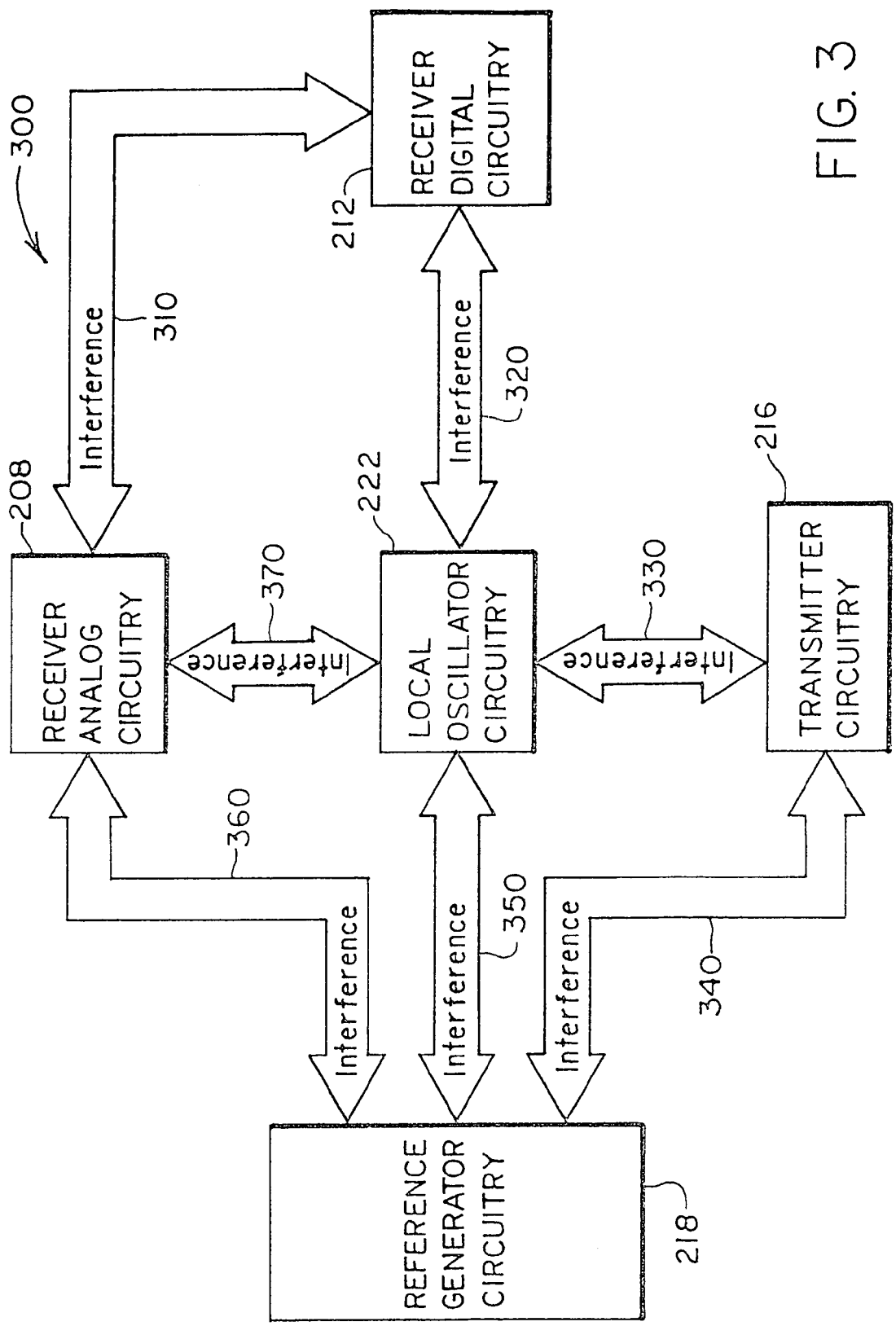
FIG. 3 illustrates interference mechanisms among the various blocks of an RF transceiver, which the embodiments of the invention in FIGS. 2A-2D, depicting RF transceivers partitioned according to the invention, seek to overcome, reduce, or minimize.

FIG. 2B shows an embodiment 200B of an RF transceiver circuitry partitioned according to the invention. The embodiment 200B has the same circuit topology as that of embodiment 200A in FIG. 2A. The partitioning of embodiment 200B, however, differs from the partitioning of embodiment 200A. Like embodiment 200A, embodiment 200B has three circuit partitions, or circuit blocks. The first and the third circuit partitions in embodiment 200B are similar to the first and third circuit partitions in embodiment 200A. The second circuit partition 230 in embodiment 200B, however, includes the reference signal generator 218 in addition to the receiver digital circuitry 212. As in embodiment 200A, embodiment 200B is partitioned so that interference effects among the three circuit partitions tend to be reduced.

Figure 2C:
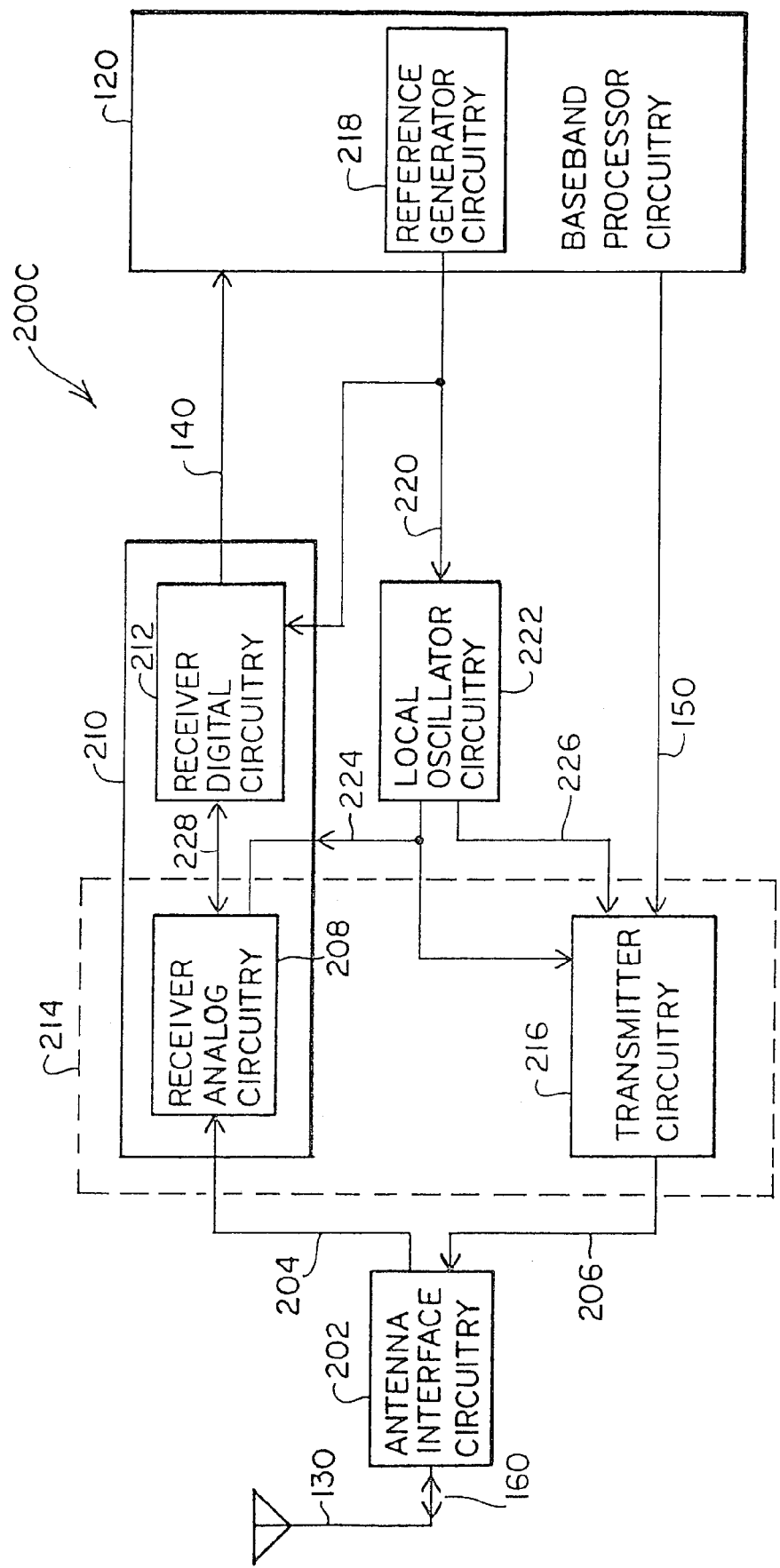
FIG. 2C illustrates yet another embodiment of RF transceiver circuitry partitioned according to invention, in which the reference generator circuitry resides within the baseband processor circuitry.

FIG. 2C illustrates an embodiment 200C, which constitutes a variation of embodiment 200A in FIG. 2A. Embodiment 200C shows that one may place the reference signal generator 218 within the baseband processor circuitry 120, as desired. Placing the reference signal generator 218 within the baseband processor circuitry 120 obviates the need for either discrete reference signal generator circuitry 218 or an additional integrated circuit or module that includes the reference signal generator 218. Embodiment 200C has the same partitioning as embodiment 200A, and operates in a similar manner.

Note that FIGS. 2A-2C show the receiver circuitry 210 as a block to facilitate the description of the embodiments shown in those figures. In other words, the block containing the receiver circuitry 210 in FIGS. 2A-2C constitutes a conceptual depiction of the receiver circuitry within the RF transceiver shown in FIGS. 2A-2C, not a circuit partition or circuit block.

Figure 2D:
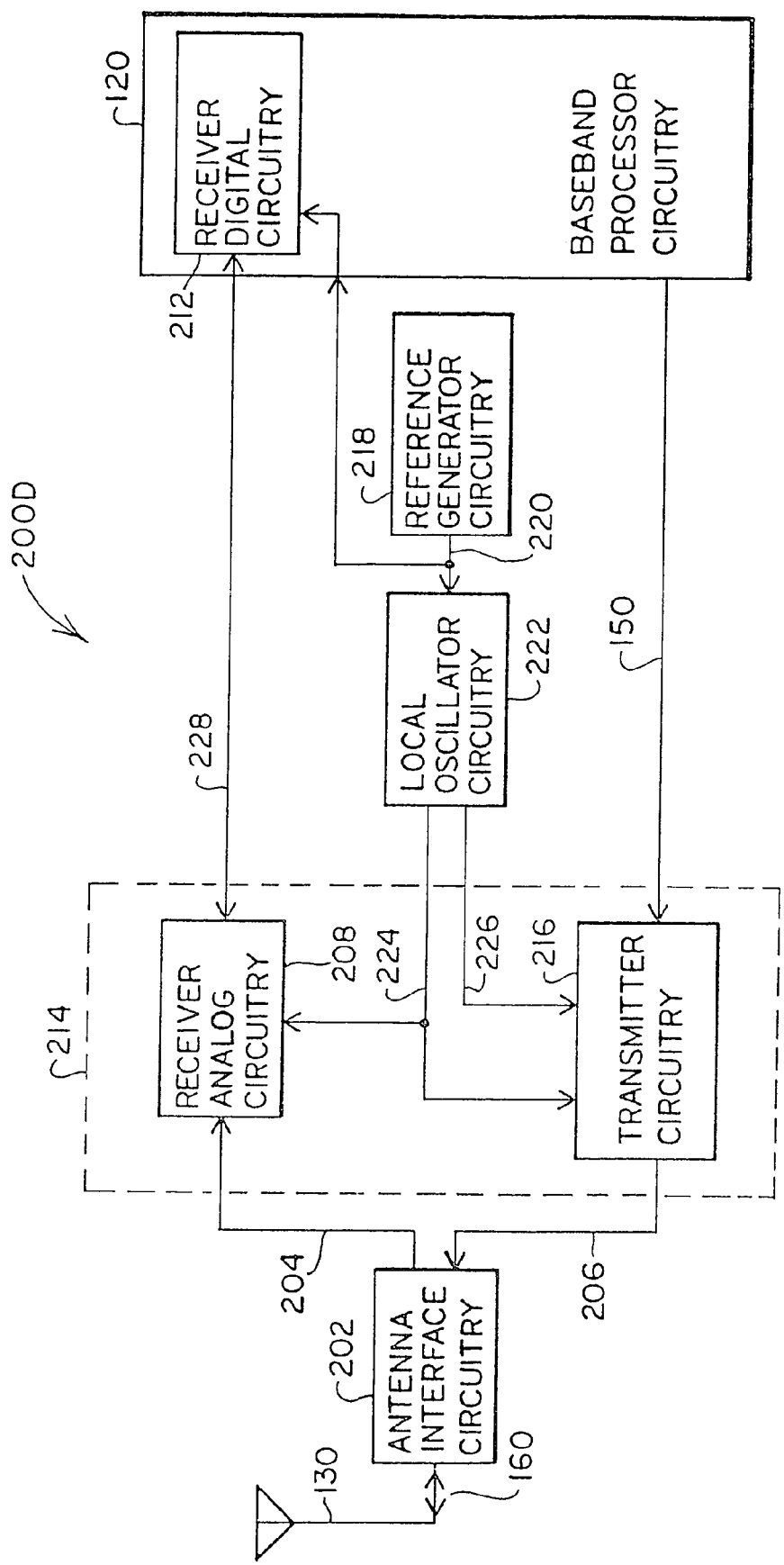
FIG. 2D shows another embodiment of RF transceiver circuitry partitioned according to the invention, in which the receiver digital circuitry resides within the baseband processor circuitry.

FIG. 2D shows an embodiment 200D of an RF transceiver partitioned according to the invention. The RF transceiver in FIG. 2D operates similarly to the transceiver shown in FIG. 2A. The embodiment 200D, however, accomplishes additional economy by including the receiver digital circuitry 212 within the baseband processor circuitry 120. As one alternative, one may integrate the entire receiver digital circuitry 212 on the same integrated circuit device that includes the baseband processor circuitry 120. Note that one may use software (or firmware), hardware, or a combination of software (or firmware) and hardware to realize the functions of the receiver digital circuitry 212 within the baseband processor circuitry 120, as persons skilled in the art who have the benefit of the description of the invention understand. Note also that, similar to the embodiment 200C in FIG. 2C, the baseband processor circuitry 120 in embodiment 200D may also include the reference signal generator 218, as desired.

The partitioning of embodiment 200D involves two circuit partitions, or circuit blocks. The first circuit partition 214 includes the receiver analog circuitry 208 and the transmitter circuitry 216. The second circuit partition includes the local oscillator circuitry 222. The first and second circuit partitions are partitioned so that interference effects between them tend to be reduced.

FIG. 3 shows the mechanisms that may lead to interference among the various blocks or components in a typical RF transceiver, for example, the transceiver shown in FIG. 2A. Note that the paths with arrows in FIG. 3 represent interference mechanisms among the blocks within the transceiver, rather than desired signal paths. One interference mechanism results from the reference signal 220 (see FIGS. 2A-2D), which preferably comprises a clock signal. In the preferred embodiments, the reference generator circuitry produces a clock signal that may have a frequency of 13 MHz (GSM clock frequency) or 26 MHz. If the reference generator produces a 26 MHz clock signal, RF transceivers according to the invention preferably divide that signal by two to produce a 13 MHz master system clock. The clock signal typically includes voltage pulses that have many Fourier series harmonics. The Fourier series harmonics extend to many multiples of the clock signal frequency. Those harmonics may interfere with the receiver analog circuitry 208 (e.g., the low-noise amplifier, or LNA), the local oscillator circuitry 222 (e.g., the synthesizer circuitry), and the transmitter circuitry 216 (e.g., the transmitter's voltage-controlled oscillator, or VCO). FIG. 3 shows these sources of interference as interference mechanisms 360, 350, and 340.

The receiver digital circuitry 212 uses the output of the reference generator circuitry 218, which preferably comprises a clock signal. Interference mechanism 310 exists because of the sensitivity of the receiver analog circuitry 208 to the digital switching noise and harmonics present in the receiver digital circuitry 212. Interference mechanism 310 may also exist because of the digital signals (for example, clock signals) that the receiver digital circuitry 212 communicates to the receiver analog circuitry 208. Similarly, the digital switching noise and harmonics in the receiver digital circuitry 212 may interfere with the local oscillator circuitry 222, giving rise to interference mechanism 320 in FIG. 3.

The local oscillator circuitry 222 typically uses an inductor in an inductive-capacitive (LC) resonance tank (not shown explicitly in the figures). The resonance tank may circulate relatively large currents. Those currents may couple to the sensitive circuitry within the transmitter circuitry 216 (e.g., the transmitter's VCO), thus giving rise to interference mechanism 330. Similarly, the relatively large currents circulating within the resonance tank of the local oscillator circuitry 222 may saturate sensitive components within the receiver analog circuitry 208 (e.g., the LNA circuitry). FIG. 3 depicts this interference source as interference mechanism 370.

The timing of the transmit mode and receive mode in the GSM specifications help to mitigate potential interference between the transceiver's receive-path circuitry and its transmit-path circuitry. The GSM specifications use time-division duplexing (TDD). According to the TDD protocol, the transceiver deactivates the transmit-path circuitry while in the receive mode of operation, and vice-versa. Consequently, FIG. 3 does not show potential interference mechanisms between the transmitter circuitry 216 and either the receiver digital circuitry 212 or the receiver analog circuitry 208.

As FIG. 3 illustrates, interference mechanisms exist between the local oscillator circuitry 222 and each of the other blocks or components in the RF transceiver. Thus, to reduce interference effects, RF transceivers according to the invention preferably partition the local oscillator circuitry 222 separately from the other transceiver blocks shown in FIG. 3. Note, however, that in some circumstances one may include parts or all of the local oscillator circuitry within the same circuit partition (for example, circuit partition 214 in FIGS. 2A-2D) that includes the receiver analog circuitry and the transmitter circuitry, as desired. Typically, a voltage-controlled oscillator (VCO) within the local oscillator circuitry causes interference with other sensitive circuit blocks (for example, the receiver analog circuitry) through undesired coupling mechanisms. If those coupling mechanisms can be mitigated to the extent that the performance characteristics of the RF transceiver are acceptable in a given application, then one may include the local oscillator circuitry within the same circuit partition as the receiver analog circuitry and the transmitter circuitry. Alternatively, if the VCO circuitry causes unacceptable levels of interference, one may include other parts of the local oscillator circuitry within the circuit partition that includes the receiver analog circuitry and the transmitter circuitry, but exclude the VCO circuitry from that circuit partition.

To reduce the effects of interference mechanism 310, RF transceivers according to the invention partition the receiver analog circuitry 208 separately from the receiver digital circuitry 212. Because of the mutually exclusive operation of the transmitter circuitry 216 and the receiver analog circuitry 208 according to GSM specifications, the transmitter circuitry 216 and the receiver analog circuitry 208 may reside within the same circuit partition, or circuit block. Placing the transmitter circuitry 216 and the receiver analog circuitry 208 within the same circuit partition results in a more integrated RF transceiver overall. The RF transceivers shown in FIGS. 2A-2D employ partitioning techniques that take advantage of the above analysis of the interference mechanisms among the various transceiver components. To reduce interference effects among the various circuit partitions or circuit blocks even further, RF transceivers according to the invention also use differential signals to couple the circuit partitions or circuit blocks to one another.

Figure 4:
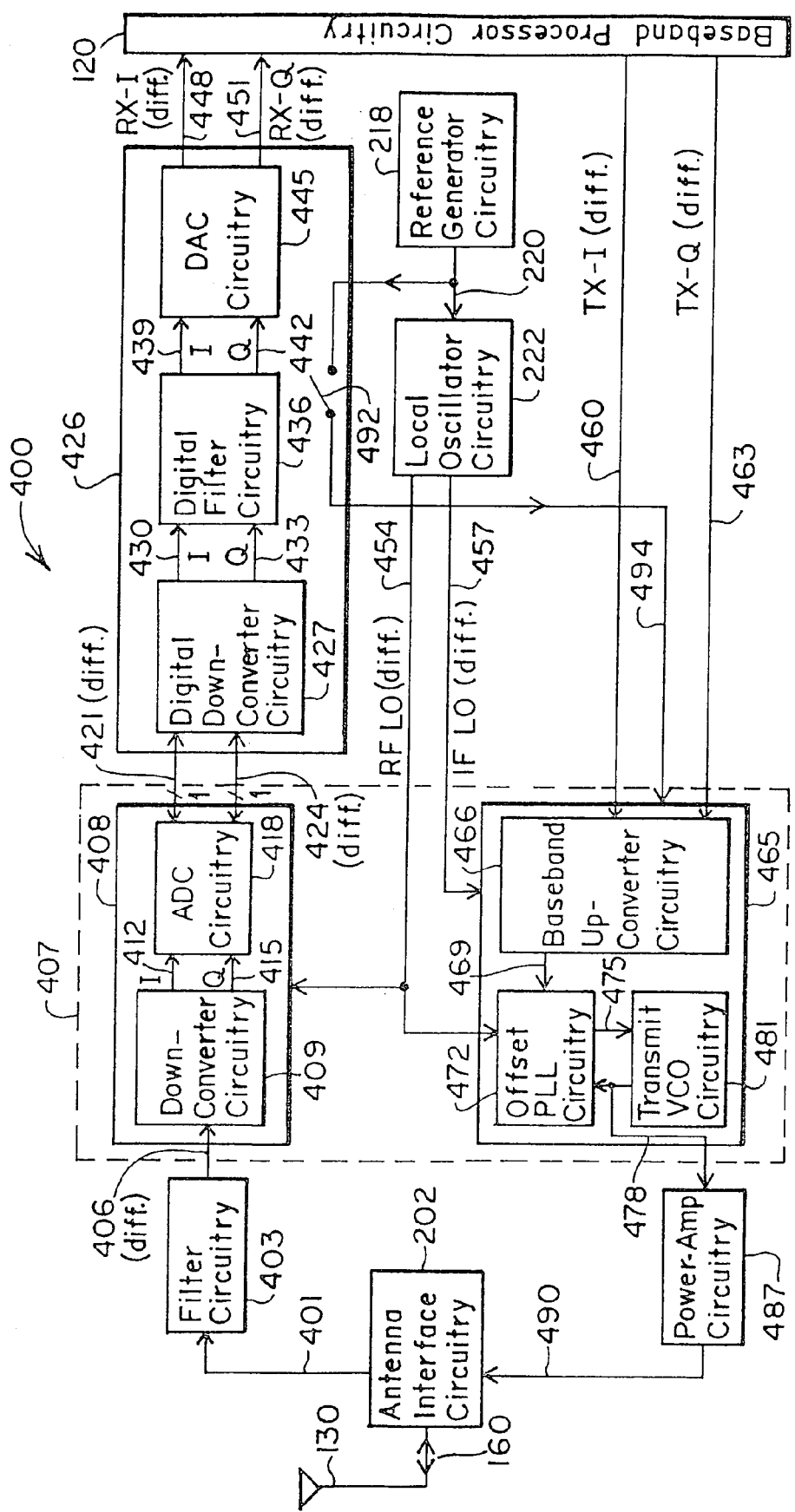
FIG. 4 shows a more detailed block diagram of RF transceiver circuitry partitioned according to the invention.

FIG. 4 shows a more detailed block diagram of an embodiment 400 of an RF transceiver partitioned according to the invention. The transceiver includes receiver analog circuitry 408, receiver digital circuitry 426, and transmitter circuitry 465. In the receive mode, the antenna interface circuitry 202 provides an RF signal 401 to a filter circuitry 403. The filter circuitry 403 provides a filtered RF signal 406 to the receiver analog circuitry 408. The receiver analog circuitry 408 includes down-converter (i.e., mixer) circuitry 409 and analog-to-digital converter (ADC) circuitry 418. The down-converter circuitry 409 mixes the filtered RF signal 406 with an RF local oscillator signal 454, received from the local oscillator circuitry 222. The down-converter circuitry 409 provides an in-phase analog down-converted signal 412 (i.e., I-channel signal) and a quadrature analog down-converted signal 415 (i.e., Q-channel signal) to the ADC circuitry 418.

The ADC circuitry 418 converts the in-phase analog down-converted signal 412 and the quadrature analog down-converted signal 415 into a one-bit in-phase digital receive signal 421 and a one-bit quadrature digital receive signal 424. (Note that FIGS. 4-8 illustrate signal flow, rather than specific circuit implementations; for more details of the circuit implementation, for example, more details of the circuitry relating to the one-bit in-phase digital receive signal 421 and the one-bit quadrature digital receive signal 424, see FIGS. 9-14.) Thus, The ADC circuitry 418 provides the one-bit in-phase digital receive signal 421 and the one-bit quadrature digital receive signal 424 to the receiver digital circuitry 426. As described below, rather than, or in addition to, providing the one-bit in-phase and quadrature digital receive signals to the receiver digital circuitry 426, the digital interface between the receiver analog circuitry 408 and the receiver digital circuitry 426 may communicate various other signals. By way of illustration, those signals may include reference signals (e.g., clock signals), control signals, logic signals, hand-shaking signals, data signals, status signals, information signals, flag signals, and/or configuration signals. Moreover, the signals may constitute single-ended or differential signals, as desired. Thus, the interface provides a flexible communication mechanism between the receiver analog circuitry and the receiver digital circuitry.

The receiver digital circuitry 426 includes digital down-converter circuitry 427, digital filter circuitry 436, and digital-to-analog converter (DAC) circuitry 445. The digital down-converter circuitry 427 accepts the one-bit in-phase digital receive signal 421 and the one-bit quadrature digital receive signal 424 from the receiver analog circuitry 408. The digital down-converter circuitry 427 converts the received signals into a down-converted in-phase signal 430 and a down-converted quadrature signal 433 and provides those signals to the digital filter circuitry 436. The digital filter circuitry 436 preferably comprises an infinite impulse response (IIR) channel-select filter that performs various filtering operations on its input signals. The digital filter circuitry 436 preferably has programmable response characteristics. Note that, rather than using an IIR filter, one may use other types of filter (e.g., finite impulse-response, or FIR, filters) that provide fixed or programmable response characteristics, as desired.

The digital filter circuitry 436 provides a digital in-phase filtered signal 439 and a digital quadrature filtered signal 442 to the DAC circuitry 445. The DAC circuitry 445 converts the digital in-phase filtered signal 439 and the digital quadrature filtered signal 442 to an in-phase analog receive signal 448 and a quadrature analog receive signal 451, respectively. The baseband processor circuitry 120 accepts the in-phase analog receive signal 448 and the quadrature analog receive signal 451 for further processing.

The transmitter circuitry 465 comprises baseband up-converter circuitry 466, offset phase-lock-loop (PLL) circuitry 472, and transmit voltage-controlled oscillator (VCO) circuitry 481. The transmit VCO circuitry 481 typically has low-noise circuitry and is sensitive to external noise. For example, it may pick up interference from digital switching because of the high gain that results from the resonant LC-tank circuit within the transmit VCO circuitry 481. The baseband up-converter circuitry 466 accepts an intermediate frequency (IF) local oscillator signal 457 from the local oscillator circuitry 222. The baseband up-converter circuitry 466 mixes the IF local oscillator signal 457 with an analog in-phase transmit input signal 460 and an analog quadrature transmit input signal 463 and provides an up-converted IF signal 469 to the offset PLL circuitry 472.

The offset PLL circuitry 472 effectively filters the IF signal 469. In other words, the offset PLL circuitry 472 passes through it signals within its bandwidth but attenuates other signals. In this manner, the offset PLL circuitry 472 attenuates any spurious or noise signals outside its bandwidth, thus reducing the requirement for filtering at the antenna 130, and reducing system cost, insertion loss, and power consumption. The offset PLL circuitry 472 forms a feedback loop with the transmit VCO circuitry 481 via an offset PLL output signal 475 and a transmit VCO output signal 478. The transmit VCO circuitry 481 preferably has a constant-amplitude output signal.

The offset PLL circuitry 472 uses a mixer (not shown explicitly in FIG. 4) to mix the RF local oscillator signal 454 with the transmit VCO output signal 478. Power amplifier circuitry 487 accepts the transmit VCO output signal 478, and provides an amplified RF signal 490 to the antenna interface circuitry 202. The antenna interface circuitry 202 and the antenna 130 operate as described above. RF transceivers according to the invention preferably use transmitter circuitry 465 that comprises analog circuitry, as shown in FIG. 4. Using such circuitry minimizes interference with the transmit VCO circuitry 481 and helps to meet emission specifications for the transmitter circuitry 465.

The receiver digital circuitry 426 also accepts the reference signal 220 from the reference generator circuitry 218. The reference signal 220 preferably comprises a clock signal. The receiver digital circuitry 426 provides to the transmitter circuitry 465 a switched reference signal 494 by using a switch 492. Thus, the switch 492 may selectively provide the reference signal 220 to the transmitter circuitry 465. Before the RF transceiver enters its transmit mode, the receiver digital circuitry 426 causes the switch 492 to close, thus providing the switched reference signal 494 to the transmitter circuitry 465.

The transmitter circuitry 465 uses the switched reference signal 494 to calibrate or adjust some of its components. For example, the transmitter circuitry 465 may use the switched reference signal 494 to calibrate some of its components, such as the transmit VCO circuitry 481, for example, as described in commonly owned U.S. Pat. No. 6,137,372, incorporated by reference here in its entirety. The transmitter circuitry 465 may also use the switched reference signal 494 to adjust a voltage regulator within its output circuitry so as to transmit at known levels of RF radiation or power.

While the transmitter circuitry 465 calibrates and adjusts its components, the analog circuitry within the transmitter circuitry 465 powers up and begins to settle. When the transmitter circuitry 465 has finished calibrating its internal circuitry, the receiver digital circuitry 426 causes the switch 492 to open, thus inhibiting the supply of the reference signal 220 to the transmitter circuitry 465. At this point, the transmitter circuitry may power up the power amplifier circuitry 487 within the transmitter circuitry 465. The RF transceiver subsequently enters the transmit mode of operation and proceeds to transmit.

Note that FIG. 4 depicts the switch 492 as a simple switch for conceptual, schematic purposes. One may use a variety of devices to realize the function of the controlled switch 492, for example, semiconductor switches, gates, or the like, as persons skilled in the art who have the benefit of the disclosure of the invention understand. Note also that, although FIG. 4 shows the switch 492 as residing within the receiver digital circuitry 426, one may locate the switch in other locations, as desired. Placing the switch 492 within the receiver digital circuitry 426 helps to confine to the receiver digital circuitry 426 the harmonics that result from the switching circuitry.

The embodiment 400 in FIG. 4 comprises a first circuit partition 407, or circuit block, that includes the receiver analog circuitry 408 and the transmitter circuitry 465. The embodiment 400 also includes a second circuit partition, or circuit block, that includes the receiver digital circuitry 426. Finally, the embodiment 400 includes a third circuit partition, or circuit block, that comprises the local oscillator circuitry 222. The first circuit partition 407, the second circuit partition, and the third circuit partition are partitioned from one another so that interference effects among the circuit partitions tend to be reduced. That arrangement tends to reduce the interference effects among the circuit partitions by relying on the analysis of interference effects provided above in connection with FIG. 3. Preferably, the first, second, and third circuit partitions each reside within an integrated circuit device. To further reduce interference effects among the circuit partitions, the embodiment 400 in FIG. 4 uses differential signals wherever possible. The notation "(diff.)" adjacent to signal lines or reference numerals in FIG. 4 denotes the use of differential lines to propagate the annotated signals.

Note that the embodiment 400 shown in FIG. 4 uses an analog-digital-analog signal path in its receiver section. In other words, the ADC circuitry 418 converts analog signals into digital signals for further processing, and later conversion back into analog signals by the DAC circuitry 445. RF transceivers according to the invention use this particular signal path for the following reasons. First, the ADC circuitry 418 obviates the need for propagating signals from the receiver analog circuitry 408 to the receiver digital circuitry 426 over an analog interface with a relatively high dynamic range. The digital interface comprising the one-bit in-phase digital receive signal 421 and the one-bit quadrature digital receive signal 424 is less susceptible to the effects of noise and interference than would be an analog interface with a relatively high dynamic range.

Second, the RF transceiver in FIG. 4 uses the DAC circuitry 445 to maintain compatibility with interfaces commonly used to communicate with baseband processor circuitry in RF transceivers. According to those interfaces, the baseband processor accepts analog, rather than digital, signals from the receive path circuitry within the RF transceiver. In an RF transceiver that meets the specifications of those interfaces, the receiver digital circuitry 426 would provide analog signals to the baseband processor circuitry 120. The receiver digital circuitry 426 uses the DAC circuitry 445 to provide analog signals (i.e., the in-phase analog receive signal 448 and the quadrature analog receive signal 451) to the baseband processor circuitry 120. The DAC circuitry 445 allows programming the common-mode level and the full-scale voltage, which may vary among different baseband processor circuitries.

Third, compared to an analog solution, the analog-digital-analog signal path may result in reduced circuit size and area (for example, the area occupied within an integrated circuit device), thus lower cost. Fourth, the digital circuitry provides better repeatability, relative ease of testing, and more robust operation than its analog counterpart. Fifth, the digital circuitry has less dependence on supply voltage variation, temperature changes, and the like, than does comparable analog circuitry.

Sixth, the baseband processor circuitry 120 typically includes programmable digital circuitry, and may subsume the functionality of the digital circuitry within the receiver digital circuitry 426, if desired. Seventh, the digital circuitry allows more precise signal processing, for example, filtering, of signals within the receive path. Eighth, the digital circuitry allows more power-efficient signal processing. Finally, the digital circuitry allows the use of readily programmable DAC circuitry and PGA circuitry that provide for more flexible processing of the signals within the receive path. To benefit from the analog-digital-analog signal path, RF transceivers according to the invention use a low-IF signal (for example, 100 KHz for GSM applications) in their receive path circuitry, as using higher IF frequencies may lead to higher performance demands on the ADC and DAC circuitry within that path. The low-IF architecture also eases image-rejection requirements, and allows on-chip integration of the digital filter circuitry 436. Moreover, RF transceivers according to the invention use the digital down-converter circuitry 427 and the digital filter circuitry 436 to implement a digital-IF path in the receive signal path. The digital-IF architecture facilitates the implementation of the digital interface between the receiver digital circuitry 426 and the receiver analog circuitry 408.

If the receiver digital circuitry 426 need not be compatible with the common analog interface to baseband processors, one may remove the DAC circuitry 445 and use a digital interface to the baseband processor circuitry 120, as desired. In fact, similar to the RF transceiver shown in FIG. 2D, one may realize the function of the receiver digital circuitry 426 within the baseband processor circuitry 120, using hardware, software, or a combination of hardware and software. In that case, the RF transceiver would include two circuit partitions, or circuit blocks. The first circuit partition, or circuit block, 407 would include the receiver analog circuitry 408 and the transmitter circuitry 465. A second circuit partition, or circuit block, would comprise the local oscillator circuitry 222. Note also that, similar to the RF transceiver shown in FIG. 2C, one may include within the baseband processor circuitry 120 the functionality of the reference generator circuitry 218, as desired.

Figure 5:
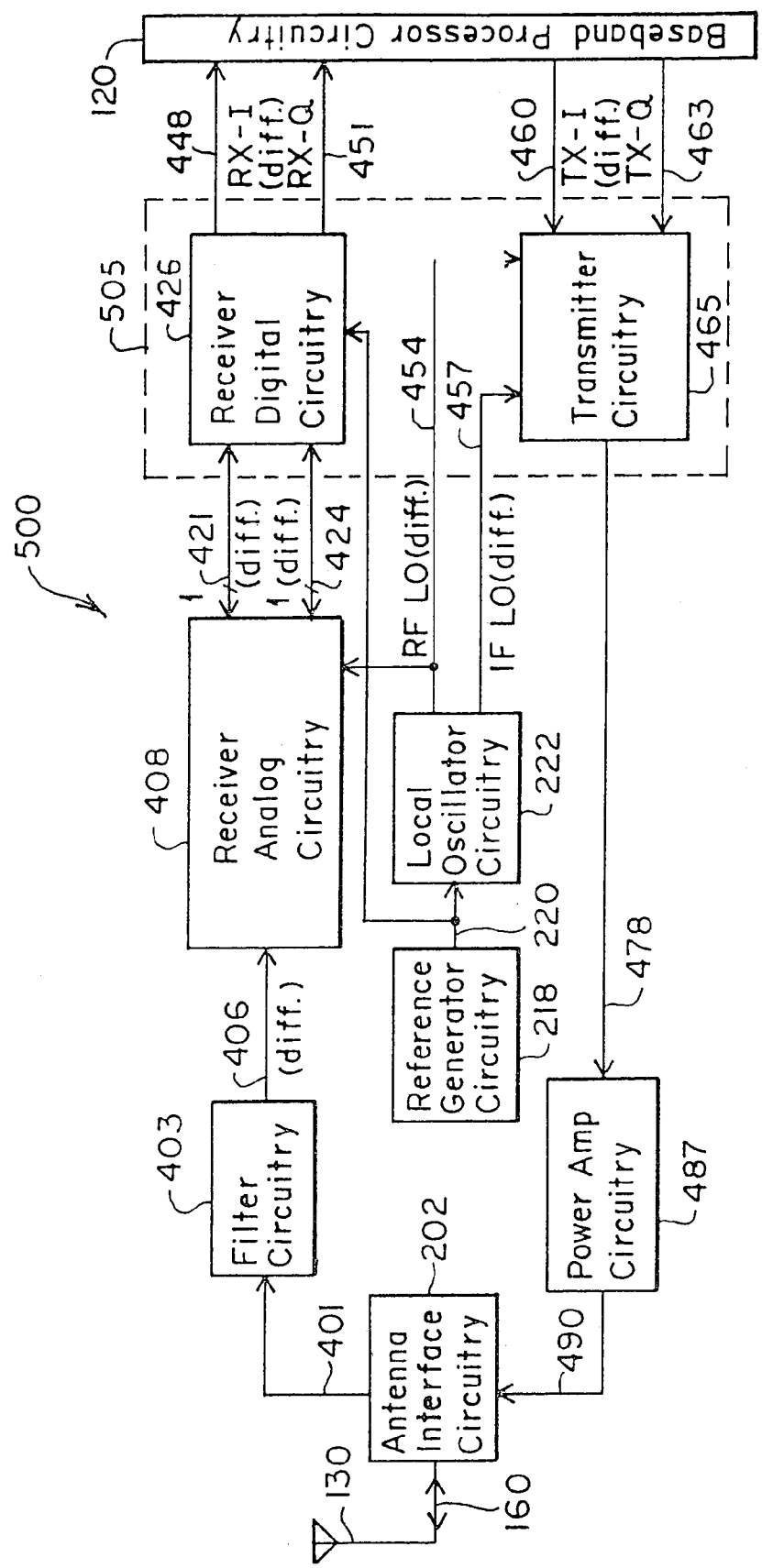
FIG. 5 illustrates an alternative technique for partitioning RF transceiver circuitry.
Figure 6:
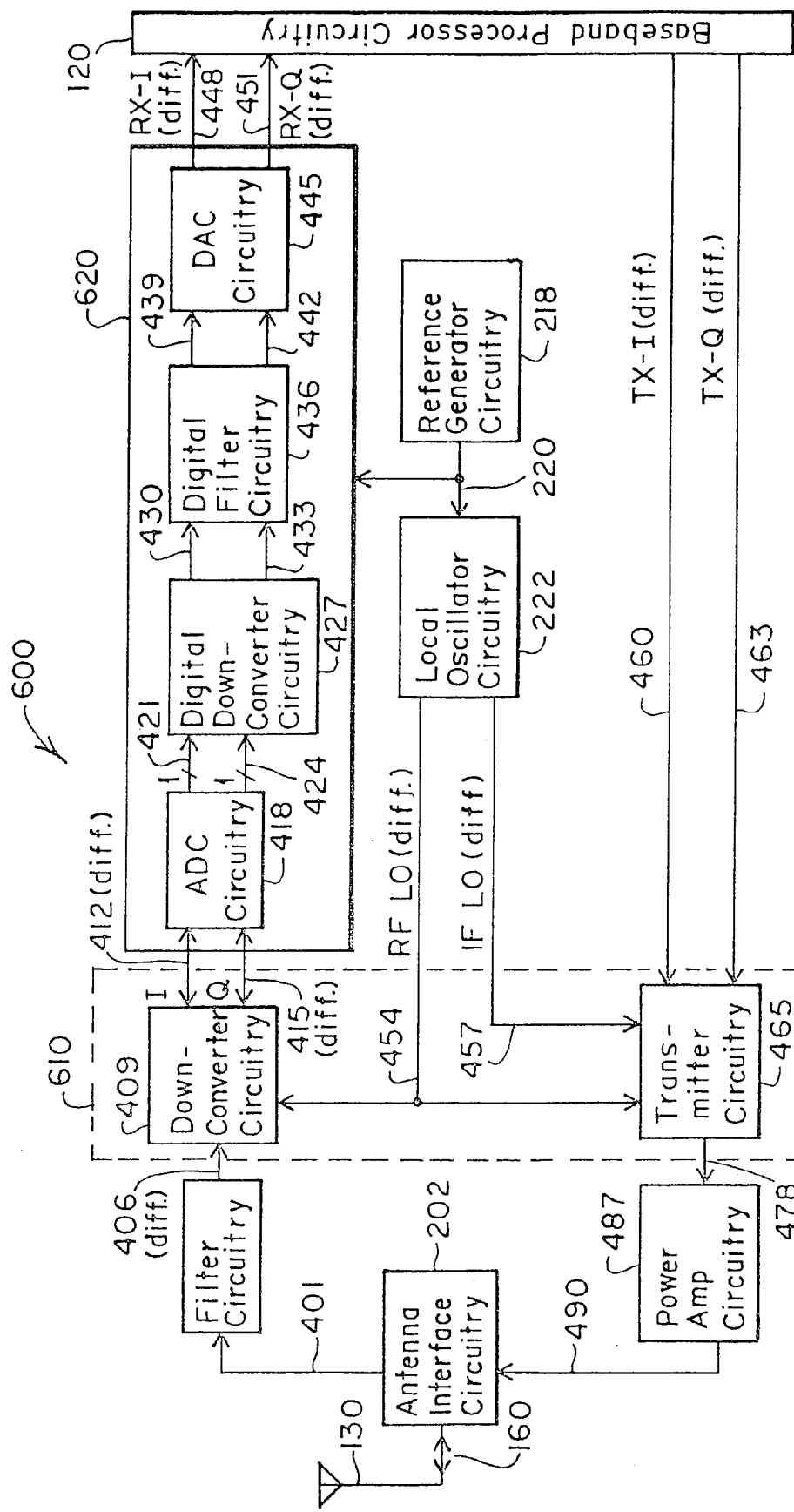
FIG. 6 shows yet another alternative technique for partitioning RF transceiver circuitry.

One may partition the RF transceiver shown in FIG. 4 in other ways. FIGS. 5 and 6 illustrate alternative partitioning of the RF transceiver of FIG. 4. FIG. 5 shows an embodiment 500 of an RF transceiver that includes three circuit partitions, or circuit blocks. A first circuit partition includes the receiver analog circuitry 408. A second circuit partition 505 includes the receiver digital circuitry 426 and the transmitter circuitry 465. As noted above, the GSM specifications provide for alternate operation of RF transceivers in receive and transmit modes. The partitioning shown in FIG. 5 takes advantage of the GSM specifications by including the receiver digital circuitry 426 and the transmitter circuitry 465 within the second circuit partition 505. A third circuit partition includes the local oscillator circuitry 222. Preferably, the first, second, and third circuit partitions each reside within an integrated circuit device. Similar to embodiment 400 in FIG. 4, the embodiment 500 in FIG. 5 uses differential signals wherever possible to further reduce interference effects among the circuit partitions.

FIG. 6 shows another alternative partitioning of an RF transceiver. FIG. 6 shows an embodiment 600 of an RF transceiver that includes three circuit partitions, or circuit blocks. A first circuit partition 610 includes part of the receiver analog circuitry, i.e., the down-converter circuitry 409, together with the transmitter circuitry 465. A second circuit partition 620 includes the ADC circuitry 418, together with the receiver digital circuitry, i.e., the digital down-converter circuitry 427, the digital filter circuitry 436, and the DAC circuitry 445. A third circuit partition includes the local oscillator circuitry 222. Preferably, the first, second, and third circuit partitions each reside within an integrated circuit device. Similar to embodiment 400 in FIG. 4, the embodiment 600 in FIG. 6 uses differential signals wherever possible to further reduce interference effects among the circuit partitions.

Figure 7:
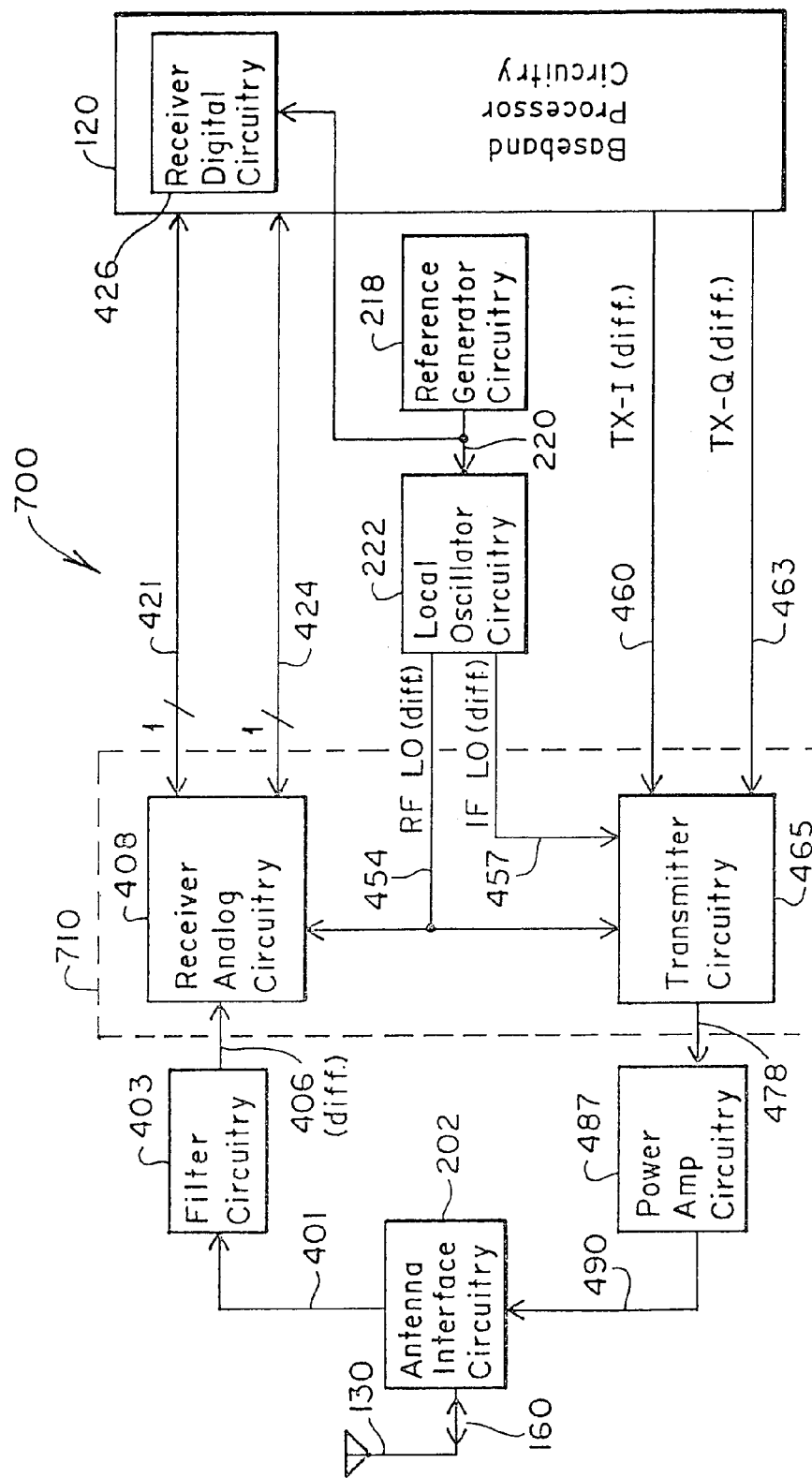
FIG. 7 depicts a more detailed block diagram of RF transceiver circuitry partitioned according to the invention, in which the receiver digital circuitry resides within the baseband processor circuitry.

FIG. 7 shows a variation of the RF transceiver shown in FIG. 4. FIG. 7 illustrates an embodiment 700 of an RF transceiver partitioned according to the invention. Note that, for the sake of clarity, FIG. 7 does not explicitly show the details of the receiver analog circuitry 408, the transmitter circuitry 465, and the receiver digital circuitry 426. The receiver analog circuitry 408, the transmitter circuitry 465, and the receiver digital circuitry 426 include circuitry similar to those shown in their corresponding counterparts in FIG. 4. Similar to the RF transceiver shown in FIG. 2D, the embodiment 700 in FIG. 7 shows an RF transceiver in which the baseband processor 120 includes the function of the receiver digital circuitry 426. The baseband processor circuitry 120 may realize the function of the receiver digital circuitry 426 using hardware, software, or a combination of hardware and software.

Because the embodiment 700 includes the function of the receiver digital circuitry 426 within the baseband processor circuitry 120, it includes two circuit partitions, or circuit blocks. A first circuit partition 710 includes the receiver analog circuitry 408 and the transmitter circuitry 465. A second circuit partition comprises the local oscillator circuitry 222. Note also that, similar to the RF transceiver shown in FIG. 2C, one may also include within the baseband processor circuitry 120 the functionality of the reference generator circuitry 218, as desired.

Figure 8:
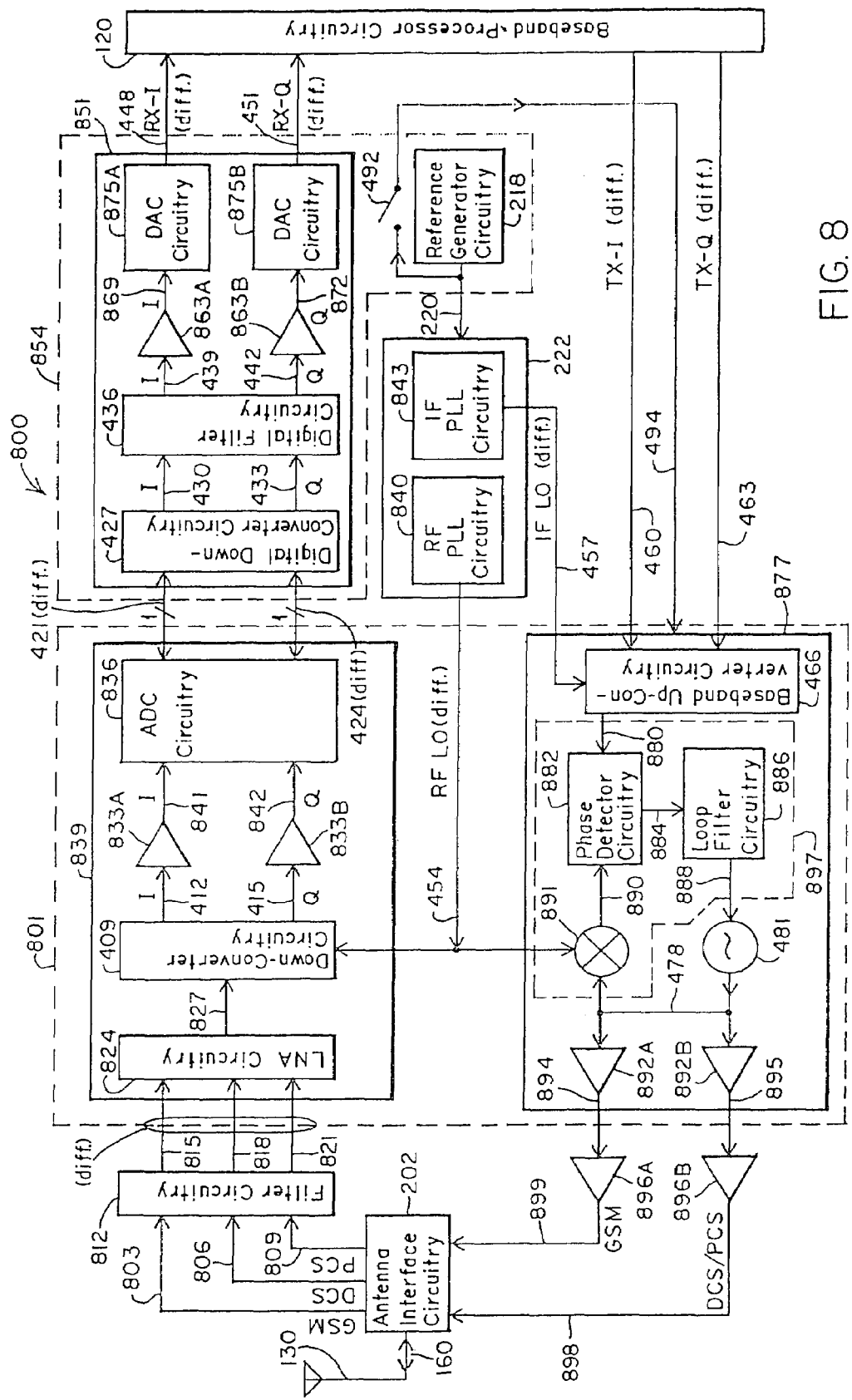
FIG. 8 illustrates a more detailed block diagram of a multi-band RF transceiver circuitry partitioned according to the invention.

FIG. 8 shows an embodiment 800 of a multi-band RF transceiver, partitioned according to the invention. Preferably, the RF transceiver in FIG. 8 operates within the GSM (925 to 960 MHz for reception and 880-915 MHz for transmission), PCS (1930 to 1990 MHz for reception and 1850-1910 MHz for transmission), and DCS (1805 to 1880 MHz for reception and 1710-1785 MHz for transmission) bands. Like the RF transceiver in FIG. 4, the RF transceiver in FIG. 8 uses a low-IF architecture. The embodiment 800 includes receiver analog circuitry 839, receiver digital circuitry 851, transmitter circuitry 877, local oscillator circuitry 222, and reference generator circuitry 218. The local oscillator circuitry 222 includes RF phase-lock loop (PLL) circuitry 840 and intermediate-frequency (IF) PLL circuitry 843. The RF PLL circuitry 840 produces the RF local oscillator, or RF LO, signal 454, whereas the IF PLL circuitry 843 produces the IF local oscillator, or IF LO, signal 457.

Table 1 below shows the preferred frequencies for the RF local oscillator signal 454 during the receive mode:

TABLE 1

| Band | RF Local Oscillator Frequency (MHz) |
| --- | --- |
| GSM | 1849.8-1919.8 |
| DCS | 1804.9-1879.9 |
| PCS | 1929.9-1989.9 |
| All Bands | 1804.9-1989.9 |

Table 2 below lists the preferred frequencies for the RF local oscillator signal 454 during the transmit mode:

TABLE 2

| Band | RF Local Oscillator Frequency (MHz) |
|---|---|
| GSM | 1279-1314 |
| DCS | 1327-1402 |
| PCS | 1423-1483 |
| All Bands | 1279-1483 |

During the receive mode, the IF local oscillator signal 457 is preferably turned off. In preferred embodiments, during the transmit mode, the IF local oscillator signal 457 preferably has a frequency between 383 MHz and 427 MHz. Note, however, that one may use other frequencies for the RF and IF local oscillator signals 454 and 457, as desired.

The reference generator 218 provides a reference signal 220 that preferably comprises a clock signal, although one may use other signals, as persons skilled in the art who have the benefit of the description of the invention understand. Moreover, the transmitter circuitry 877 preferably uses high-side injection for the GSM band and low-side injection for the DCS and PCS bands.

The receive path circuitry operates as follows. Filter circuitry 812 accepts a GSM RF signal 803, a DCS RF signal 806, and a PCS RF signal 809 from the antenna interface circuitry 202. The filter circuitry 812 preferably contains a surface-acoustic-wave (SAW) filter for each of the three bands, although one may use other types and numbers of filters, as desired. The filter circuitry 812 provides a filtered GSM RF signal 815, a filtered DCS RF signal 818, and a filtered PCS RF signal 821 to low-noise amplifier (LNA) circuitry 824. The LNA circuitry 824 preferably has programmable gain, and in part provides for programmable gain in the receive path circuitry.

The LNA circuitry 824 provides an amplified RF signal 827 to down-converter circuitry 409. In exemplary embodiments according to the invention, amplified RF signal 827 includes multiple signal lines, which may be differential signal lines, to accommodate the GSM, DCS, and PCS bands. Note that, rather than using the LNA circuitry with a real output, one may use an LNA circuitry that has complex outputs (in-phase and quadrature outputs), together with a poly-phase filter circuitry. The combination of the complex LNA circuitry and the poly-phase filter circuitry provides better image rejection, albeit with a somewhat higher loss. Thus, the choice of using the complex LNA circuitry and the poly-phase filter circuitry depends on a trade-off between image rejection and loss in the poly-phase filter circuitry.

The down-converter circuitry 409 mixes the amplified RF signal 827 with the RF local oscillator signal 454, which it receives from the RF PLL circuitry 840. The down-converter circuitry 409 produces the in-phase analog down-converted signal 412 and the quadrature in-phase analog down-converted signal 415. The down-converter circuitry 409 provides the in-phase analog down-converted signal 412 and the quadrature in-phase analog down-converted signal 415 to a pair of programmable-gain amplifiers (PGAs) 833A and 833B.

The PGA 833A and PGA 833B in part allow for programming the gain of the receive path. The PGA 833A and the PGA 833B supply an analog in-phase amplified signal 841 and an analog quadrature amplified signal 842 to complex ADC circuitry 836 (i.e., both I and Q inputs will affect both I and Q outputs). The ADC circuitry 836 converts the analog in-phase amplified signal 841 into a one-bit in-phase digital receive signal 421. Likewise, the ADC circuitry 836 converts the analog quadrature amplifier signal 842 into a one-bit quadrature digital receive signal 424.

Note that RF transceivers and receivers according to the invention preferably use a one-bit digital interface. One may, however, use a variety of other interfaces, as persons skilled in the art who have the benefit of the description of the invention understand. For example, one may use a multi-bit interface or a parallel interface. Moreover, as described below, rather than, or in addition to, providing the one-bit in-phase and quadrature digital receive signals to the receiver digital circuitry 851, the digital interface between the receiver analog circuitry 839 and the receiver digital circuitry 851 may communicate various other signals. By way of illustration, those signals may include reference signals (e.g., clock signals), control signals, logic signals, hand-shaking signals, data signals, status signals, information signals, flag signals, and/or configuration signals. Furthermore, the signals may constitute single-ended or differential signals, as desired. Thus, the interface provides a flexible communication mechanism between the receiver analog circuitry and the receiver digital circuitry.

The receiver digital circuitry 851 accepts the one-bit in-phase digital receive signal 421 and the one-bit quadrature digital receive signal 424, and provides them to the digital down-converter circuitry 427. The digital down-converter circuitry 427 converts the received signals into a down-converted in-phase signal 430 and a down-converted quadrature signal 433 and provides those signals to the digital filter circuitry 436. The digital filter circuitry 436 preferably comprises an IIR channel-select filter that performs filtering operations on its input signals. Note, however, that one may use other types of filters, for example, FIR filters, as desired.

The digital filter circuitry 436 provides the digital in-phase filtered signal 439 to a digital PGA 863A and the digital quadrature filtered signal 442 to a digital PGA 863B. The digital PGA 863A and PGA 863B in part allow for programming the gain of the receive path circuitry. The digital PGA 863A supplies an amplified digital in-phase signal 869 to DAC circuitry 875A, whereas the digital PGA 863B supplies an amplified digital quadrature signal 872 to DAC circuitry 875B. The DAC circuitry 875A converts the amplified digital in-phase signal 869 to the in-phase analog receive signal 448. The DAC circuitry 875B converts the amplified digital quadrature signal 872 signal into the quadrature analog receive signal 451. The baseband processor circuitry 120 accepts the in-phase analog receive signal 448 and the quadrature analog receive signal 451 for further processing, as desired.

Note that the digital circuit blocks shown in the receiver digital circuitry 851 depict mainly the conceptual functions and signal flow. The actual digital-circuit implementation may or may not contain separately identifiable hardware for the various functional blocks. For example, one may re-use (in time, for instance, by using multiplexing) the same digital circuitry to implement both digital PGA 863A and digital PGA 863B, as desired.

Note also that, similar to the RF transceiver in FIG. 4, the RF transceiver in FIG. 8 features a digital-IF architecture. The digital-IF architecture facilitates the implementation of the one-bit digital interface between the receiver digital circuitry 426 and the receiver analog circuitry 408. Moreover, the digital-IF architecture allows digital (rather than analog) IF-filtering, thus providing all of the advantages of digital filtering.

The transmitter circuitry 877 comprises baseband up-converter circuitry 466, transmit VCO circuitry 481, a pair of transmitter output buffers 892A and 892B, and offset PLL circuitry 897. The offset PLL circuitry 897 includes offset mixer circuitry 891, phase detector circuitry 882, and loop filter circuitry 886. The baseband up-converter circuitry 466 accepts the analog in-phase transmit input signal 460 and the analog quadrature transmit input signal 463, mixes those signals with the IF local oscillator signal 457, and provides a transmit IF signal 880 to the offset PLL circuitry 897. The offset PLL circuitry 897 uses the transmit IF signal 880 as a reference signal. The transmit IF signal 880 preferably comprises a modulated single-sideband IF signal but, as persons skilled in the art who have the benefit of the description of the invention understand, one may use other types of signal and modulation, as desired.

The offset mixer circuitry 891 in the offset PLL circuitry 897 mixes the transmit VCO output signal 478 with the RF local oscillator signal 454, and provides a mixed signal 890 to the phase detector circuitry 882. The phase detector circuitry 882 compares the mixed signal 890 to the transmit IF signal 880 and provides an offset PLL error signal 884 to the loop filter circuitry 886. The loop filter circuitry 886 in turn provides a filtered offset PLL signal 888 to the transmit VCO circuitry 481. Thus, the offset PLL circuitry 897 and the transmit VCO circuitry 481 operate in a feedback loop. Preferably, the output frequency of the transmit VCO circuitry 481 centers between the DCS and PCS bands, and its output is divided by two for the GSM band.

Transmitter output buffers 892A and 892B receive the transmit VCO output signal 478 and provide buffered transmit signals 894 and 895 to a pair of power amplifiers 896A and 896B. The power amplifiers 896A and 896B provide amplified RF signals 899 and 898, respectively, for transmission through antenna interface circuitry 202 and the antenna 130. Power amplifier 896A provides the RF signal 899 for the GSM band, whereas power amplifier 896B supplies the RF signal 898 for the DCS and PCS bands. Persons skilled in the art who have the benefit of the description of the invention, however, understand that one may use other arrangements of power amplifiers and frequency bands. Moreover, one may use RF filter circuitry within the output path of the transmitter circuitry 877, as desired.

The embodiment 800 comprises three circuit partitions, or circuit blocks. A first circuit partition 801 includes the receiver analog circuitry 839 and the transmitter circuitry 877. A second circuit partition 854 includes the receiver digital circuitry 851 and the reference generator circuitry 218. Finally, a third circuit partition comprises the local oscillator circuitry 222. The first circuit partition 801, the second circuit partition 854, and the third circuit partition are partitioned from one another so that interference effects among the circuit partitions tend to be reduced. That arrangement tends to reduce the interference effects among the circuit partitions because of the analysis of interference effects provided above in connection with FIG. 3. Preferably, the first, second, and third circuit partitions each reside within an integrated circuit device. To further reduce interference effects among the circuit partitions, the embodiment 800 in FIG. 8 uses differential signals wherever possible. The notation "(diff.)" adjacent to signal lines or reference numerals in FIG. 8 denotes the use of differential lines to propagate the annotated signals.

Note that, similar to the RF transceiver shown in FIG. 4 and described above, the embodiment 800 shown in FIG. 8 uses an analog-digital-analog signal path in its receiver section. The embodiment 800 uses this particular signal path for reasons similar to those described above in connection with the transceiver shown in FIG. 4.

Like the transceiver in FIG. 4, if the receiver digital circuitry 851 need not be compatible with the common analog interface to baseband processors, one may remove the DAC circuitry 875A and 875B, and use a digital interface to the baseband processor circuitry 120, as desired. In fact, similar to the RF transceiver shown in FIG. 2D, one may realize the function of the receiver digital circuitry 851 within the baseband processor circuitry 120, using hardware, software, or a combination of hardware and software. In that case, the RF transceiver would include two circuit partitions, or circuit blocks. The first circuit partition 801 would include the receiver analog circuitry 839 and the transmitter circuitry 877. A second circuit partition would comprise the local oscillator circuitry 222. Note also that, similar to the RF transceiver shown in FIG. 2C, in the embodiment 800, one may include within the baseband processor circuitry 120 the functionality of the reference generator circuitry 218, as desired.

Another aspect of the invention includes a configurable interface between the receiver digital circuitry and the receiver analog circuitry. Generally, one would seek to minimize digital switching activity within the receiver analog circuitry. Digital switching activity within the receiver analog circuitry would potentially interfere with the sensitive analog RF circuitry, for example, LNAs, or mixers. As described above, the receiver analog circuitry includes analog-to-digital circuitry (ADC), which preferably comprises sigma-delta-type ADCs. Sigma-delta ADCs typically use a clock signal at their output stages that generally has a pulse shape and, thus, contains high-frequency Fourier series harmonics. Moreover, the ADC circuitry itself produces digital outputs that the receiver digital circuitry uses. The digital switching present at the outputs of the ADC circuitry may also interfere with sensitive analog circuitry within the receiver analog circuitry.

Figure 9A:
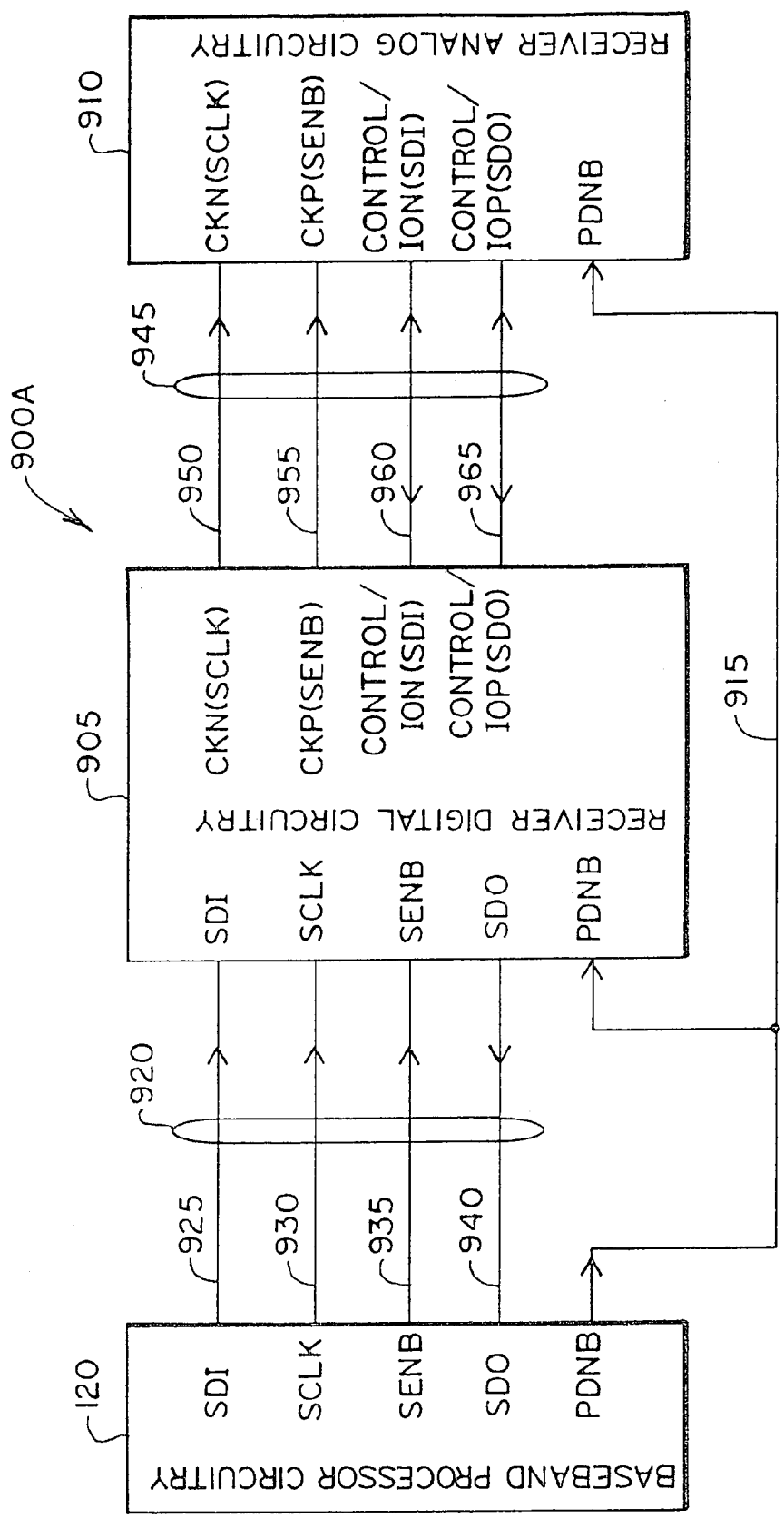
FIG. 9A shows a block diagram of an embodiment of the interface between the receiver digital circuitry and receiver analog circuitry in an RF transceiver according to the invention.

The invention contemplates providing RF apparatus according to the invention, for example, receivers and transceivers, that include an interface circuitry to minimize or reduce the effects of interference from digital circuitry within the RF apparatus. FIG. 9A shows an embodiment 900A of an interface between the receiver digital circuitry 905 and the receiver analog circuitry 910. The interface includes configurable interface signal lines 945. The baseband processor circuitry 120 in the transceiver of FIG. 9A communicates configuration, status, and setup information with both the receiver digital circuitry 905 and the receiver analog circuitry 910. In the preferred embodiments of RF transceivers according to the invention, the baseband processor circuitry 120 communicates with the receiver digital circuitry 905 and the receiver analog circuitry 910 by sending configuration data to read and write registers included within the receiver digital circuitry 905 and the receiver analog circuitry 910.

The receiver digital circuitry 905 communicates with the baseband processor circuitry 120 through a set of serial interface signal lines 920. The serial interface signal lines 920 preferably include a serial data-in (SDI) signal line 925, a serial clock (SCLK) signal line 930, a serial interface enable (SENB) signal line 935, and a serial data-out (SDO) signal line 940. The transceiver circuitry and the baseband processor circuitry 120 preferably hold all of the serial interface signal lines 920 at static levels during the transmit and receive modes of operation. The serial interface preferably uses a 22-bit serial control word that comprises 6 address bits and 16 data bits. Note, however, that one may use other serial interfaces, parallel interfaces, or other types of interfaces, that incorporate different numbers of signal lines, different types and sizes of signals, or both, as desired. Note also that, the SENB signal is preferably an active-low logic signal, although one may use a normal (i.e., an active-high) logic signal by making circuit modifications, as persons skilled in the art understand.

The receiver digital circuitry 905 communicates with the receiver analog circuitry 910 via configurable interface signal lines 945. Interface signal lines 945 preferably include four configurable signal lines 950, 955, 960, and 965, although one may use other numbers of configurable signal lines, as desired, depending on a particular application. In addition to supplying the serial interface signals 920, the baseband processor circuitry 120 provides a control signal 915, shown as a power-down (PDNB) signal in FIG. 9A, to both the receiver digital circuitry 905 and the receiver analog circuitry 910. The receiver digital circuitry 905 and the receiver analog circuitry 910 preferably use the power-down (PDNB) signal as the control signal 915 to configure the functionality of the interface signal lines 945. In other words, the functionality of the interface signal lines 945 depends on the state of the control signal 915. Also, the initialization of the circuitry within the receive path and the transmit path of the transceiver occurs upon the rising edge of the PDNB signal. Note that the PDNB signal is preferably an active-low logic signal, although one may use a normal (i.e., an active-high) logic signal, as persons skilled in the art would understand. Note also that, rather than using the PDNB signal, one may use other signals to control the configuration of the interface signal lines 945, as desired.

In the power-down or serial interface mode (i.e., the control signal 915 (for example, PDNB) is in the logic low state), interface signal line 950 provides the serial clock (SCLK) and interface signal line 955 supplies the serial interface enable signal (SENB). Furthermore, interface signal line 960 provides the serial data-in signal (SDI), whereas interface signal line 965 supplies the serial data-out (SDO) signal. One may devise other embodiments according to the invention in which, during this mode of operation, the transceiver may also perform circuit calibration and adjustment procedures, as desired (for example, the values of various transceiver components may vary over time or among transceivers produced in different manufacturing batches. The transceiver may calibrate and adjust its circuitry to take those variations into account and provide higher performance).

In the normal receive mode of operation (i.e., the control signal, PDNB, is in the logic-high state), interface signal line 950 provides a negative clock signal (CKN) and interface signal line 955 supplies the positive clock signal (CKP). Furthermore, interface signal line 960 provides a negative data signal (ION), whereas interface signal line 965 supplies a positive data signal (IOP).

In preferred embodiments of the invention, the CKN and CKP signals together form a differential clock signal that the receiver digital circuitry 905 provides to the receiver analog circuitry 910. The receiver analog circuitry 910 may provide the clock signal to the transmitter circuitry within the RF transceiver in order to facilitate calibration and adjustment of circuitry, as described above. During the receive mode, the receiver analog circuitry 910 provides the ION and IOP signals to the receiver digital circuitry 905. The ION and IOP signals preferably form a differential data signal. As noted above, the transceiver disables the transmitter circuitry during the receive mode of operation.

In preferred embodiments according to the invention, clock signals CKN and CKP are turned off when the transmitter circuitry is transmitting signals. During the transmit mode, interface signal lines 960 and 965 preferably provide two logic signals from the receiver digital circuitry 905 to the receiver analog circuitry 910. The signal lines may provide input/output signals to communicate data, status, information, flag, and configuration signals between the receiver digital circuitry 905 and the receiver analog circuitry 910, as desired. Preferably, the logic signals control the output buffer of the transmit VCO circuitry. Note that, rather than configuring interface signal lines 960 and 965 as logic signal lines, one may configure them in other ways, for example, analog signal lines, differential analog or digital signal lines, etc., as desired. Furthermore, the interface signal lines 960 and 965 may provide signals from the receiver digital circuitry 905 to the receiver analog circuitry 910, or vice-versa, as desired.

In addition to using differential signals, RF transceivers according to the invention preferably take other measures to reduce interference effects among the various transceiver circuits. Signals CKN, CKP, ION, and IOP may constitute voltage signals, as desired. Depending on the application, the signals CKN, CKP, ION, and IOP (or logic signals in the transmit mode) may have low voltage swings (for example, voltage swings smaller than the supply voltage) to reduce the magnitude and effects of interference because of the voltage switching on those signals.

In preferred embodiments according to the invention, signals CKN, CKP, ION, and IOP constitute current, rather than voltage, signals. Moreover, to help reduce the effects of interference even further, RF transceivers according to the invention preferably use band-limited signals. RF transceivers according to the invention preferably use filtering to remove some of the higher frequency harmonics from those signals to produce band-limited current signals.

Table 3 below summarizes the preferred functionality of the configurable interface signal lines 950, 955, 960, and 965 as a function of the state of the control signal 915 (for example, PDNB):

TABLE 3

| Signal Line | Control = 0 | Control = 1 (During Reception) | Control = 1 (During Transmission) |
|---|---|---|---|
| 950 | SCLK | CKN | (CKN off) |
| 955 | SENB | CKP | (CKP off) |
| 960 | SDI | ION | Logic Signal |
| 965 | SDO | IOP | Logic Signal |

Using configurable interface signal lines 945 in the interface between the receiver digital circuitry 905 and the receiver analog circuitry 910 allows using the same physical connections (e.g., pins on an integrated-circuit device or electrical connectors on a module) to accomplish different functionality. Thus, the configurable interface between the receiver digital circuitry 905 and the receiver analog circuitry 910 makes available the physical electrical connections available for other uses, for example, providing ground pins or connectors around sensitive analog signal pins or connectors to help shield those signals from RF interference. Moreover, the configurable interface between the receiver digital circuitry 905 and the receiver analog circuitry 910 reduces packaging size, cost, and complexity.

Figure 9B:
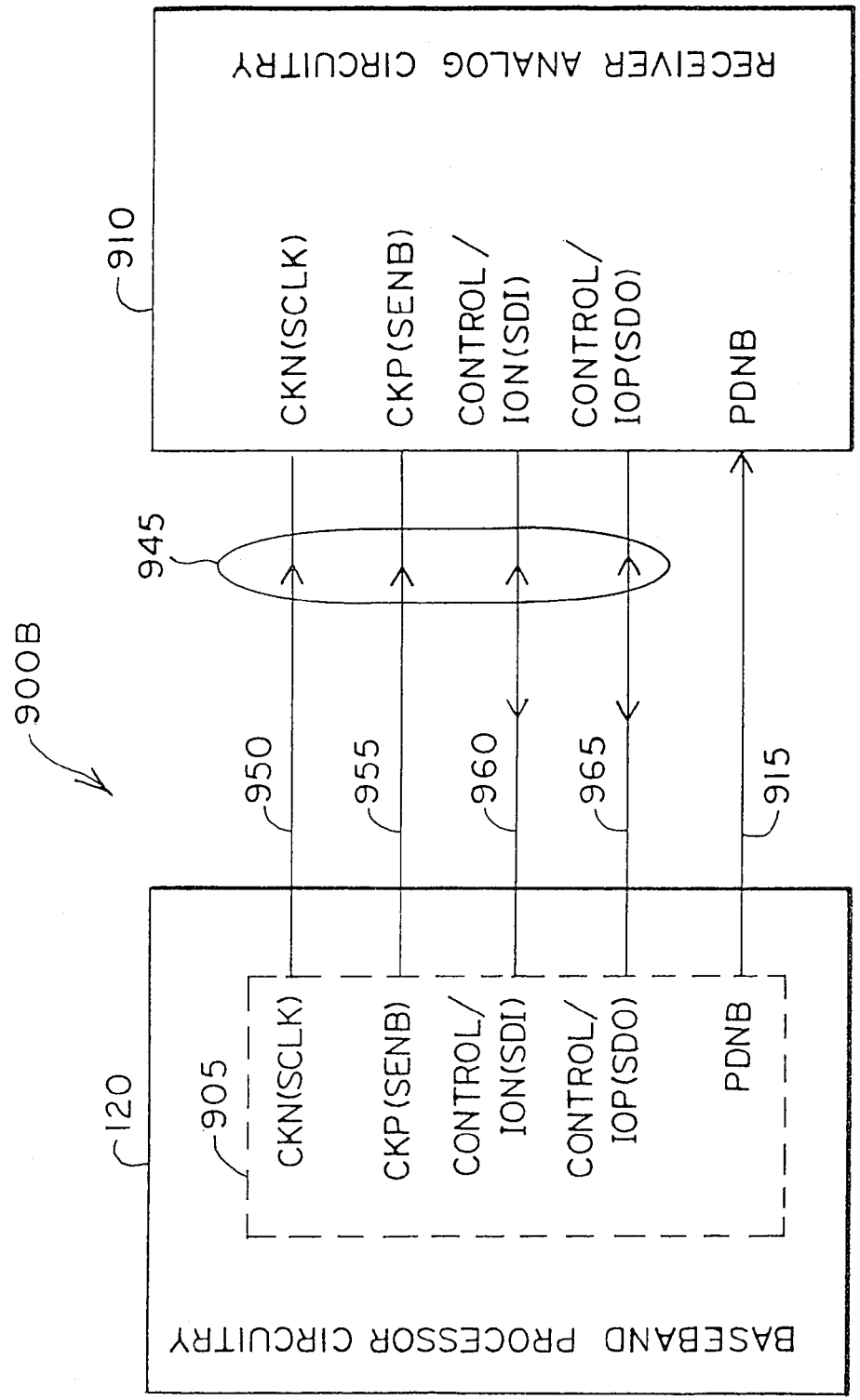
FIG. 9B depicts a block diagram of another embodiment of the interface between the baseband processor circuitry and the receiver analog circuitry in an RF transceiver according to the invention, in which the receiver digital circuitry resides within the baseband processor circuitry.

FIG. 9B shows an embodiment 900B that includes a configurable interface according to the invention. Here, the baseband processor circuitry 120 subsumes the functionality of the receiver digital circuitry 905. The baseband processor circuitry 120 realizes the functionality of the receiver digital circuitry 905, using hardware, software, or both, as desired. Because the baseband processor circuitry 120 has subsumed the receiver digital circuitry 905, the baseband processor circuitry 120 may communicate with the receiver analog circuitry 910 using configurable interface signal lines 945, depending on the state of the control signal 915 (e.g., the PDNB signal). The configurable interface signal lines 945 perform the same functions described above in connection with FIG. 9A, depending on the state of the control signal 915. As noted above, one may reconfigure the interface signal lines 960 and 965 during transmit mode to implement desired functionality, for example, logic signals.

Figure 10:
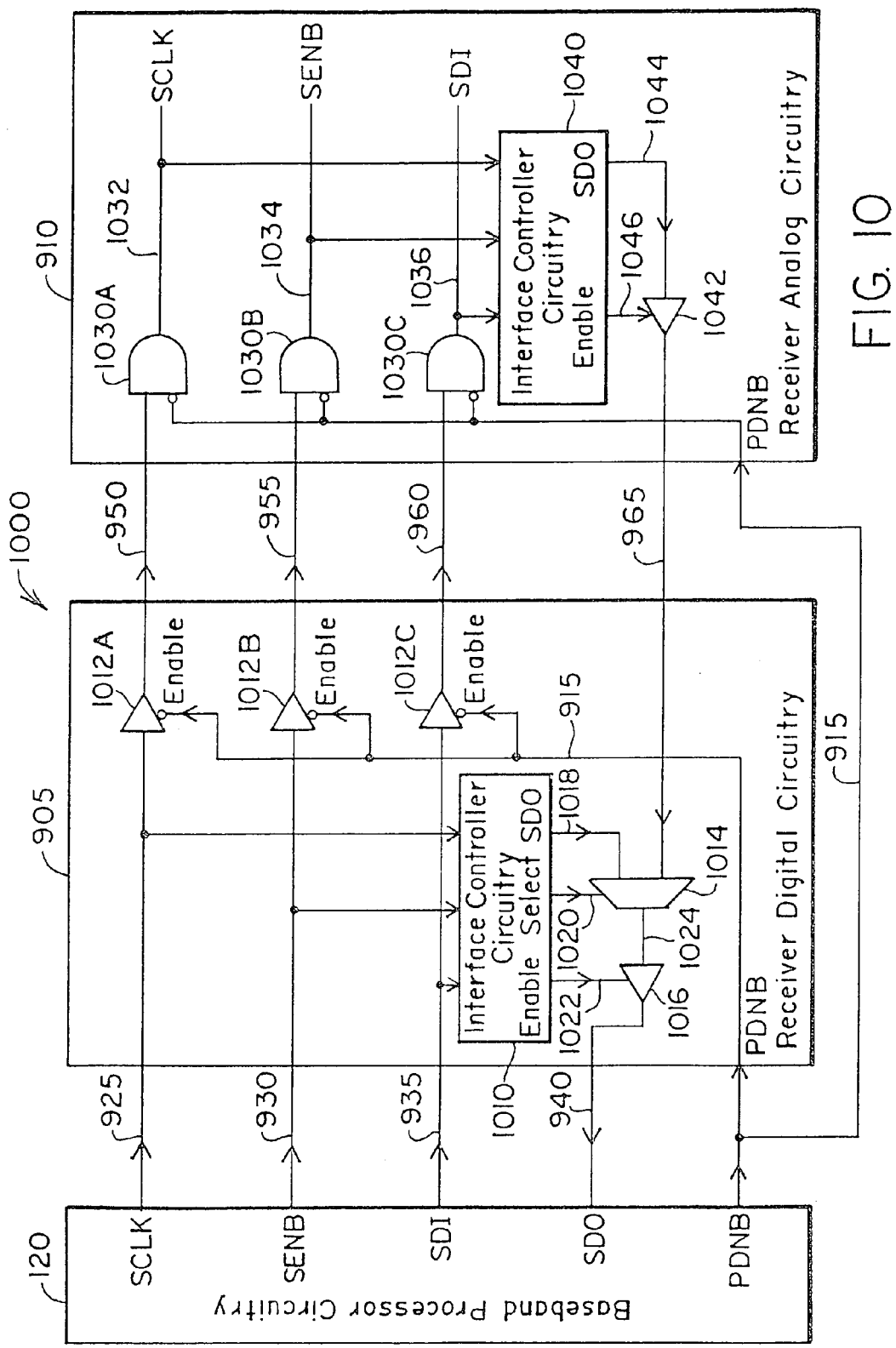
FIG. 10 illustrates a more detailed block diagram of the interface between the receiver analog circuitry and the receiver digital circuitry, with the interface configured as a serial interface.

FIG. 10 shows a conceptual block diagram of an embodiment 1000 of a configurable interface according to the invention within an RF transceiver in the power-down or serial interface mode (i.e., the control signal 915 is in a logic-low state). A logic low state on the control signal 915 enables the driver circuitry 1012A, 1012B, and 1012C, thus providing the configurable serial interface signal lines 950, 955, and 960 to the receiver analog circuitry 910.

Similarly, the logic low state on the control signal 915 causes the AND gates 1030A, 1030B, and 1030C to provide configurable interface signal lines 950, 955, and 960 to other circuitry within the receiver analog circuitry 910. The outputs of the AND gates 1030A, 1030B, and 1030C comprise a gated SCLK signal 1032, a gated SENB signal 1034, and a gated SDI signal 1036, respectively.

Interface controller circuitry 1040 accepts as inputs the gated SCLK signal 1032, the gated SENB signal 1034, and the gated SDI signal 1036. The interface controller circuitry 1040 resides within the receiver analog circuitry 910 and produces a receiver analog circuitry SDO signal 1044 and an enable signal 1046. By controlling tri-state driver circuitry 1042, the enable signal 1046 controls the provision of the receiver analog circuitry SDO signal 1044 to the receiver digital circuitry 905 via the configurable interface signal line 965.

Interface controller circuitry 1010 within the receiver digital circuitry 905 accepts the SCLK signal 925, the SENB signal 930, and the SDI signal 935 from the baseband processor circuitry 120. By decoding those signals, the interface controller circuitry 1010 determines whether the baseband processor circuitry 120 intends to communicate with the receiver digital circuitry 905 (e.g., the baseband processor circuitry 120 attempts to read a status or control register present on the receiver digital circuitry 905). If so, the interface controller circuitry 1010 provides the SCLK signal 925, the SENB signal 930, and the SDI signal 935 to other circuitry (not shown explicitly) within the receiver digital circuitry 905 for further processing.

Interface controller circuitry 1010 provides as output signals a receiver digital circuitry SDO signal 1018, a select signal 1020, and an enable signal 1022. The receiver digital circuitry SDO signal 1018 represents the serial data-out signal for the receiver digital circuitry 905, i.e., the serial data-out signal that the receiver digital circuitry 905 seeks to provide to the baseband processor circuitry 120. The interface controller circuitry 1010 supplies the select signal 1020 to multiplexer circuitry 1014. The multiplexer circuitry 1014 uses that signal to selectively provide as the multiplexer circuitry output signal 1024 either the receiver digital circuitry SDO signal 1018 or the receiver analog circuitry SDO signal 1044, which it receives through configurable interface signal line 965. Tri-state driver circuitry 1016 provides the multiplexer circuitry output signal 1024 to the baseband processor circuitry 120 under the control of the enable signal 1022.

Tri-state driver circuitry 1012A, 1012B, and 1012C use an inverted version of the control signal 915 as their enable signals. Thus, a logic high value on the control signal 915 disables the driver circuitry 1012A, 1012B, and 1012C, thus disabling the serial interface between the receiver digital circuitry 905 and the receiver analog circuitry 910. Similarly, AND gates 1030A, 1030B, and 1030C use an inverted version of the control signal 915 to gate interface signal lines 950, 955, and 960. In other words, a logic high value on the control signal 915 inhibits logic switching at the outputs of AND gates 1030A, 1030B, and 1030C, which reside on the receiver analog circuitry 910.

Figure 11A:
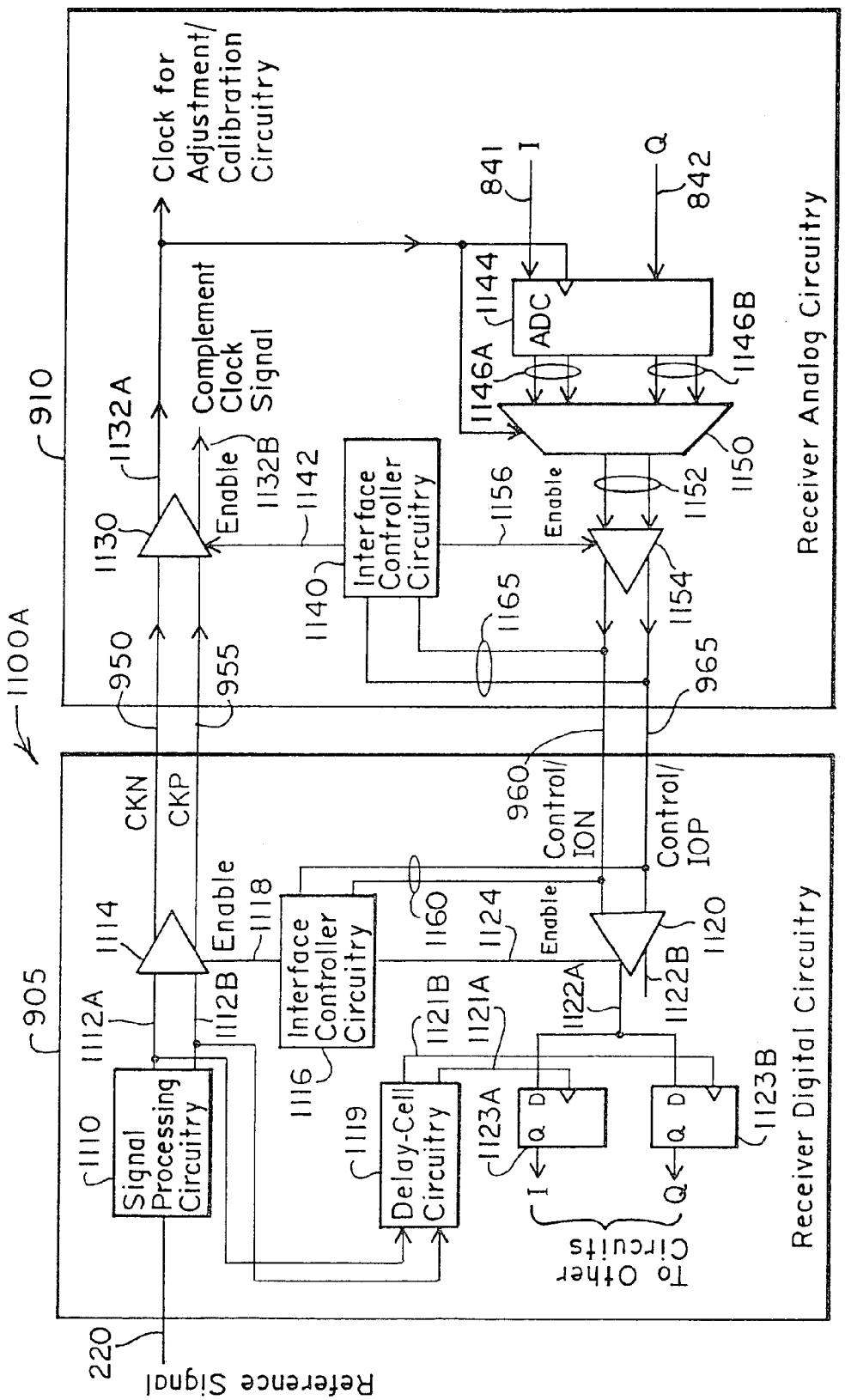
FIG. 11A shows a more detailed block diagram of an embodiment of the interface between the receiver analog circuitry and the receiver digital circuitry, with the interface configured as a data and clock signal interface.

FIG. 11A shows a conceptual block diagram of an embodiment 1100A of a configurable interface according to the invention, in an RF transceiver operating in the normal receive mode of operation (i.e., the control signal 915 is in a logic-high state). As noted above, in this mode, the receiver digital circuitry 905 provides a clock signal to the receiver analog circuitry 910 through the configurable interface signal lines 950 and 955. Configurable interface signal line 950 provides the CKN signal, whereas configurable interface signal line 955 supplies the CKP signal. Also in this mode, the receiver analog circuitry 910 provides a data signal to the receiver digital circuitry 905 through the configurable interface signal lines 960 and 965.

The receiver digital circuitry 905 provides the CKN and CKP signals to the receiver analog circuitry 910 by using clock driver circuitry 1114. The clock driver circuitry 1114 receives a clock signal 1112A and a complement clock signal 1112B from signal processing circuitry 1110. Signal processing circuitry 1110 receives the reference signal 220 and converts it to the clock signal 1112A and complement clock signal 1112B. Interface controller circuitry 1116 provides an enable signal 1118 that controls the provision of the CKN and CKP clock signals to the receiver analog circuitry 910 via the interface signal lines 950 and 955, respectively.

Receiver analog circuitry 910 includes clock receiver circuitry 1130 that receives the CKN and CKP clock signals and provides a clock signal 1132A and a complement clock signal 1132B. Interface controller circuitry 1140 within the receiver analog circuitry 910 provides an enable signal 1142 that controls the operation of the clock receiver circuitry 1130.

The clock signal 1132A clocks the ADC circuitry 1144, or other circuitry (for example, calibration circuitry), or both, as desired. Note that, rather than using the clock signal 1132A, one may use the complement clock signal 1132B, or both the clock signal 1132A and the complement clock signal 1132B, by making circuit modifications as persons skilled who have the benefit of the description of the invention understand. The ADC circuitry 1144 provides to multiplexer circuitry 1150 a one-bit differential in-phase digital signal 1146A and a one-bit differential quadrature digital signal 1146B. The multiplexer circuitry 1150 provides a one-bit differential digital output signal 1152 to data driver circuitry 1154. The output signal 1152 therefore constitutes multiplexed I-channel data and Q-channel data. The data driver circuitry 1154 supplies the differential data signal comprising ION and IOP to the receiver digital circuitry 905, using the configurable interface signal lines 960 and 965, respectively.

The clock signal 1132A also acts as the select signal of multiplexer circuitry 1150. On alternating edges of the clock signal 1132A, the multiplexer circuitry 1150 selects, and provides to, the data driver circuitry 1154 the one-bit differential in-phase digital signal 1146A (i.e., I-channel data) and the one-bit differential quadrature digital signal 1146B (i.e., Q-channel data). The interface controller circuitry 1140 supplies an enable signal 1156 to the data driver circuitry 1154 that controls the provision of the configurable interface signal 960 and the configurable interface signal 965 to the receiver digital circuitry 905 via the configurable interface signal lines 960 and 965.

The receiver digital circuitry 905 includes data receiver circuitry 1120. Data receiver circuitry 1120 accepts from the receiver analog circuitry 910 the signals provided via the configurable interface signal lines 960 and 965. The data receiver circuitry 1120 provides a pair of outputs 1122A and 1122B. An enable signal 1124, supplied by the interface controller circuitry 1116, controls the operation of the data receiver circuitry 1120.

The receiver digital circuitry 905 also includes a delay-cell circuitry 1119 that accepts as its inputs the clock signal 1112A and the complement clock signal 1112B. The delay-cell circuitry 1119 constitutes a delay-compensation circuit. In other words, ideally, the signal-propagation delay of the delay-cell circuitry 1119 compensates for the delays the signals experience as they propagate from the receiver digital circuitry 905 to the receiver analog circuitry 910, and back to the receiver digital circuitry 905.

The delay-cell circuitry 1119 provides as its outputs a clock signal 1121A and a complement clock signal 1121B. The clock signal 1121A and the complement clock signal 1121B clock a pair of D flip-flop circuitries 1123A and 1123B, respectively. The D flip-flop circuitries 1123A and 1123B latch the output 1122A of the data receiver circuitry 1120 alternately. In other words, the clock signal 1121A causes the latching of the I-channel data by the D flip-flop circuitry 1123A, whereas the complement clock signal 1121B causes the D flip-flop circuitry 1123B to latch the Q-channel data.

The output signals of the delay-cell circuitry 1119 help the receiver digital circuitry 905 to sample the I-channel data and the Q-channel data that it receives from the receiver analog circuitry 910. The receiver digital circuitry 905 receives multiplexed I-channel data and the Q-channel data through the ION signal 960 and the IOP signal 965. Thus, the D flip-flop circuitries 1123A and 1123B perform a de-multiplexing function on the multiplexed I-channel data and Q-channel data.

In the normal receive or transmit modes, (i.e., the control signal 915 is in the logic-high state), interface signal line 950 provides the negative clock signal (CKN) and interface signal line 955 supplies the positive clock signal (CKP). In preferred embodiments of the invention, the CKN and CKP signals together form a differential clock signal that the receiver digital circuitry 905 provides to the receiver analog circuitry 910.

During the receive mode, interface signal line 960 provides the negative data signal (ION), whereas interface signal line 965 supplies the positive data signal (IOP). The ION and IOP signals preferably form a differential data signal.

In the transmit mode, the data signal may function as an input/output signal to communicate data, status, information, flag, and/or configuration signals between the receiver digital circuitry 905 and the receiver analog circuitry 910. Preferably, the interface signal lines 960 and 965 function as two logic signal lines in the transmit mode. As noted above, the transceiver disables the receiver circuitry during the transmit mode of operation. In RF transceivers partitioned according to the invention (see, e.g., FIGS. 2A-2D, 4, and 8), the clock receiver circuitry 1130 may provide the clock signal 1132A, the complement clock signal 1132B, or both, to transmitter circuitry (partitioned together with the receiver analog circuitry 910) for circuit calibration, circuit adjustment, and the like, as described above.

In the transmit mode, once circuit calibration and adjustment has concluded, however, the clock driver circuitry 1114 uses the enable signal 1118 to inhibit the propagation of the CKN and CKP clock signals to the receiver analog circuitry 910. In this manner, the clock driver circuitry 1114 performs the function of the switch 492 in FIGS. 4 and 8. Note that, during the normal transmit mode of operation, the ADC circuitry 1144 does not provide any data to the receiver digital circuitry 905 via the ION and IOP signals because, according to the TDD protocol, the receiver path circuitry is inactive during the normal transmit mode of operation. Instead, the receiver digital circuitry 905 provides control signals to the receiver analog circuitry 910 via interface signal lines 960 and 965.

During the transmit mode, the interface controller circuitry 1116 provides control signals via signal lines 1160 to the interface signal lines 960 and 965. The interface controller circuitry 1140 receives the control signals via signal lines 1165 and provides them to various blocks within the receiver analog circuitry, as desired. During the receive mode, the interface controller circuitry 1116 inhibits (e.g., high-impedance state) the signal lines 1160. Similarly, the interface controller circuitry 1140 inhibits the signal lines 1165 during the receive mode.

For the purpose of conceptual illustration, FIG. 11A shows the interface controller circuitry 1116 and the interface controller circuitry 1140 as two blocks of circuitry distinct from the interface controller circuitry 1010 and the interface controller circuitry 1040 in FIG. 10, respectively. One may combine the functionality of the interface controller circuitry 1116 with the functionality of the interface controller circuitry 1010, as desired. Likewise, one may combine the functionality of interface controller circuitry 1140 with the functionality of the interface controller circuitry 1040, as desired. Moreover, one may combine the functionality of the signal processing circuitries 1110 with the functionality of the interface controller circuitry 1116 and the interface controller circuitry 1140, respectively. Combining the functionality of those circuits depends on various design and implementation choices, as persons skilled in the art understand.

Figure 11B:
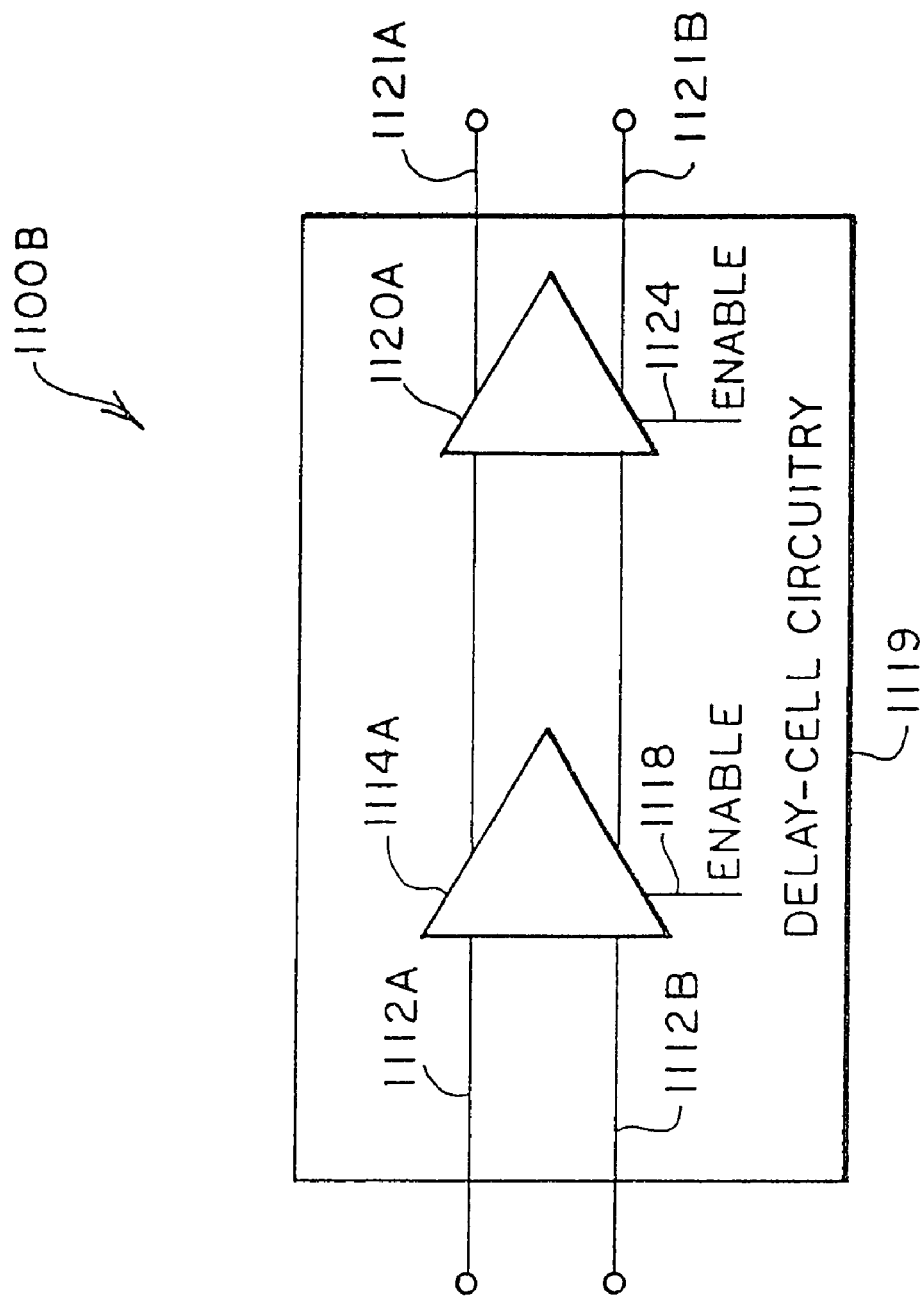
FIG. 11B illustrates a block diagram of an embodiment of a delay-cell circuitry that includes a clock driver circuitry in tandem with a clock receiver circuitry.

FIG. 11B illustrates a block diagram of a preferred embodiment 1100B of a delay-cell circuitry 1119 according to the invention. The delay-cell circuitry 1119 includes a replica of the clock driver circuitry 1114A in tandem with a replica of the data receiver circuitry 1120A. In other words, the block labeled "1114A" is a replica of the clock driver circuitry 1114, and the block labeled "1120A" is a replica of the data receiver circuitry 1120. (Note that the delay-cell circuitry 1119 may alternatively include a replica of the data driver circuitry 1154 in tandem with a replica of the clock receiver circuitry 1130.) The replica of the clock driver circuitry 1114A accepts the clock signal 1112A and the complement clock signal 1112B. The replica of the clock driver circuitry 1114A provides its outputs to the replica of the data receiver circuitry 1120A. The replica of the data receiver circuitry 1120A supplies the clock signal 1121A and the complement clock signal 1121B. The clock signal 1121A and the complement clock signal 1121B constitute the output signals of the delay-cell circuitry 1119. The delay-cell circuitry 1119 also receives as inputs enable signals 1118 and 1124 (note that FIG. 11A does not show those input signals for the sake of clarity). The enable signal 111 8 couples to the replica of the clock driver circuitry 1114A, whereas the enable signal 1124 couples to the replica of the data receiver circuitry 1120A.

Note that FIG. 11B constitutes a conceptual block diagram of the delay-cell circuitry 1119. Rather than using distinct blocks 1114A and 1120A, one may alternatively use a single block that combines the functionality of those two blocks, as desired. Moreover, one may use a circuit that provides an adjustable, rather than fixed, delay, as desired. Note also that the embodiment 1100B of the delay-cell circuitry 1119 preferably compensates for the delay in the clock driver circuitry 1114 in FIG. 11A. In other words, the delay-cell circuitry 1119 preferably compensates sufficiently for the round-trip delay in the signals that travel from the receiver digital circuitry 905 to the receiver analog circuitry 910 and back to the receiver digital circuitry 905 to allow for accurate sampling in the receiver digital circuitry of the I-channel data and the Q-channel data. Note that in the embodiment 1100B, the replica of the clock driver circuitry 1114A mainly compensates for the round-trip delay, whereas the replica of the data receiver circuitry 1120A converts low-swing signals at the output of the replica of the clock driver circuitry 1114A into full-swing signals.

The receiver digital circuitry 905 and the receiver analog circuitry 910 preferably reside within separate integrated-circuit devices. Because those integrated-circuit devices typically result from separate semiconductor fabrication processes and manufacturing lines, their process parameters may not match closely. As a result, the preferred embodiment 1100B of the delay-cell circuitry 1119 does not compensate for the delay in the clock receiver circuitry 1130, the data driver circuitry 1154, and the data receiver circuitry 1120 in FIG. 11A.

Note, however, that if desired, the delay-cell circuitry 1119 may also compensate for the signal delays of the clock receiver circuitry 1130, the data driver circuitry 1154, and the data receiver circuitry 1120. Thus, in situations where one may match the process parameters of the receiver digital circuitry 905 and the receiver analog circuitry 910 relatively closely (for example, by using thick-film modules, silicon-on-insulator, etc.), the delay-cell circuitry 1119 may also compensate for the delays of other circuit blocks. As another alternative, one may use a delay-cell circuitry 1119 that provides an adjustable delay and then program the delay based on the delays in the receiver digital circuitry 905 and the receiver analog circuitry 910 (e.g., provide a matched set of receiver digital circuitry 905 and receiver analog circuitry 910), as persons skilled in the art who have the benefit of the description of the invention understand. Furthermore, rather than an open-loop arrangement, one may use a closed-loop feedback circuit implementation (e.g., by using a phase-locked loop circuitry) to control and compensate for the delay between the receiver analog circuitry 910 and the receiver digital circuitry 905, as desired.

Note that the digital circuit blocks shown in FIGS. 11A and 11B depict mainly the conceptual functions and signal flow. The actual circuit implementation may or may not contain separately identifiable hardware for the various functional blocks. For example, one may combine the functionality of various circuit blocks into one circuit block, as desired.

Figure 12:
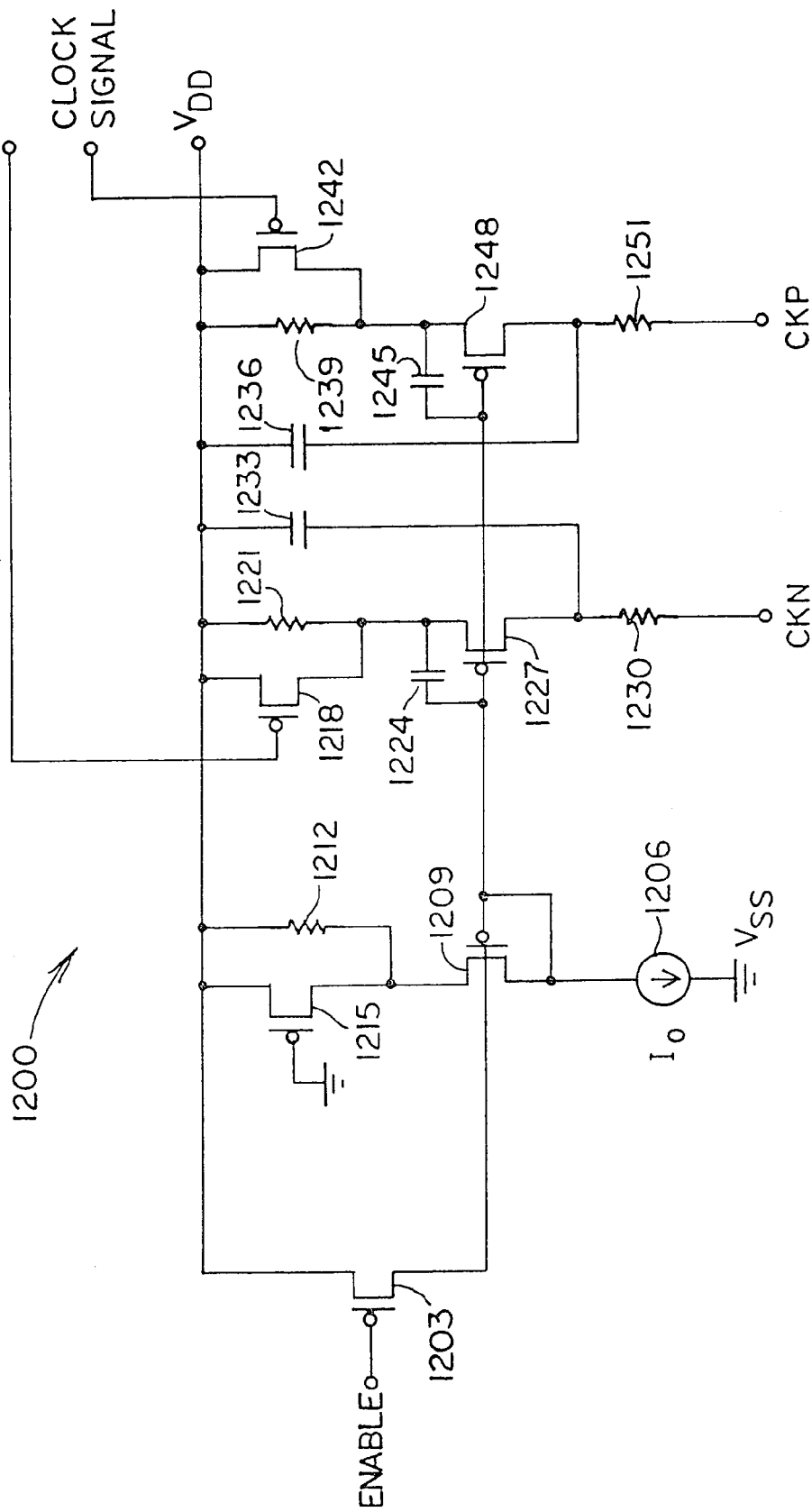
FIG. 12 depicts a schematic diagram of an embodiment of a signal-driver circuitry used to interface the receiver analog circuitry and the receiver digital circuitry according to the invention.

FIG. 12 shows a schematic diagram of a preferred embodiment 1200 of a signal-driver circuitry according to the invention. One may use the signal-driver circuitry as the clock driver circuitry 1114 and the data driver circuitry 1154 in FIG. 11A. In the latter case, the input signals to the signal-driver circuitry constitute the output signals 1152 and the enable signal 1156, whereas the output signals of the signal-receiver circuitry constitute the ION and IOP signals 960 and 965, respectively, in FIG. 11A.

The signal-driver circuitry in FIG. 12 constitutes two circuit legs. One circuit leg includes MOSFET devices 1218 and 1227 and resistor 1230. The second leg includes MOSFET devices 1242 and 1248 and resistor 1251. The input clock signal controls MOSFET devices 1218 and 1242. Current source 1206, MOSFET devices 1209 and 1215, and resistor 1212 provide biasing for the two circuit legs.

MOSFET devices 1227 and 1248 drive the CKN and CKP output terminals through resistors 1230 and 1251, respectively. Depending on the state of the clock signal, one leg of the signal-driver circuitry conducts more current than the other leg. Put another way, the signal-driver circuitry steers current from one leg to the other in response to the clock signal (i.e., in response to the clock signal, one leg of the circuit turns on and the other leg turns off, and vice-versa). As a result, the signal-driver circuitry provides a differential clock signal that includes current signals CKN and CKP.

If the enable signal is high, MOSFET device 1203 is off and therefore does not affect the operation of the rest of the circuit. In that case, a current $I_o$ flows through the current source 1206 and diode-connected MOSFET device 1209. The flow of current generates a voltage at the gate of MOSFET device 1209. MOSFET devices 1227 and 1248 share the same gate connection with MOSFET device 1209. Thus, MOSFET devices 1227 and 1248 have the same gate-source voltage, $V_{gs}$, as MOSFET device 1209 when the appropriate MOSFET devices are in the on state.

MOSFET devices 1218 and 1242 cause current steering between the first and second circuit legs. Only one of the MOSFET devices 1218 and 1242 is in the on state during the operation of the circuit. Depending on which MOSFET device is in the on state, the mirroring current $I_o$ flows through the circuit leg that includes the device in the on state.

Resistors 1221 and 1239 provide a small trickle current to the circuit leg that includes the MOSFET device (i.e., MOSFET device 1218 or MOSFET device 1242) that is in the off state. The small trickle current prevents the diode-connected MOSFET devices in the signal receiver circuitry (see FIG. 13) from turning off completely. The trickle current helps to reduce the delay in changing the state of the circuit in response to transitions in the input clock signal. The trickle currents also help to reduce transient signals at the CKP and CKN terminals and, thus, reduce interference effects.

Capacitors 1224 and 1245 provide filtering so that when MOSFET device 1218 and MOSFET device 1242 switch states, the currents through the first and second circuit legs (CKN and CKP circuit legs) do not change rapidly. Thus, capacitors 1224 and 1245 reduce the high-frequency content in the currents flowing through the circuit legs into the CKN and CKP terminals. The reduced high-frequency (i.e., band-limited) content of the currents flowing through the CKN and CKP terminals helps reduce interference effects to other parts of the circuit, for example, the LNA circuitries, as described above. Capacitors 1233 and 1236 and resistors 1230 and 1251 help to further reduce the high-frequency content of the currents flowing through the CKN and CKP terminals. Thus, the circuit in FIG. 12 provides smooth steering of current between the two circuit legs and therefore reduces interference effects with other circuitry.

When the enable signal goes to the low state, MOSFET device 1203 turns on and causes MOSFET device 1209 to turn off. MOSFET devices 1227 and 1248 also turn off, and the circuit becomes disabled. Note that the enable signal may be derived from the power-down PDNB signal.

Figure 13A:
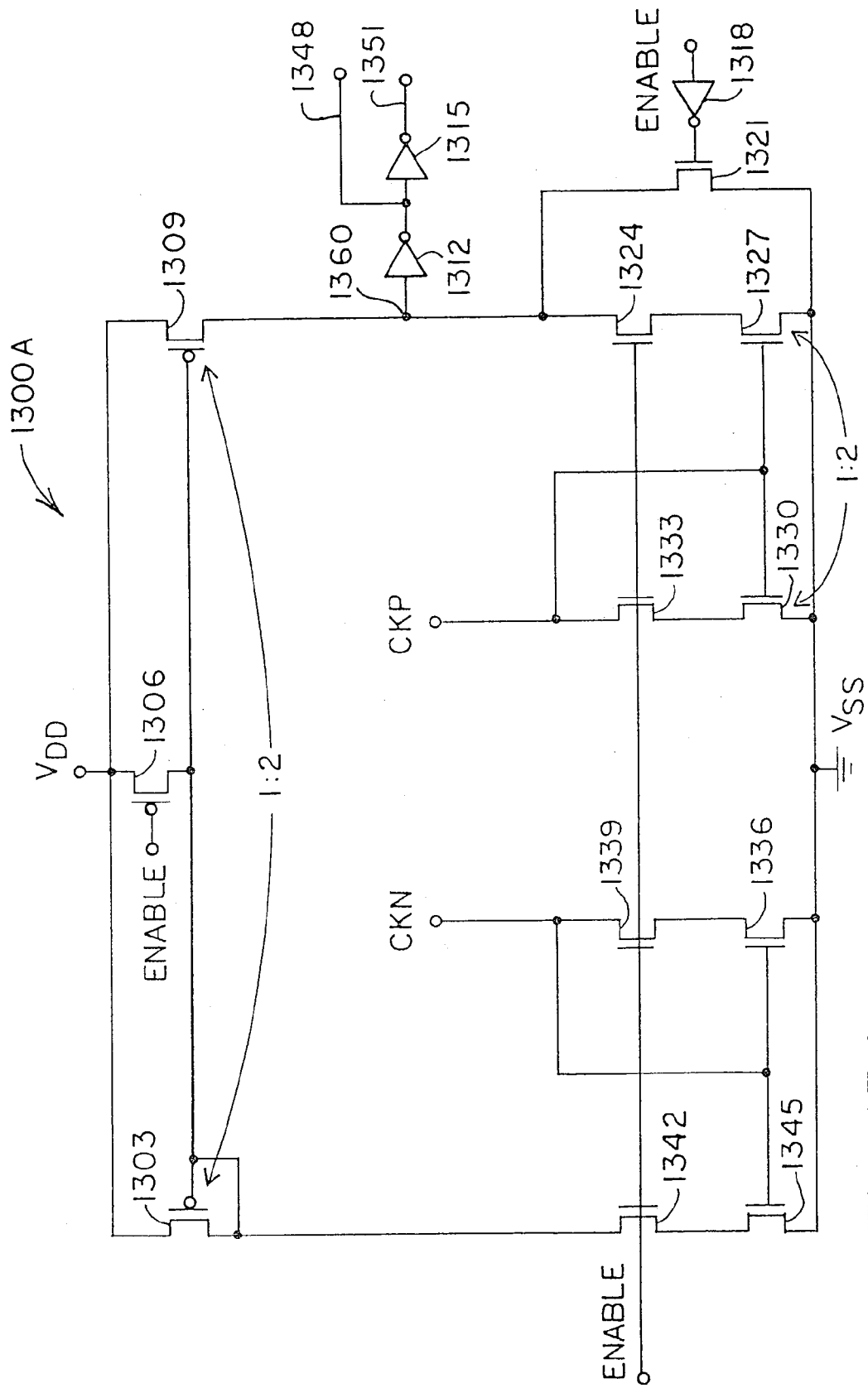
FIGS. 13A and 13B illustrate schematic diagrams of embodiments of signal-receiver circuitries used to interface the receiver analog circuitry and the receiver digital circuitry according to the invention.

FIG. 13A shows a schematic diagram of an exemplary embodiment 1300A of a signal-receiver circuitry according to the invention. One may use the signal-receiver circuitry as the clock receiver circuitry 1130 and the data receiver circuitry 1120 in FIG. 11A. In the latter case, the input signals to the signal-receiver circuitry constitute the ION and IOP signals 960 and 965 and the enable signal 1124, whereas the output signals constitute the signals at the outputs 1122A and 1122B, respectively, in FIG. 11A.

The signal receiver circuitry in FIG. 13A helps to convert differential input currents into CMOS logic signals. The signal-receiver circuitry in FIG. 13A constitutes two circuit legs. The first circuit leg includes MOSFET devices 1303, 1342, and 1345. The second leg includes MOSFET devices 1309, 1324, and 1327. Note that, preferably, the scaling of MOSFET devices 1303 and 1309 provides a current gain of 1:2 between them. Likewise, the scaling of MOSFET devices 1330 and 1327 preferably provides a current gain of 1:2 between them. The current gains help to reduce phase noise in the signal-receiver circuitry.

MOSFET devices 1339, 1342, 1333, and 1324 provide enable capability for the circuit. When the enable input is in the high state, MOSFET devices 1339, 1342, 1333, and 1324 are in the on state. MOSFET devices 1345 and 1336 are current mirrors, as are MOSFET devices 1303 and 1309. MOSFET devices 1330 and 1327 also constitute current mirrors.

The currents flowing through the CKN and CKP terminals mirror to the MOSFET devices 1327 and 1309. The actual current flowing through the second circuit leg depends on the currents that MOSFET device 1327 and MOSFET device 1309 try to conduct; the lower of the two currents determines the actual current that flows through the second circuit leg.

The difference between the currents that MOSFET device 1327 and MOSFET device 1309 try to conduct flows through the parasitic capacitance at node 1360. The current flow charges or discharges the capacitance at node 1360, thus making smaller the drain-source voltage ($V_{ds}$) of whichever of MOSFET devices 1327 and 1309 that seeks to carry the higher current. Ultimately, the lower of the currents that MOSFET devices 1327 and 1309 seek to conduct determines the current through the second leg of the circuit.

A pair of inverters 1312 and 1315 provide true and complement output signals 1351 and 1348, respectively. The signal receiver circuitry therefore converts differential input currents into CMOS logic output signals.

Figure 13B:
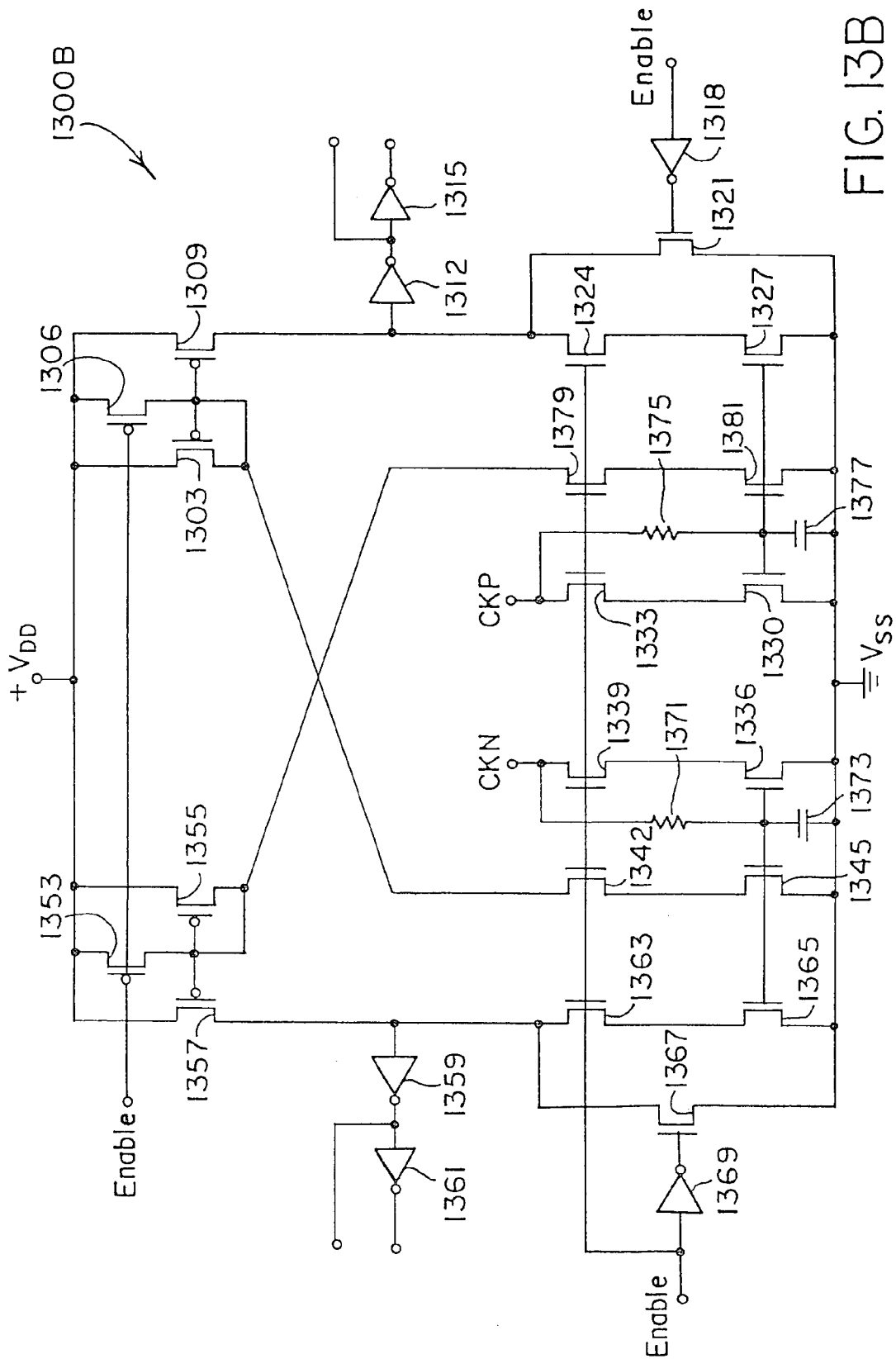

In exemplary embodiments of the invention, the signal receiver circuitry provides fully differential output signals. FIG. 13B shows an embodiment 1300B of such a signal receiver circuitry. One may use embodiment 1300B in a similar manner and application as embodiment 1300A, using the same input signals, as desired. Unlike embodiment 1300A, however, embodiment 1300B includes fully differential circuitry to generate fully differential output signals.

Embodiment 1300B includes the same devices as does embodiment 1300A, and the common devices operate in a similar manner. Furthermore, embodiment 1300B includes additional devices and components. Embodiment 1300B constitutes two circuit legs and replica of those circuit legs. The first circuit leg includes MOSFET devices 1303, 1342, and 1345. The replica of the first circuit leg includes devices 1355, 1379, and 1381. The second circuit leg includes MOSFET devices 1309, 1324, and 1327. The replica of the second circuit leg include devices 1357, 1363, and 1365. The scaling of MOSFET devices 1303 and 1309 provides a current gain of 1:2 between them, as does the scaling of MOSFET devices 1330 and 1327. Likewise, scaling of MOSFET devices 1355 and 1357 provides a current gain of 1:2 between them, as does the scaling of MOSFET devices 1336 and 1365. The current gains help to reduce phase noise in the signal-receiver circuitry.

Embodiment 1300B generally operates similarly to embodiment 1300A. Devices 1381, 1379, 1355, 1353, 1357, 1363, 1365, 1367, 1369, 1359, and 1361 perform the same functions as do devices 1345, 1342, 1303, 1306, 1309, 1324, 1327, 1321, 1318, 1312, and 1315, respectively. The enable function also operates similarly to embodiment 1300A. Resistors 1371 and 1375 and capacitors 1373 and 1377 filter the input clock (e.g., 13 MHz clock). Inverters 1312, 1315, 1361, and 1359 provide fully differential true and complement output signals.

Figure 14:
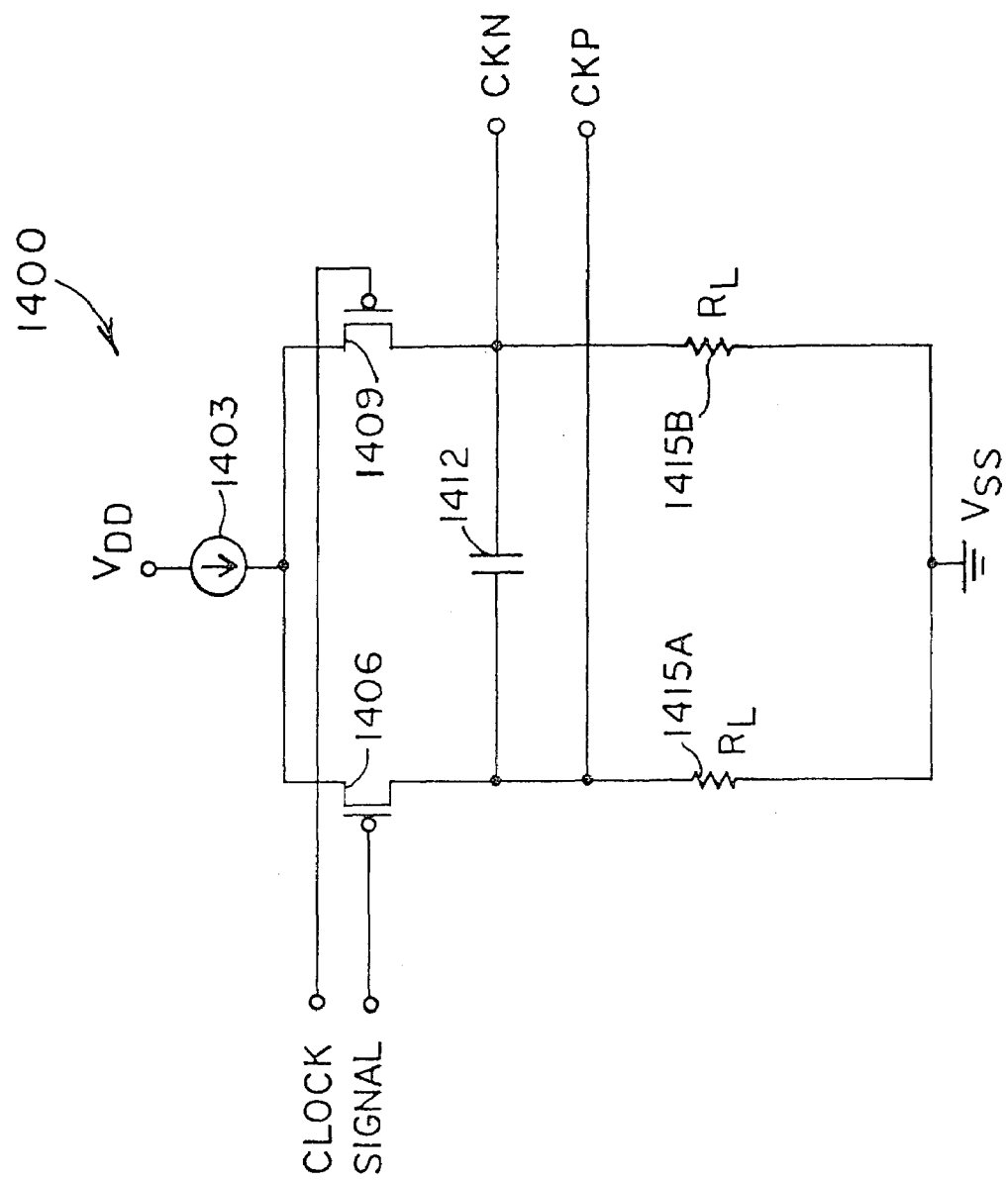
FIG. 14 shows a schematic diagram of another signal-driver circuitry that one may use to interface the receiver analog circuitry and the receiver digital circuitry according to the invention.

FIG. 14 shows an embodiment 1400 of an alternative signal-driver circuitry according to the invention. The signal-driver circuitry in FIG. 14 includes two circuit legs. The first circuit leg includes MOSFET device 1406 and resistor 1415A. The second circuit leg includes MOSFET device 1409 and resistor 1415B. A current source 1403 supplies current to the two circuit legs.

The input clock signal controls MOSFET devices 1406 and 1409. MOSFET devices 1406 and 1409 drive the CKP and CKN output terminals, respectively. Depending on the state of the clock signal, one leg of the signal-driver circuitry conducts current. Put another way, the signal-driver circuitry steers current from one leg to the other in response to the clock signal. As a result, the signal-driver circuitry provides a differential clock signal that includes signals CKN and CKP. Capacitor 1412 filters the output signals CKN and CKP. Put another way, capacitor 1412 provides band-limiting of the output signals CKN and CKP. Note that the current source 1403 supplies limited-amplitude signals by providing current through resistors 1415A and 1415B.

Note that the signal-driver circuitries (clock driver and data driver circuitries) according to the invention preferably provide current signals CKN and CKP. Similarly, signal-receiver circuitries (clock receiver and data receiver circuitries) according to the invention preferably receive current signals. As an alternative, one may use signal-driver circuitries that provide as their outputs voltage signals, as desired. One may also implement signal-receiver circuitries that receive voltage signals, rather than current signals. As noted above, depending on the application, one may limit the frequency contents of those voltage signals, for example, by filtering, as desired.

Generally, several techniques exist for limiting noise, for example, digital switching-noise, in the interface between the receiver analog circuitry and the receiver digital circuitry according to the invention. Those techniques include using differential signals, using band-limited signals, and using amplitude-limited signals. RF apparatus according to the invention may use any or all of those techniques, as desired. Furthermore, one may apply any or all of those techniques to interface circuitry that employs voltage or current signals, as persons of ordinary skill in the art who have the benefit of the description of the invention understand.

Note also that the RF transceiver embodiments according to the invention lend themselves to various choices of circuit implementation, as a person skilled in the art who have the benefit of the description of the invention understand. For example, as noted above, each of the circuit partitions, or circuit blocks, of RF transceivers partitioned according to the invention, resides preferably within an integrated circuit device. Persons skilled in the art, however, will appreciate that the circuit partitions, or circuit blocks, may alternatively reside within other substrates, carriers, or packaging arrangements. By way of illustration, other partitioning arrangements may use modules, thin-film modules, thick-film modules, isolated partitions on a single substrate, circuit-board partitions, and the like, as desired, consistent with the embodiments of the invention described here.

One aspect of the invention contemplates partitioning RF transceivers designed to operate within several communication channels (e.g., GSM, PCS, and DCS). Persons skilled in the art, however, will recognize that one may partition according to the invention RF transceivers designed to operate within one or more other channels, frequencies, or frequency bands, as desired.

Moreover, the partitioning of RF transceivers according to the invention preferably applies to RF apparatus (e.g., receivers or transceivers) with a low-IF, digital-IF architecture.

Note, however, that one may apply the partitioning and interfacing concepts according to the invention to other RF receiver or transceiver architectures and configurations, as persons of ordinary skill in the art who have the benefit of the description of the invention understand. By way of illustration, one may use the partitioning and interface concepts according to the invention in RF apparatus that includes:

low-IF receiver circuitry;
low-IF receiver circuitry and offset-PLL transmitter circuitry;
low-IF receiver circuitry and direct up-conversion transmitter circuitry;
direct-conversion receiver circuitry;
direct-conversion receiver circuitry and offset-PLL transmitter circuitry; or
direct-conversion receiver circuitry and direct up-conversion transmitter circuitry.

As an example of the flexibility of the partitioning concepts according to the invention, one may include the LO circuitry in one partition, the receiver digital circuitry in a second partition, and the transmitter up-converter circuitry and the receiver analog circuitry in a third partition. As another illustrative alternative, one may include the LO circuitry and the transmitter up-converter circuitry within one circuit partition, depending on the noise and interference characteristics and specifications for a particular implementation.

Note that, in a typical direct-conversion RF receiver or transceiver implementation, the receiver digital circuitry would not include the digital down-converter circuitry (the receiver analog circuitry, however, would be similar to the embodiments described above). Furthermore, in a typical direct up-conversion transmitter circuitry, one would remove the offset PLL circuitry and the transmit VCO circuitry from the transmitter circuitry. The LO circuitry would supply the RF LO signal to the up-conversion circuitry of the transmitter circuitry, rather than the offset-PLL circuitry. Also, in a direct up-conversion implementation, the LO circuitry typically does not provide an IF LO signal.

Furthermore, as noted above, one may use the partitioning and interface concepts according to the invention not only in RF transceivers, but also in RF receivers for high-performance applications. In such RF receivers, one may partition the receiver as shown in FIGS. 2A-2D and 4-8, and as described above. In other words, the RF receiver may have a first circuit partition that includes the receiver analog circuitry, and a second circuit partition that includes the receiver digital circuitry.

The RF receiver may also use the digital interface between the receiver analog circuitry and the receiver digital circuitry, as desired. By virtue of using the receiver analog circuitry and the receiver digital circuitry described above, the RF receiver features a low-IF, digital-IF architecture. In addition, as noted above with respect to RF transceivers according to the invention, depending on performance specifications and design goals, one may include all or part of the local oscillator circuitry within the circuit partition that includes the receiver analog circuitry, as desired. Partitioning RF receivers according to the invention tends to reduce the interference effects between the circuit partitions.

As noted above, although RF apparatus according to the invention use a serial interface between the receiver analog circuitry and the receiver digital circuitry, one may use other types of interface, for example, parallel interfaces, that incorporate different numbers of signal lines, different types and sizes of signals, or both, as desired. Moreover, the clock driver circuitries and the data driver circuitries may generally constitute signal-driver circuitries that one may use in a variety of digital interfaces between the receiver analog circuitry and the receiver digital circuitry according to the invention.

Likewise, the clock receiver circuitries and data receiver circuitries may generally constitute signal-receiver circuitries that one may use in a variety of digital interfaces between the receiver analog circuitry and the receiver digital circuitry according to the invention. In other words, one may use signal-driver circuitries and signal-receiver circuitries to implement a wide variety of digital interfaces, as persons of ordinary skill who have the benefit of the description of the invention understand.

As described above in detail, RF apparatus (such as receivers and transceivers) perform some of the processing of the input RF signal in the digital domain and provide resulting digital signals, for example, to a baseband processor circuitry. The receiver digital circuitry according to the invention, such as receiver digital circuitry shown in FIGS. 2 and 4-8, performs several tasks as described below in detail.

First, in certain interfaces where the baseband processor circuitry accepts analog signals, the receiver digital circuitry may convert the processed digital signals to analog output signals, as desired. Second, the receiver digital circuitry translates the signal spectrum from an intermediate frequency to baseband (i.e., centered around zero frequency or DC). Third, the receiver digital circuitry applies a programmable gain to the processed signals so that the amplitude of its output signals falls within a certain range suitable for the baseband processor circuitry, as desired. Fourth, the receiver digital circuitry removes residual DC offsets that result from non-ideal circuit behavior in the receiver analog circuitry. The removal of the residual DC offsets according to the invention operates in the presence of interference signals (e.g., interferers and blockers) and the desired signal. Fifth, the receiver digital circuitry filters out undesired energy present in its input signals.

The undesired energy may originate from a number of sources, such as the quantization noise of the ADC circuitry in the receiver analog circuitry (see FIGS. 2 and 4-8 and their respective discussions), and RF noise and spurious signals. The undesired RF energy may fall within the signal band of interest, as well as outside of it.

The RF noise and spurious signals include interferers and blockers. GSM specification provide a for a channel spacing of 200 kHz. An interferer constitutes a signal in the desired signal band of interest that results from another GSM user's operation of RF apparatus that inject energy within the RF spectrum. Blockers refer to spurious RF signals that originate from apparatus that operates outside or inside the GSM band. Blockers may result from other RF apparatus, such as military radios, global positioning satellite (GPS) systems, and other users of the electromagnetic spectrum. The digital filter circuitry in the receiver digital circuitry filters and attenuates energy from interferers and blockers.

Figure 15:
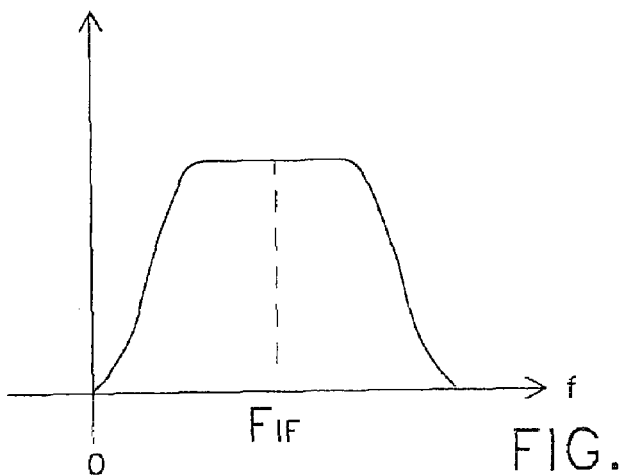
FIG. 15 depicts a portion of a typical spectrum in exemplary embodiments of the invention of the output signal of the receiver analog circuitry that includes the desired signal.

The quantization noise of the ADC circuitry constitutes another source of undesired energy. Exemplary embodiments of RF apparatus according to the invention include measures that aim to reduce interference with the desired signal by the quantization noise of the ADC circuitry. FIG. 15 shows a typical plot of the spectrum of the signal of interest that constitutes part of the output signal of the receiver analog circuitry. As noted above, exemplary embodiments of the invention employ a 100 kHz IF frequency. In FIG. 15, the spectrum of the signal of interest spans a 200 kHz band of frequencies from DC to +200 kHz. The spectrum centers around the IF frequency, $f_{IF}$. The quantization noise of the ADC circuitry appears mainly below DC and above 200 kHz.

Figure 16:
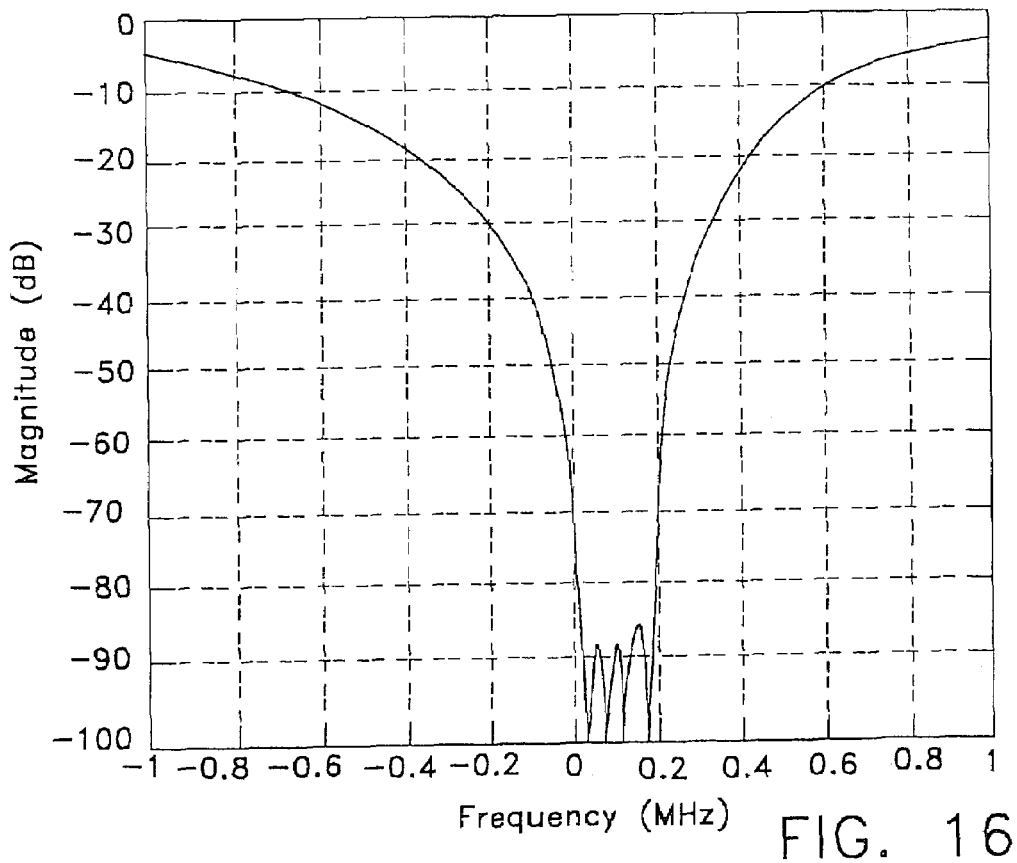
FIG. 16 illustrates a typical plot of the quantization noise transfer function of the analog-digital converter circuitries in exemplary embodiments of the invention.

To reduce interference with the desired signal band, the sigma-delta ADC circuitry in exemplary embodiments of RF apparatus according to the invention employ noise-shaping techniques. The noise-shaping techniques shape the characteristics of the quantization noise of the ADC circuitry so as to move the quantization noise out of the signal band of interest, e.g., DC to 200 kHz. FIG. 16 shows a typical plot of the quantization noise power density for the ADC circuitry in exemplary embodiments of the invention. Note that the quantization noise within the signal band of interest is several orders of magnitude lower than outside the signal band of interest.

As noted above, sigma-delta ADC circuitry provide one-bit digital outputs to the receiver digital circuitry. Those output signals constitute over-sampled digital signals. Typically, reducing quantization noise results from using more resolution (i.e., more bits) in the ADC circuitry. By using sigma-delta ADC circuitry, however, RF apparatus according to the invention spectrally shape the quantization noise so that it occupies frequency bands outside the signal band of interest, as persons skilled in the art who read this disclosure will understand.

Figure 17A:
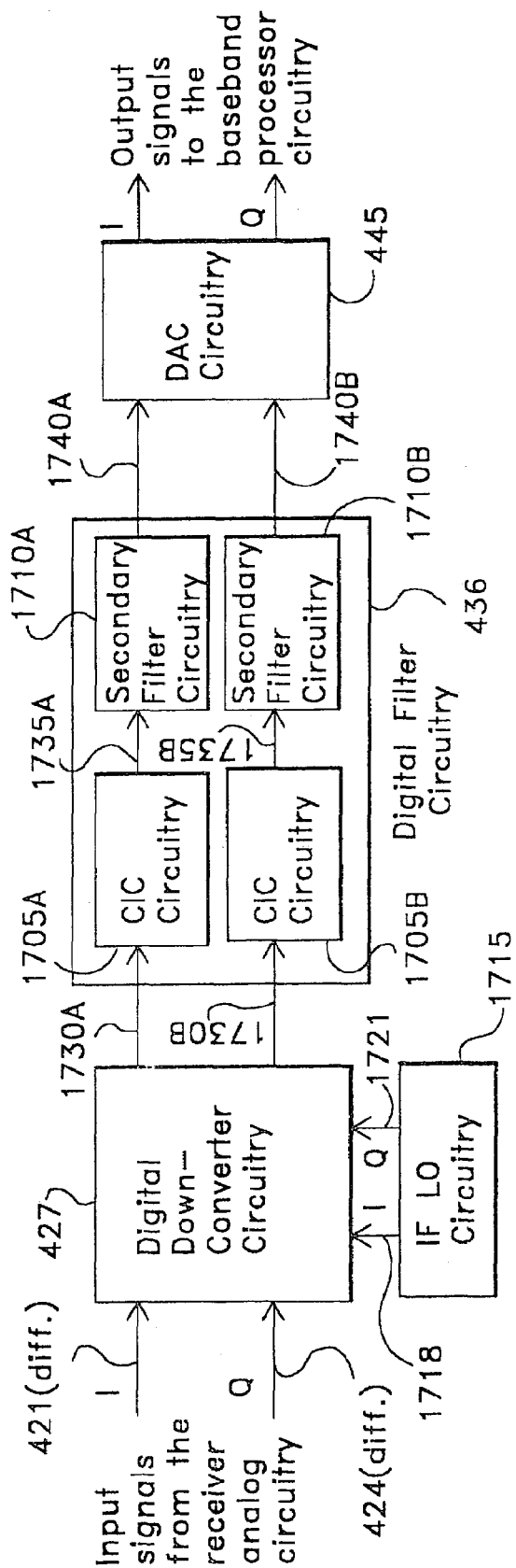
FIG. 17A shows a conceptual or functional block diagram that provides more details of a receiver digital circuitry according to the invention.
Figure 17B:
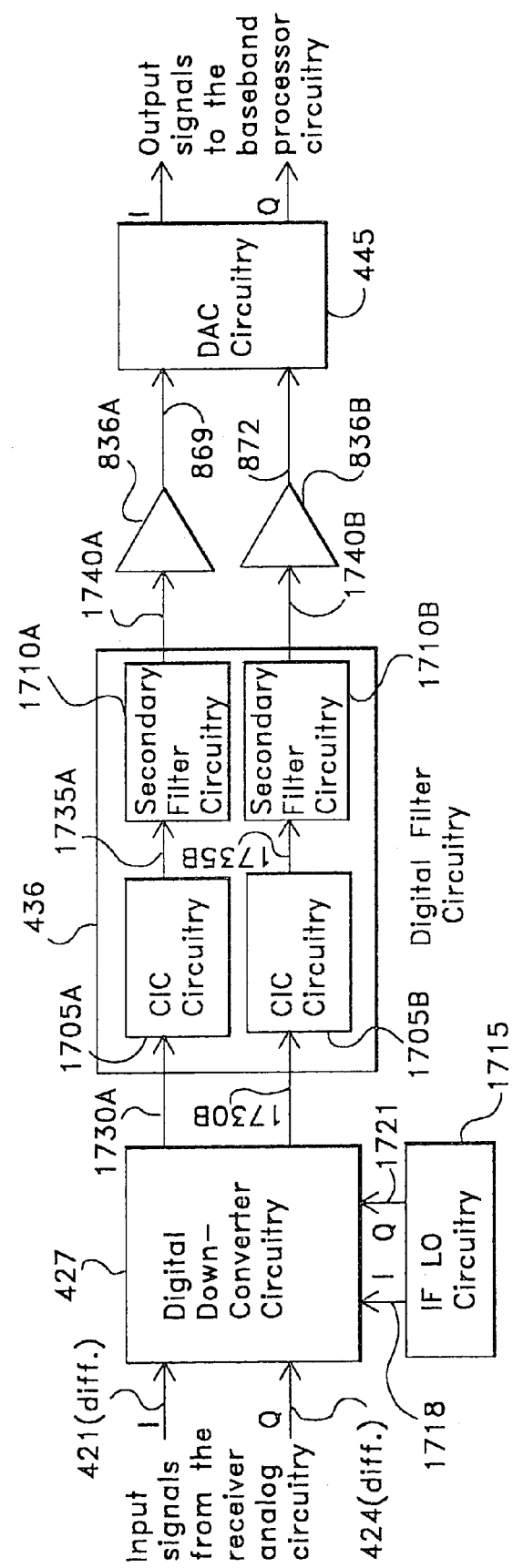
FIG. 17B illustrates a conceptual or functional block diagram that provides more details of a receiver digital circuitry according to the invention that includes programmable-gain amplifier circuitries.

Once it has received the one-bit in-phase and quadrature signals from the receiver analog circuitry, the receiver digital circuitry performs signal processing operations on those signals. FIGS. 17A and 17B show more detailed conceptual or functional block diagrams of exemplary embodiments of receiver digital circuitry according to the invention. Note that one may use either of receiver digital circuitry in FIG. 17A or the receiver digital circuitry in FIG. 17B as the receiver digital circuitries shown in FIGS. 2 and 4-8. FIG. 17A illustrates a conceptual or functional block diagram of a receiver digital circuitry that includes a cascade of digital down-converter 427, digital filter circuitry 436, and optional DAC circuitry 445 (for interfacing to baseband processor circuitries that accept analog input signals, as described above). IF LO circuitry 1715 couples to digital down-converter circuitry 427 and provides IF LO in-phase signal 1718 and IF LO quadrature signal 1721 to the digital down-converter circuitry 427.

The digital filter circuitry 436 includes cascaded integrator/comb (CIC) filter circuitry 1705A, secondary filter circuitry 1710A, CIC filter circuitry 1705B, and secondary filter circuitry 1710B. CIC filter circuitry 1705A and secondary filter circuitry 1710A provide the in-phase signal path within the digital filter circuitry 436. Similarly, CIC filter circuitry 1705B and secondary filter circuitry 1710B provide the quadrature signal path within the digital filter circuitry 436.

FIG. 17B shows a conceptual or functional block diagram of another receiver digital circuitry according to the invention. The receiver digital circuitry in FIG. 17B includes a cascade of digital down-converter circuitry 427, digital filter circuitry 436, PGA circuitries 836A-836B, and optional DAC circuitry 445 (for interfacing to baseband processor circuitries that accept analog input signals, as described above). IF LO circuitry 1715 couples to digital down-converter circuitry 427 and provides IF LO in-phase signal 1718 and IF LO quadrature signal 1721 to the digital down-converter circuitry 427.

The digital filter circuitry 436 includes cascaded integrator/comb (CIC) filter circuitry 1705A, secondary filter circuitry 1710A, CIC filter circuitry 1705B, and secondary filter circuitry 1710B. CIC filter circuitry 1705A and secondary filter circuitry 1710A provide the in-phase signal path within the digital filter circuitry 436. Similarly, CIC filter circuitry 1705B and secondary filter circuitry 1710B provide the quadrature signal path within the digital filter circuitry 436. PGA circuitry 836A provides programmable gain for the in-phase signal path within the receiver digital circuitry. Likewise, PGA circuitry 836B provides programmable gain for the quadrature signal path of the receiver digital circuitry.

One may control the programmable gain of PGA circuitries 836A-836B in a variety of ways, as desired. In exemplary embodiments of the invention, the baseband processor circuitry (not shown explicitly in the figure) controls the PGA circuitries 836A-836B in order to keep the signals provided to the baseband circuitry within a certain range. To do so, the baseband processor circuitry uses a gain-control algorithm that modifies the gain of the PGA circuitries 836A-836B depending on the level of the signals that the receiver digital circuitry provides to the baseband circuitry. In other words, if the level of those signals is too low, the baseband circuitry increases the gain of the PGA circuitry 836A and/or 836B, and vice-versa. The details of the gain-control algorithm depend on the specifics of the baseband processor implementation, as persons of ordinary skill in the art would understand.

Figure 18A:
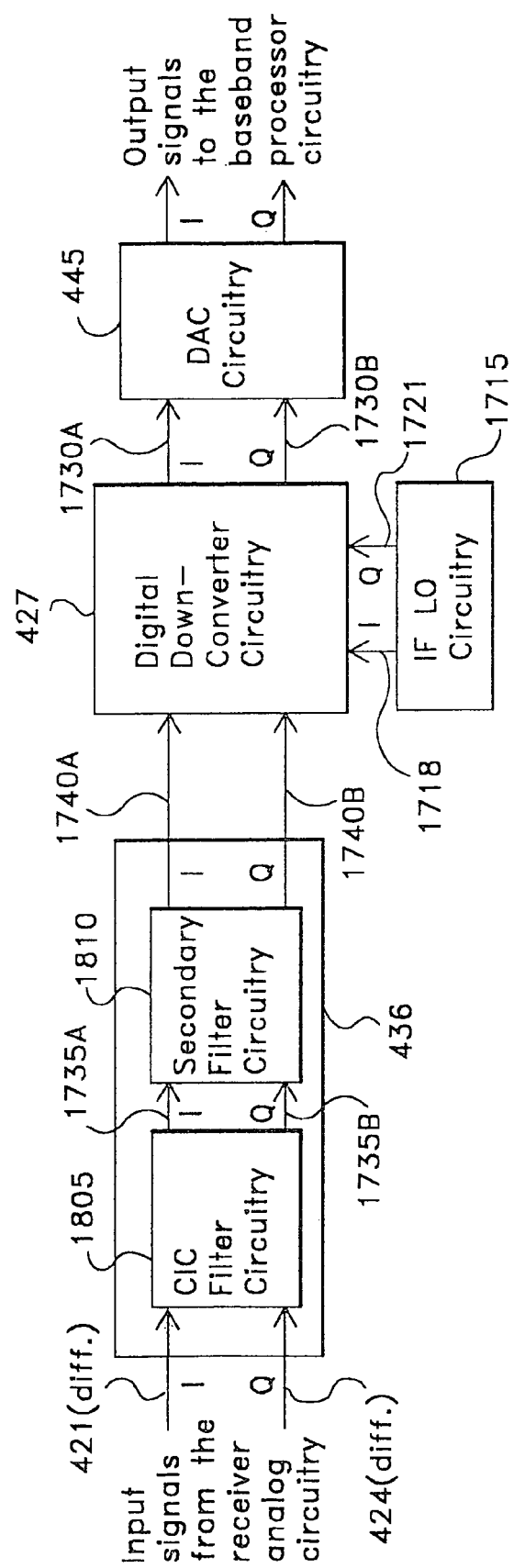
FIG. 18A depicts a conceptual or functional block diagram that provides more details of an alternative architecture for a receiver digital circuitry according to the invention.
Figure 18B:
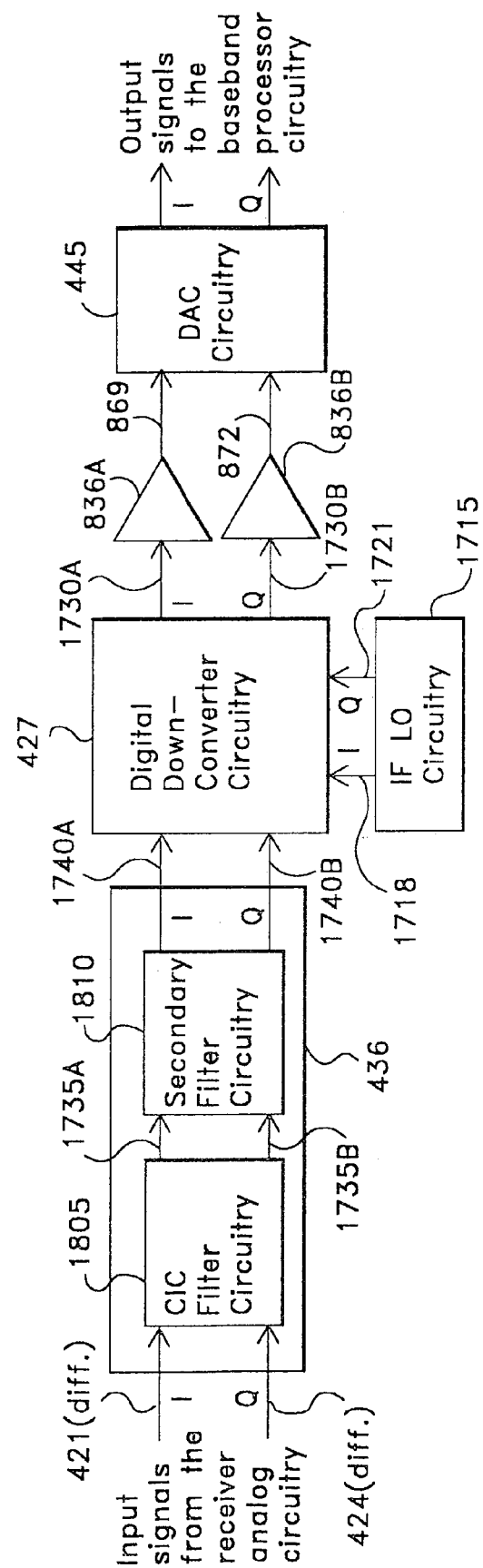
FIG. 18B shows a conceptual or functional block diagram that provides more details of an alternative architecture for a receiver digital circuitry according to the invention that includes programmable-gain amplifier circuitries.

One may use in RF apparatus according to the invention receiver digital circuitry with architectures different than shown in FIGS. 17A-17B. For example, FIGS. 18A and 18B show conceptual or functional block diagrams of alternative architectures of receiver digital circuitries for use in exemplary embodiments of the invention. Conceptually, the circuit arrangements shown in FIGS. 18A and 18B change the order of processing that the circuits in FIGS. 17A and 17B perform on the signals they receive from the receiver analog circuitry. Note that one may use either of receiver digital circuitry in FIG. 18A or the receiver digital circuitry in FIG. 18B as the receiver digital circuitries shown in FIGS. 2 and 4-8.

FIG. 18A illustrates a conceptual or functional block diagram of a receiver digital circuitry that includes a cascade of digital filter circuitry 436, digital down-converter 427, and optional DAC circuitry 445 (for interfacing to baseband processor circuitries that accept analog input signals, as described above). IF LO circuitry 1715 couples to digital down-converter circuitry 427 and provides IF LO in-phase signal 1718 and IF LO quadrature signal 1721 to the digital down-converter circuitry 427.

Similar to the circuit in FIG. 17A, the digital filter circuitry 436 in FIG. 18A includes complex CIC filter circuitry 1805 and complex secondary filter circuitry 1810. Unlike the circuit in FIG. 17A, however, the receiver digital circuitry in FIG. 18A first filters the input signals using the digital filter circuitry 436 and then mixes down the filtered signal to baseband by using the digital down-converter circuitry 427.

FIG. 18B shows a conceptual or functional block diagram of an alternative architecture for a receiver digital circuitry according to the invention. Similar to the circuit arrangement in FIG. 17B, the receiver digital circuitry in FIG. 18B includes a cascade of digital filter circuitry 436, digital down-converter circuitry 427, PGA circuitries 836A-836B, and optional DAC circuitry 445 (for interfacing to baseband processor circuitries that accept analog input signals, as described above), but in a different order. Like the circuit in FIG. 17B, the digital filter circuitry 436 in FIG. 18B includes CIC filter circuitry 1805 and secondary filter circuitry 1810. IF LO circuitry 1715 couples to digital down-converter circuitry 427 and provides IF LO in-phase signal 1718 and IF LO quadrature signal 1721 to the digital down-converter circuitry 427.

PGA circuitry 836 provides programmable gain for the in-phase signal path within the receiver digital circuitry. Likewise, PGA circuitry 836B provides programmable gain for the quadrature signal path of the receiver digital circuitry. Similar to FIG. 17B described above, in exemplary embodiments of the invention, the baseband processor circuitry (not shown explicitly in the figure) controls the PGA circuitries 836A-836B in FIG. 18B in order to keep the signals provided to the baseband circuitry within a certain range. To accomplish that goal, the baseband processor circuitry uses a gain-control algorithm that changes the gain of the PGA circuitries 836A-836B depending on the level of the signals that the receiver digital circuitry provides to the baseband circuitry. In other words, if the level of those signals is too low, the baseband circuitry increases the gain of the PGA circuitries 836A and/or 836B, and vice-versa. The details of the gain-control algorithm depend on the specifics of the baseband processor implementation, as persons of ordinary skill in the art would understand.

As an alternative to the arrangement shown in FIG. 18B, one may place the PGA circuitries 836A-836B between the secondary filter circuitry 1810 and the digital down-converter circuitry 427. By using feedback automatic gain control (AGC) to keep a constant level, the alternative embodiment reduces the number of signal bits provided to the digital down-converter circuitry 427. Consequently, one may implement the digital down-converter circuitry 427 in a simpler, less expensive manner.

Generally, note that one may re-use hardware resources to implement the PGA circuitries 836A-836B (for example, by using a multiplier circuitry within a DSP engine, as described below in detail) in various embodiments of the invention, as desired. By doing so, one may obtain improved signal flow. Furthermore, exemplary embodiments of the invention use IIR-type filter circuitries as the secondary filter circuitries. One, however, may use other types of filters, as desired. For example, one may use FIR, time-varying, non-linear filter circuitries, or complex filter structures. The choice of the type of filter depends on various performance and design criteria, such as magnitude and group delay response, power consumption, use of silicon area, etc., as persons of ordinary skill in the art would understand.

Note that, unlike conventional circuits, RF receivers or transceivers according to the invention provide channelization filtering within the receiver circuitry itself. Conventional circuits provide channelization filtering as part of the baseband processor circuitry that accompanies the RF circuitry. RF receivers or transceivers according to the invention, however, provide channelization filtering within the receiver digital circuitry. The CIC filter circuitry and the secondary filter circuitry within the receiver digital circuitry perform channelization filtering. In other words, they transmit the desired signal channel while rejecting other users' channels and interfering signals.

Providing channelization filtering within the RF circuitry reduces the processing load on the baseband processor circuitry. Furthermore, where the baseband processor circuitry accepts analog signals from the RF circuitry, providing channelization filtering within the RF circuitry overcomes the requirement for the DAC circuitries at the output of the RF circuitry to cope with adjacent channel signals. Consequently, one may use cheaper, less complex, or smaller DAC circuitries and/or baseband processor circuitries.

Figure 19:
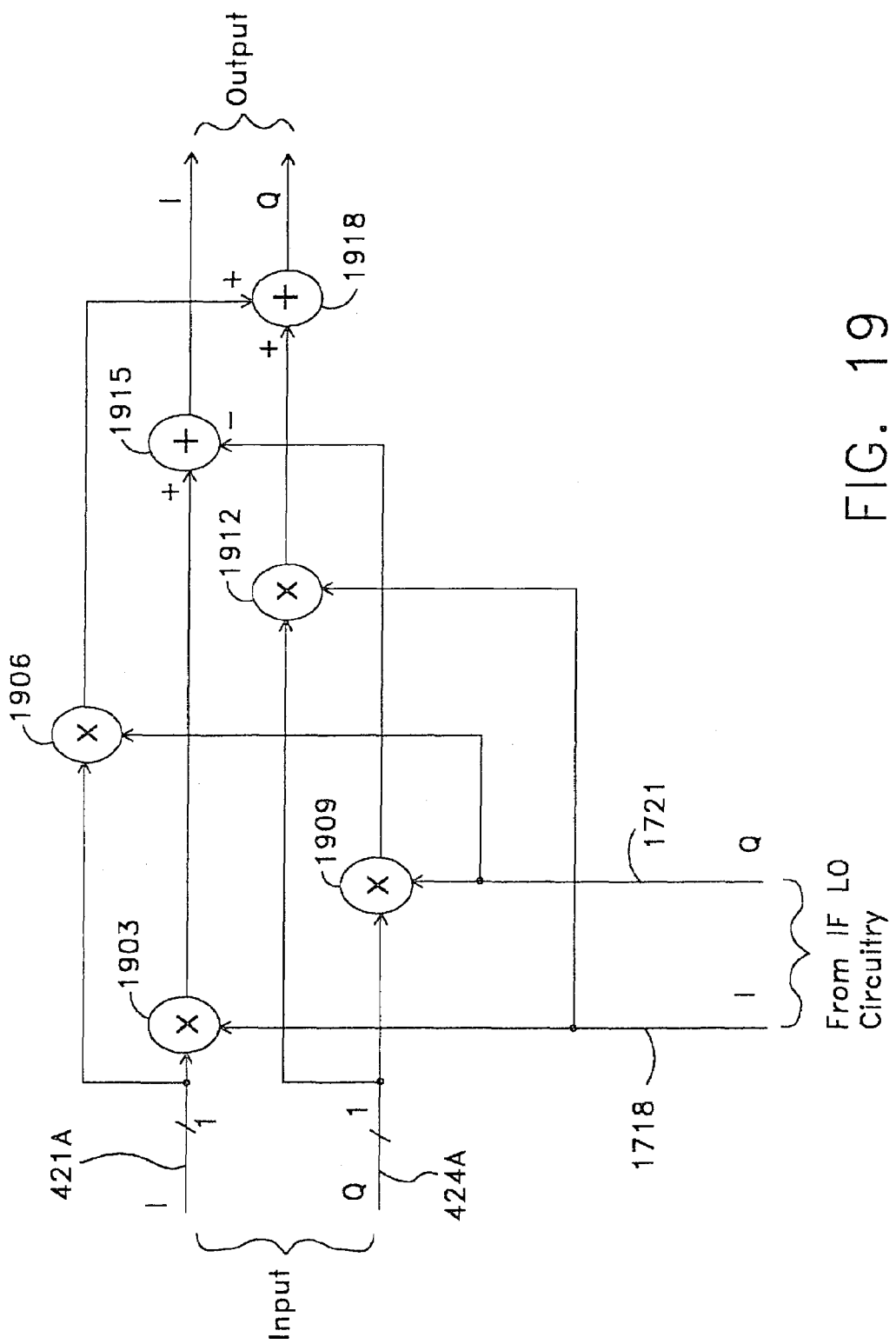
FIG. 19 illustrates a conceptual or functional block diagram of an exemplary embodiment of a digital down-converter circuitry for use in receiver digital circuitry according to the invention.

FIG. 19 provides a conceptual or functional signal flow-diagram of the digital down-converter circuitry 427. One may use the digital down-converter circuitry of FIG. 19 in the RF apparatus shown in FIGS. 2 and 4-8, as desired. The digital down-converter circuitry 427 includes four multiplier circuitries 1903, 1906, 1909, and 1912. The digital down-converter circuitry also includes two combiner circuitries 1915 and 1918. The multiplier circuitries 1903, 1906, 1909, and 1912 perform a fully complex multiplication of the input signals from the receiver analog circuitry (i.e., single-ended versions of the in-phase digital receive signal 421 and the quadrature digital receive signal 424) with the input signals from the IF LO (i.e., the IF LO in-phase signal 1718 and the IF LO quadrature signal 1721). Table 4 below lists the input operands to each of the multiplier circuitries 1903, 1906, 1909, and 1912. Signals 421A and 424A represent single-ended versions of the differential one-bit in-phase and quadrature digital receive signals 421 and 424, respectively.

TABLE 4

| Multiplier Circuitry | First Operand | Second Operand |
|---|---|---|
| 1903 | In-phase digital receive signal 421A | IF LO in-phase signal 1718 |
| 1906 | In-phase digital receive signal 421A | IF LO quadrature signal 1721 |
| 1909 | Quadrature digital receive signal 424A | IF LO quadrature signal 1721 |
| 1912 | Quadrature digital receive signal 424A | IF LO in-phase signal 1718 |

Combiner circuitry 1915 subtracts the output of multiplier circuitry 1909 from the output of multiplier circuitry 1903 to generate the in-phase output signal of the digital down-converter circuitry 427. Combiner circuitry 1918 adds together the output signals of multiplier circuitry 1906 and multiplier circuitry 1912 to provide the quadrature output signal of the digital down-converter 427. Note that this circuit arrangement applies to a signal centered at $+f_{IF}$. For a signal centered at $-f_{IF}$, one may switch around the operands applied to the combiner circuitries 1915 and 1918.

Note that the in-phase digital receive signal 421 and the quadrature digital receive signal 424 are one-bit digital signals. In exemplary embodiments of the invention, the in-phase and quadrature digital receive signals 421 and 424 have numerical values of +1 and −1, which map to binary logic zero and one levels. Note that one may assign the numerical values and the corresponding binary logic values to the in-phase and quadrature digital receive signals 421 and 424, as desired. The IF LO in-phase signal 1718 and the IF LO quadrature signal 1721 are multi-bit digital signals. Consequently, the output signals of the multiplier circuitries 1903, 1906, 1909, and 1912 are multi-bit digital signals.

As noted above, one of the operands for each of the multiplier circuitries 1903, 1906, 1909, and 1912 constitutes a one-bit digital signal (i.e., the in-phase digital receive signal 421 and quadrature digital receive signal 424). As a result, the digital down-converter circuitry 427 according to the invention may employ simple circuit arrangements to implement multiplier circuitries 1903, 1906, 1909, and 1912, rather than full multiplier circuitries. In exemplary embodiments, the multiplier circuitries 1903, 1906, 1909, and 1912 include circuitry that conditionally changes the sign of the other respective operand to multiplier circuitries 1903, 1906, 1909, and 1912 (i.e., the IF LO in-phase signal 1718 and the IF LO quadrature signal 1721). In other words, in this embodiment, each of the multiplier circuitries 1903, 1906, 1909, and 1912 maps the two logic levels of the in-phase digital receive signal 421 and quadrature digital receive signal 424 to either +1 or −1, respectively, and changes the sign of the IF LO in-phase signal 1718 and the IF LO quadrature signal 1721 accordingly. This implementation results in simplified structures for the digital down-converter circuitry 427 and, thus, hardware, power, and cost savings.

By using the architectures shown in FIG. 18 rather than the architectures in FIG. 17, one may trade off the simplicity in the digital down-converter circuitry 427 for simplicity in the digital filter circuitry 436. In other words, the digital filter circuitries 436 in FIG. 18 receive one-bit signals 421 and 424 from the receiver analog circuitry. Because the digital filter circuitries 436 operate on one-bit, rather than multiple-bit signals, they may have a simplified architecture and/or structure. The output signals of the digital filter circuitries 436, however, provide multiple-bit output signals to the digital down-converter circuitries 427. The digital down-converter circuitries 427 in FIG. 18 are relatively more complex compared to the digital down-converter circuitries 427 in FIG. 17, because they operate on multiple-bit signals. Thus, by using the architectures shown in FIG. 18, one trades off the simplicity of the digital down-converter circuitry 427 for simplicity in the digital filter circuitry 436.

Figure 20A:
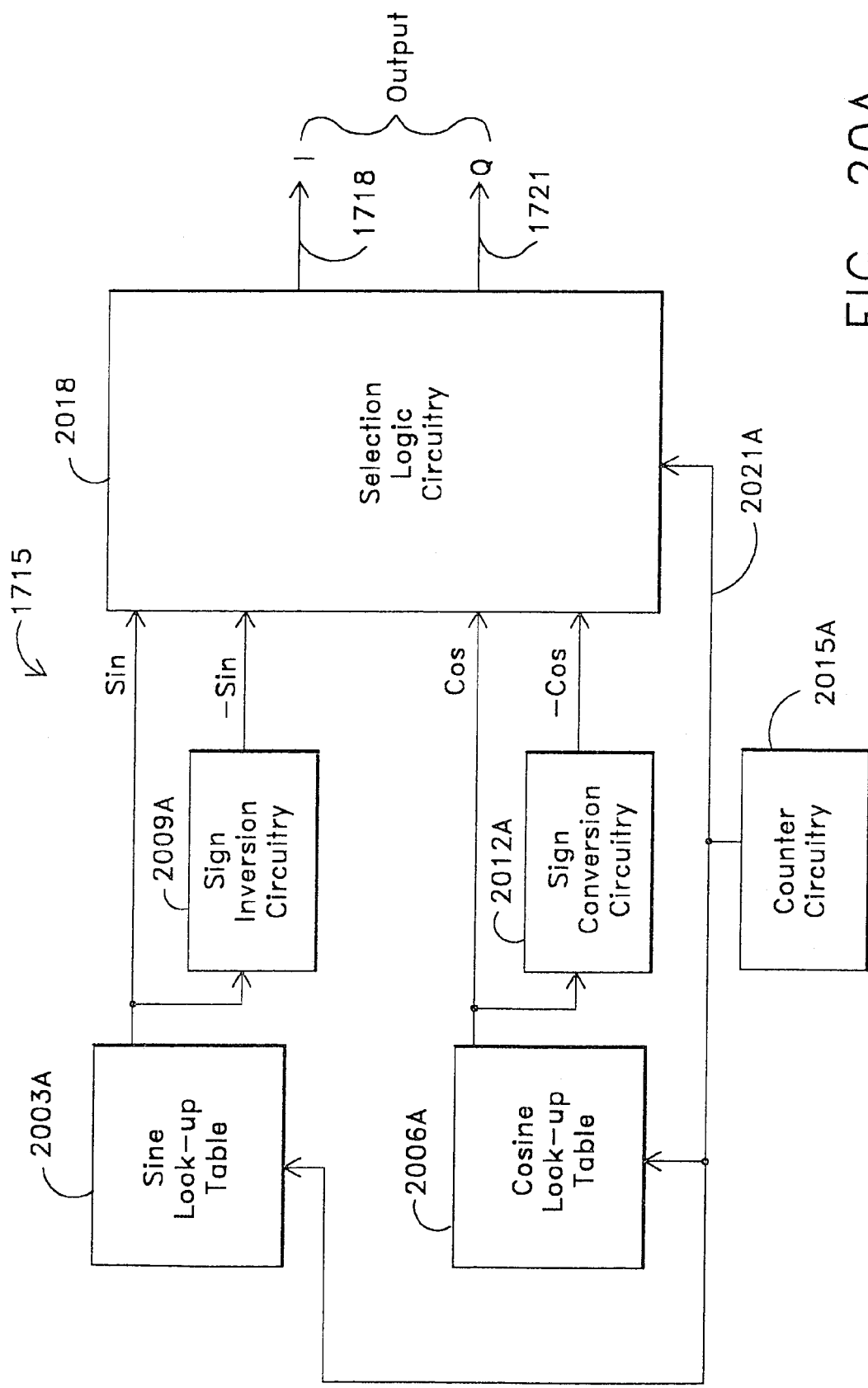
FIG. 20A shows a conceptual or functional block diagram of an exemplary embodiment of an intermediate-frequency local-oscillator (IF LO) circuitry for use in receiver digital circuitry according to the invention.
Figure 20B:
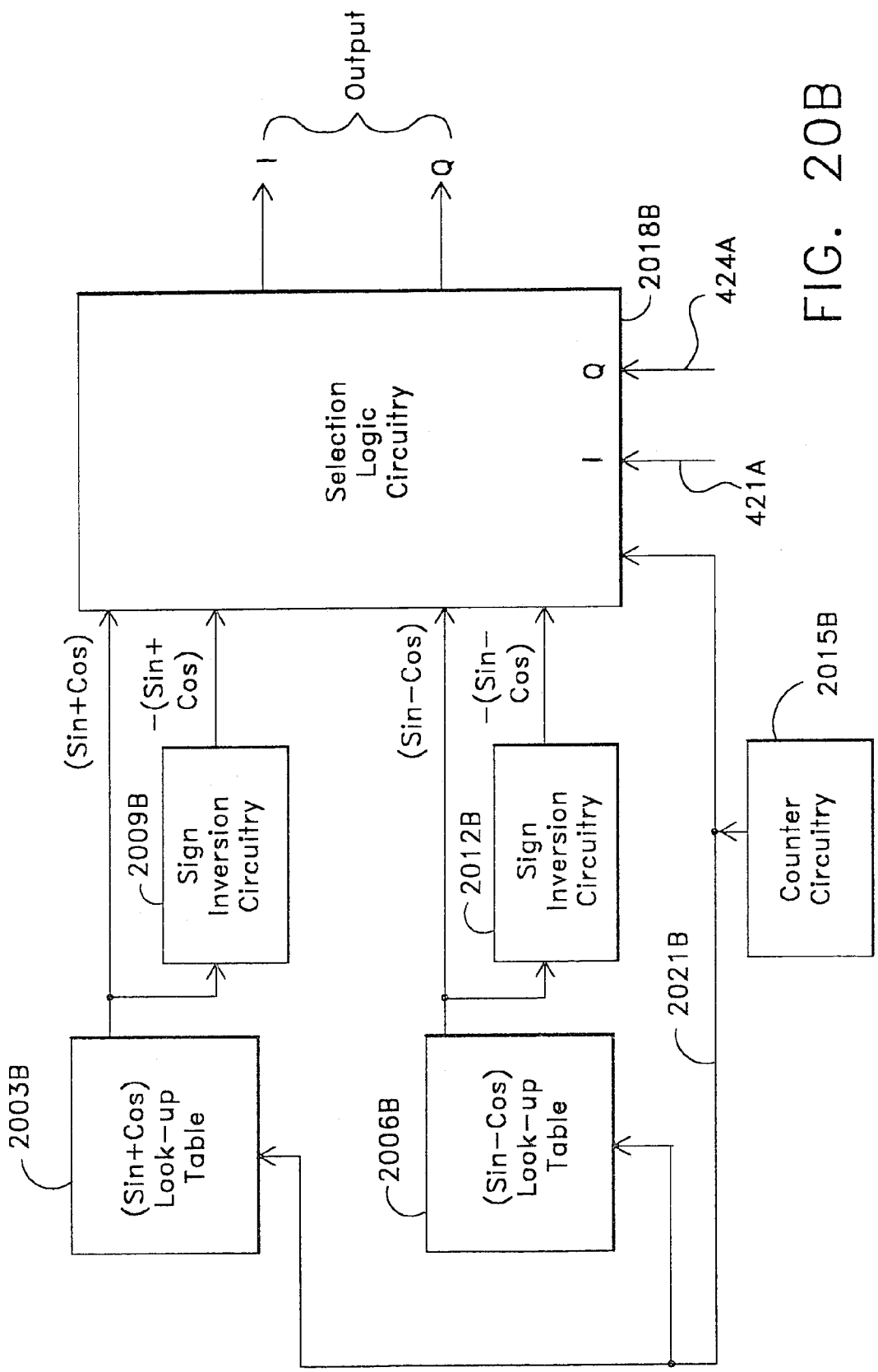
FIG. 20B illustrates a conceptual or functional block diagram of another exemplary embodiment of a combined digital down-converter circuitry and IF LO circuitry for use in receiver digital circuitry according to the invention.

FIGS. 20A and 20B illustrate conceptual or functional block diagrams of IF LO circuitry 1715 according to the invention. FIG. 20A shows a conceptual or functional block diagram of one embodiment of an IF LO circuitry 1715 that uses sine and cosine look-up tables. The IF LO circuitry 1715 in FIG. 20A includes a sine look-up table 2003A, a cosine look-up table 2006A, sign inversion circuitries 2006A and 2009A, counter circuitry 201 5A, and selection-logic circuitry 2018A. The sine look-up table 2003A includes digital words that correspond to sine values. Similarly, the cosine look-up table 2006A stores digital words that correspond to cosine values. In response to count value 2021A from the counter circuitry 2015A, the sine look-up table 2003A and the cosine look-up table 2006A provide sine and cosine values, respectively.

Exemplary embodiments of the invention use read-only memory (ROM) circuitries (not shown in FIG. 20A) to implement the sine look-up table 2003A and the cosine look-up table 2006A. A first ROM circuitry stores digital words for the sine values, whereas a second ROM circuitry stores digital words for the cosine values. One, however, may implement the sine look-up table 2003A and the cosine look-up table 2006A in a variety of ways, as persons skilled in the art would understand.

One may provide digital values corresponding to the sine and cosine values with a variety of resolutions (i.e., the number of bits in each output word), as desired. Furthermore, one may use the inventive concepts with other techniques for providing sine and cosine values, as persons of ordinary skill in the art who read the description of the invention will understand. For example, rather than using look-up tables, one may compute sine and cosine values in real time, as desired. As another example, one may use one ROM circuitry to store both sine and cosine values.

The sine look-up table 2003A provides its output value (i.e., the sine value) to the selection-logic circuitry 2018A and the sign inversion circuitry 2009A. At its output, the sign inversion circuitry 2009A provides the negative of the sine values. Similarly, the cosine look-up table 2006A provides cosine values to both the selection-logic circuitry 2018A and the sign inversion circuitry 2012A. The sign inversion circuitry 2012A changes the sign of the cosine value and provides the result (i.e., −cos) to the logic-selection circuitry 2018A. Thus, the selection-logic circuitry 2018A receives the following four quantities: sin, −sin, cos, and −cos.

The counter circuitry 2015A counts through a set of digital numbers. The counter circuitry 2015A provides its count value 2021A to the sine look-up table 2003A and the cosine look-up table 2006A. The count value 2021A serves as a pointer or index to the sine look-up table 2003A and the cosine look-up table 2006A. In exemplary embodiments of the invention, the sine look-up table 2003A and the cosine look-up table 2006A use the count value 2021A as an address input in their respective ROM circuitries in order to retrieve the sine and cosine values.

The counter circuitry 2015A also provides the count value 2021A to the selection-logic circuitry 2018A. The count value 2021A signifies the quadrant for which the selection-logic circuitry 2018A provides output signals. The selection-logic circuitry 2018A uses the count value 2021A and the quantities it receives from sine look-up table 2003A, the cosine look-up table 2006A, sign inversion circuitry 2009A, and sign inversion circuitry 2012A (i.e., sin, −sin, cos, and −cos, respectively) to generate the IF LO in-phase signal 1718 and the IF LO quadrature signal 1721.

In exemplary embodiments of the invention, the logic-selection circuitry 2018A includes a multiplexer circuitry (not shown explicitly) to select from the input signals of the logic-selection circuitry 2018A. The logic-selection circuitry 2018A uses the count value 2021A to select from the input terms (i.e., sin, −sin, cos, and −cos), and provide the selected terms as IF LO in-phase signal 1718 and IF LO quadrature signal 1721 signal. By using the circuit arrangement shown in FIG. 20A in exemplary embodiments, one may reduce the size of the look-up tables 2003A and 2006A by taking advantage of the symmetries in the sine and cosine functions. In other words, the look-up tables 2003A and 2006A may store one-fourth of the waveforms for sine and cosine functions and use the symmetry in those functions to derive values for other portions of the waveforms.

Note that FIG. 20A shows one possible arrangement for the IF LO circuitry 1715. As persons of ordinary skill in the art who read the disclosure of the invention will understand, however, one may use a variety of arrangements and implementations for the IF LO circuitry 1715, as desired. For example, FIGS. 19 and 20A show conceptual block diagrams of the digital down-converter circuitry 427 and the IF LO circuitry 1715 as separate blocks of circuitry. One, however, may combine the functionality of the digital down-converter circuitry 427 and the IF LO circuitry 1715 into one block, as desired.

FIG. 20B shows a conceptual or functional block diagram of a circuit arrangement that combines the functionality of the IF LO circuitry 1715 with the functionality of the digital down-converter 427. The circuit arrangement in FIG. 20B includes a (sin+cos) look-up table 2003B, a (sin−cos) look-up table 2006B, sign inversion circuitries 2006B and 2009B, counter circuitry 2015B, and selection-logic circuitry 2018B. The (sin+cos) look-up table 2003B includes digital words that correspond to sine plus cosine values. Similarly, the (sin−cos) look-up table 2006B stores digital words that correspond to sine minus cosine values. In response to the count value 2021B from the counter circuitry 2015B, the (sin+cos) look-up table 2003B and the (sin−cos) look-up table 2006B provide (sin+cos) and (sin−cos) values, respectively.

Exemplary embodiments of the invention use read-only memory (ROM) circuitries (not shown in FIG. 20B) to implement the (sin+cos) look-up table 2003B and the (sin−cos) look-up table 2006B. A first ROM circuitry stores digital words for the sine plus cosine values, whereas a second ROM circuitry stores digital words for the sine minus cosine values. One, however, may implement the (sin+cos) look-up table 2003B and the (sin−cos) look-up table 2006B in a variety of ways, as persons skilled in the art would understand. In exemplary embodiments of the invention, the (sin+cos) look-up table 2003B and the (sin−cos) look-up table 2006B provide 19-bit digital values as their respective outputs. One, however, may choose to provide digital values with other resolutions, as desired, by making modifications that persons skilled in the art would understand.

Moreover, by using the circuit arrangement shown in FIG. 20B in exemplary embodiments, one may reduce the size of the look-up tables 2003B and 2006B by taking advantage of the symmetries in the sine and cosine functions. In other words, the look-up tables 2003B and 2006B may store one-fourth of the waveforms for the (sin+cos) and (sin−cos) functions and use the symmetry properties of sine and cosine functions to derive values for other portions of the waveforms. Furthermore, note that one may use the inventive concepts with other techniques for providing sine and cosine values, as persons of ordinary skill in the art who read the description of the invention will understand. For example, rather than using look-up tables, one may compute sine and cosine values and, hence, (sin+cos) and the (sin−cos) values, in real time, as desired.

The (sin+cos) look-up table 2003B provides its output value (i.e., the sine plus cosine value) to the selection-logic circuitry 2018B and the sign inversion circuitry 2009B. At its output, the sign inversion circuitry 2009B provides the negative of sine plus cosine, or −(sin+cos). Similarly, the (sin−cos) look-up table 2006B provides sine minus cosine values to both the selection-logic circuitry 2018B and the sign inversion circuitry 2012B. The sign inversion circuitry 2012B changes the sign of the sine minus cosine value and provides the result (i.e., −(sin−cos)) to the logic-selection circuitry 2018B. Thus, the selection-logic circuitry 2018B receives the following four quantities: (sin+cos), −(sin+cos), (sin−cos), and −(sin−cos).

The counter circuitry 2015B counts through a set of digital numbers. The counter circuitry 2015B provides its count value 2021B to the (sin+cos) look-up table 2003B and the (sin−cos) look-up table 2006B. The count value 2021B serves as a pointer or index to the (sin+cos) look-up table 2003B and the (sin−cos) look-up table 2006B. In exemplary embodiments of the invention, the (sin+cos) look-up table 2003B and the (sin−cos) look-up table 2006B use the count value 2021B as an address input in their respective ROM circuitries in order to retrieve the (sin+cos) and (sin−cos) values.

The counter circuitry 2015B also provides the count value 2021B to the selection-logic circuitry 2018B. The selection-logic circuitry 2018B uses the count value 2021B (i.e., quadrant information) and the quantities it receives from (sin+cos) look-up table 2003B, the (sin−cos) look-up table 2006B, sign inversion circuitry 2009B, and sign inversion circuitry 2012B (i.e., (sin+cos), −(sin+cos), (sin−cos), and −(sin−cos), respectively) to generate the in-phase and quadrature output signals. In addition, the selection-logic circuitry 2018B uses in-phase digital receive signal 421A and quadrature digital receive signal 424A to generate its in-phase and quadrature output signals.

The circuit arrangement shown in FIG. 20B incorporates into the logic-selection circuitry 2018B the multipliers (e.g., multiplier circuitries 1903, 1906, 1909, and 1912 in FIG. 19) that one would use if one were to implement a separate digital down-converter circuitry 427. Furthermore, using the circuit arrangement in FIG. 20B uses stored (sin+cos) and (sin−cos) values in order to implement the function of adders in the digital down-converter circuitry (e.g., adder circuitries 1915 and 1918 in FIG. 19).

Note that FIG. 20B shows one possible arrangement for the combined functionality of the IF LO circuitry 1715 and the digital down-converter circuitry 427. As persons of ordinary skill in the art who read the disclosure of the invention will understand, however, one may use a variety of arrangements and implementations, as desired.

The signal processing blocks within the digital filter circuitry 436 use as building blocks digital integrator circuitries and digital differentiator circuitries. FIGS. 21 and 22 show a digital integrator circuitry 2100 and a digital differentiator circuitry 2200, respectively, for use in exemplary embodiments of the invention.

The digital integrator circuitry 2100 in FIG. 21 includes a delay (or $z^{-1}$ block) circuitry 2103 and combiner circuitry 2106. The delay circuitry 2103 generates a delayed version of the output signal $y_i(n)$ and provides the delayed signal to the combiner circuitry 2106. The combiner circuitry 2106 sums the input signal $x_i(n)$ with the delayed version of the output signal $y_i(n)$. The output signal of the combiner circuitry 2106 defines the output signal $y_i(n)$ of the digital integrator circuitry 2100. The digital integrator circuitry 2100 has the following transfer function, $H_i(D)$:

$$H_i(D) = \frac{1}{1-D}.$$

Referring to FIG. 22, the digital differentiator circuitry 2200 has a delay circuitry 2203 that generates a delayed version of the input signal, $x_d(n)$. The delay circuitry 2203 provides the delayed input signal to combiner circuitry 2206. The combiner circuitry 2206 subtracts the delayed version of the input signal $x_d(n)$ from the input signal $x_d(n)$. The output signal of the combiner circuitry 2206 defines the output signal $y_d(n)$ of the digital differentiator circuitry 2200. The digital differentiator circuitry 2200 has the transfer function:

$$H_d(D) = 1 - D.$$

Figure 23:
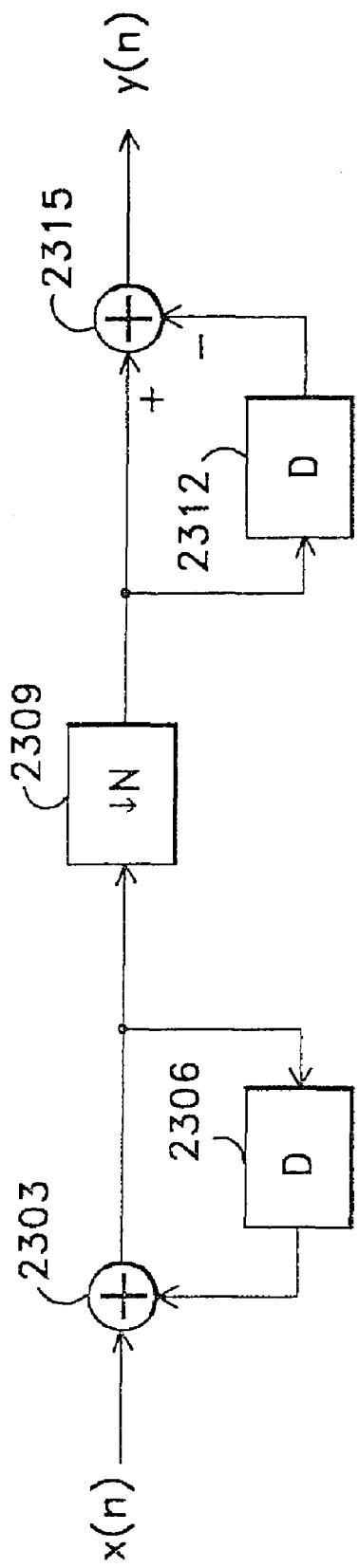
FIG. 23 shows a conceptual or functional block diagram of signal flow within a first-order cascaded integrator/comb (CIC) filter circuitry for use in exemplary embodiments of digital filter circuitry according to the invention.

FIG. 23 shows a conceptual or functional block diagram of a CIC filter circuitry for use in exemplary embodiments of the invention. The CIC filter circuitry includes combiner circuitry 2303, delay circuitry 2306, decimator circuitry 2309, combiner circuitry 2315, and delay circuitry 2312. The decimator circuitry 2309 represents a circuit that decimates its input data by N. One may implement the decimator circuitry 2309 as a delay element (such as a flip-flop) clocked at a frequency of 1/N of the sampling frequency of its input signal. In the exemplary embodiment shown in FIG. 23, the decimator circuitry 2309 decimates its input data by 16 (i.e., N=16) although, generally, one may use other values of N, as desired.

Note that combiner circuitry 2303 and delay circuitry 2306 together provide an integrator circuitry (see FIG. 21). Likewise, note that the delay circuitry 2312 and combiner circuitry 2315 together make a differentiator circuitry (see FIG. 22). Thus, the CIC filter circuitry in FIG. 23 effectively includes a cascade of an integrator circuitry, a decimator circuitry 2309, and a differentiator circuitry.

The CIC filter circuitry has the following impulse response at a sampling frequency that equals the input sampling frequency (i.e., 13 MHz in exemplary embodiments):

0, 0, 0, 1, 1, 1, 1, 1, 1, 1, 1, 1, 1, 1, 1, 1, 1, 1, 1, 0, 0, 0, ...

↑

Time = 0

Note that the above impulse response represents the impulse response viewed at the input clock rate, rather than at the output clock rate. Thus, the impulse response of the CIC filter circuitry has the shape of a rectangular window in the time domain. The number of "1"s in the impulse response equals the decimation factor. In exemplary embodiments, the decimation factor equals 16. One, however, may use other values of decimation factors, as desired. The rectangular impulse response in the time domain corresponds to a sinc function in the frequency domain.

As persons skilled in the art would appreciate, the CIC filter circuitry has a transfer function:

$$H_{CIC}(D)=1+D+D^2+D^3+D^4+D^5+D^6+D^7+D^8+D^9+D^{10}+D^{11}+D^{12}+D^{13}+D^{14}+D^{15}.$$

Note that the CIC filter circuitry in FIG. 23 includes feedback (through delay circuitry 2306 in the integrator circuitry), so it appears to constitute an infinite-impulse response circuit. Because of pole-zero cancellation, however, the CIC filter circuitry behaves (from an input-output point of view) as a finite-impulse response circuit.

Figure 24:
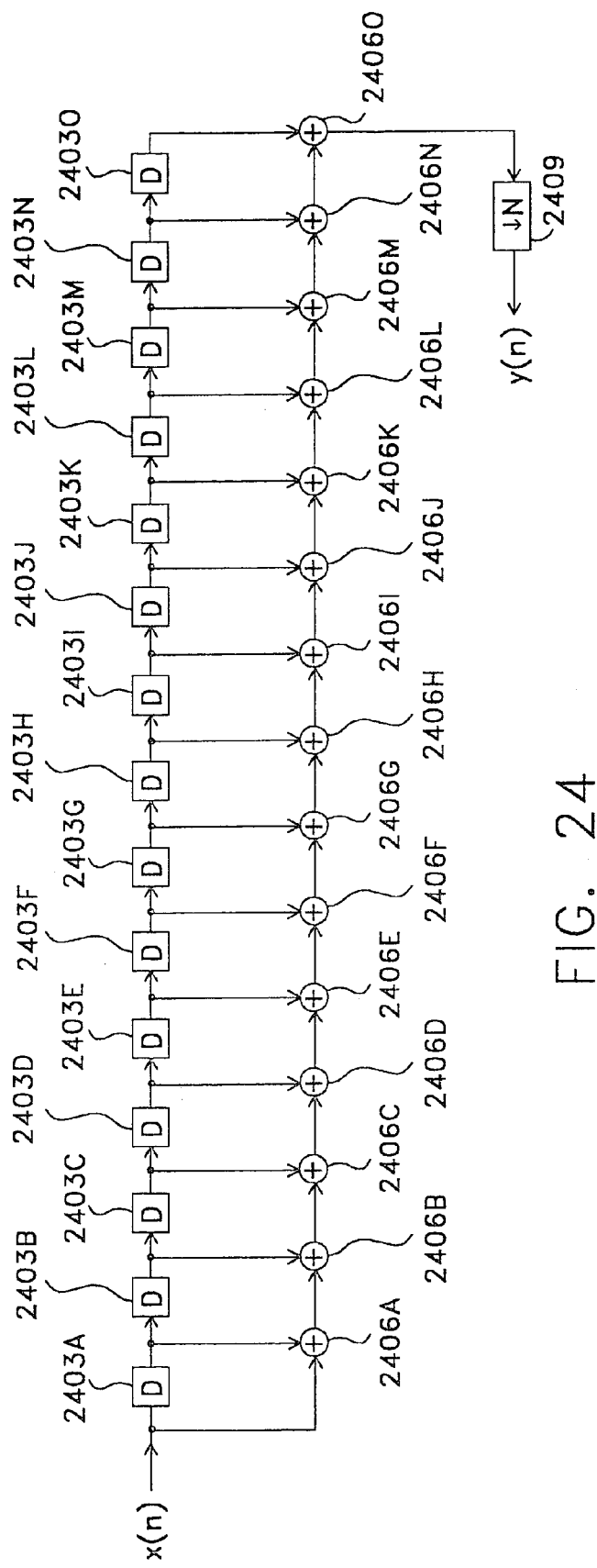
FIG. 24 depicts a conceptual or functional block diagram of a boxcar filter circuitry for use in exemplary embodiments of digital filter circuitry according to the invention.

FIG. 24 illustrates a conceptual or functional block diagram of a boxcar filter circuitry that one may use in exemplary embodiments of the invention. The boxcar filter circuitry includes a cascade of delay circuitries 2403A-2403O. An input signal drives the first delay circuitry 2403A. The boxcar filter circuitry also includes a cascade of combiner circuitries 2406A-2406O. The input signal also drives one input of the first combiner circuitry 2406A. The output signal of delay circuitry 2403A drives another input of the first combiner circuitry 2406A. Each of the succeeding combiner circuitries 2406B-2406O receives one of its input signals from the output of the preceding combiner circuitry. Each of the succeeding combiner circuitries 2406B-2406O in the chain also receives a second input from a corresponding delay circuitry 2403B-2403O. For example, combiner circuitry 2406B receives one operand from the output of combiner circuitry 2406A and another operand from the output of delay circuitry 2403B, and so on.

The output of the last combiner circuitry, i.e., combiner circuitry 2406O, drives a decimator circuitry 2409. The decimator circuitry 2409 generally decimates by a factor N. In exemplary embodiments of the invention, N equals 16, although one may generally use other values of N, as desired. Note that the boxcar filter circuitry in FIG. 24 includes 15 delay circuitries 2403A-2403O and 15 combiner circuitries 2406A-2406O. Depending on a given set of specifications and targeted performance, however, one may use other numbers of delay and combiner circuitries, as desired.

The boxcar filter circuitry in FIG. 24 has the same impulse response and transfer function as does the CIC filter circuitry in FIG. 23. From a hardware realization point of view, however, the CIC filter circuitry provides a more efficient arrangement. The CIC filter circuitry uses two combiner circuitries and three registers (to implement the delay circuitries), whereas the boxcar filter circuitry uses 15 combiner circuitries and 16 registers. One may use either the CIC filter circuitry or the boxcar filter circuitry to implement embodiments of the invention, depending on desired performance and specifications, as persons skilled in the art would understand.

Figure 25:
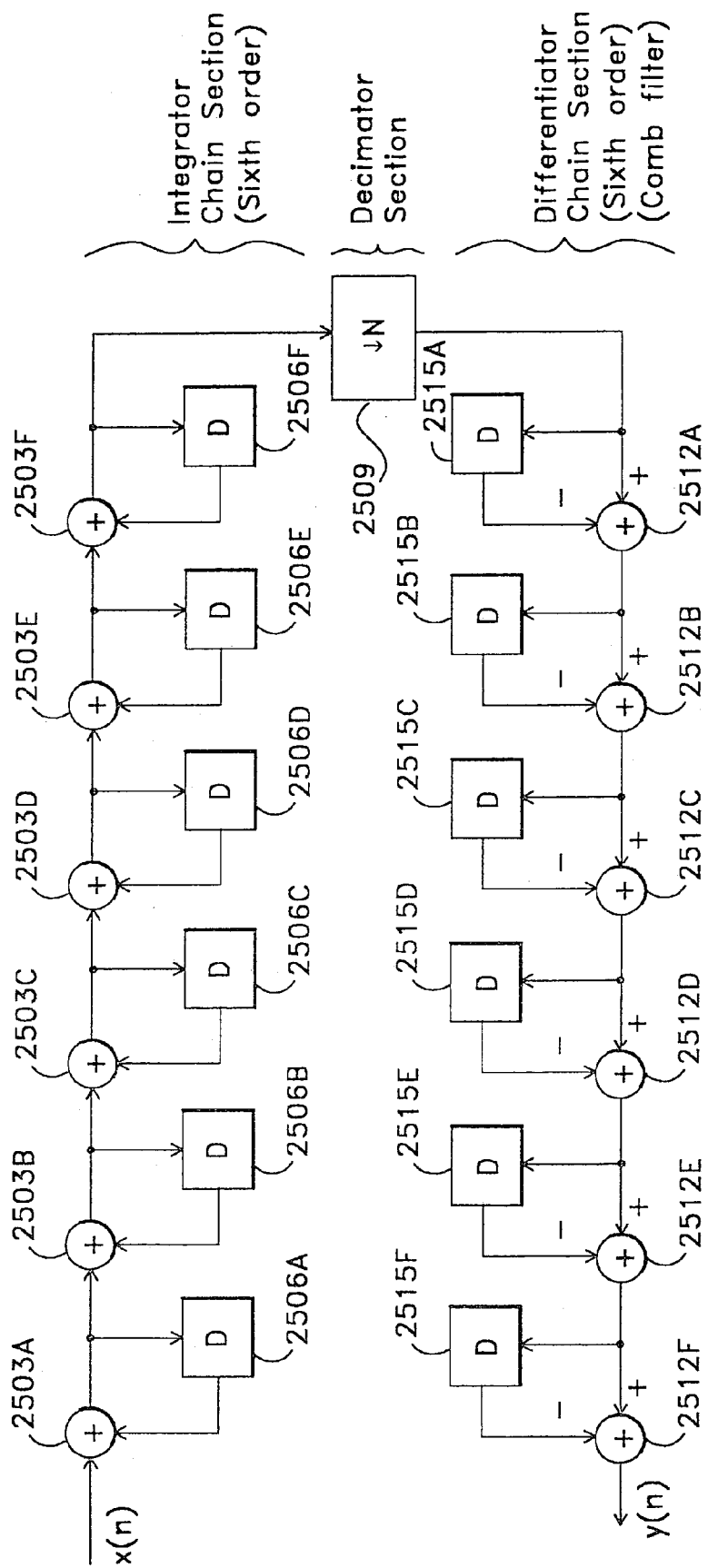
FIG. 25 illustrates a conceptual or functional block diagram of a CIC filter circuitry, which includes decimator circuitry, for use in exemplary embodiments of digital filter circuitry according to the invention.

FIG. 25 shows a conceptual or functional block diagram of a sixth-order CIC filter circuitry for use in the receiver digital circuitry in exemplary embodiment of the invention. The CIC filter circuitry includes a cascade of an integrator chain section, a decimator circuitry 2509, and a differentiator chain section (the differentiator chain section constitutes a comb filter circuitry). The CIC filter circuitry in FIG. 25 has a similar signal-flow architecture to the CIC filter circuitry in FIG. 23. Note, however, that the CIC filter circuitry in FIG. 25 uses sixth-order integrator and differentiator chain sections, whereas the CIC filter circuitry of FIG. 23 uses first-order integrators and differentiators. Depending on a given set of specifications and performance targets, one may other numbers of integrators and differentiators, as desired. The 6th-order integrator and differentiator chain sections corresponds to a transfer function in the frequency domain that constitutes a sinc function raised to the sixth power. The integrator chain section includes a cascade of six integrator circuitries (each similar to the integrator circuitry in FIG. 21) that use combiner circuitries 2503A-2503F and delay circuitries 2506A-2506F. The output of the integrator chain section drives the decimator circuitry 2509. The decimator circuitry 2509 generally decimates by a factor of N. In exemplary embodiments of the invention, N equals 16, although one may generally use other values of N, as desired.

The differentiator chain includes a cascade of six differentiator circuitries (each similar to the differentiator circuitry in FIG. 22) that use combiner circuitries 2512A-2512F and delay circuitries 2515A-2515F. Each combiner circuitry 2512A-2512F subtracts the output signal of a corresponding delay circuitry 2515A-2515F from the output signal of the preceding stage. The output of the differentiator chain section (i.e., the output of combiner circuitry 2512F) constitutes the output signal of the CIC filter circuitry.

As FIGS. 17 and 18 illustrate, the output of the CIC filter circuitry in each of the in-phase and quadrature signal paths drives a secondary filter circuitry, such as an IIR filter circuitry. In exemplary embodiments, the IIR filter circuitry includes a cascade of one or more second-order, or biquad, filter circuitries and a notch filter circuitry. Each of the biquad filter circuitries and the notch filter circuitry constitutes a second-order filter. Note that the IIR filter circuitries and, more generally, the secondary filter circuitries, follow the CIC filter circuitries and, hence, the decimator circuitry. Thus, the IIR filter circuitries or secondary filter circuitries operate at a lower sample rate than the sample rate of the input signals to the CIC filter circuitries (13 MHz in exemplary embodiments of the invention). Operation at a lower sample rate results in less stringent hardware specifications and less power consumption, for example, in CMOS implementations of the invention. In exemplary embodiments of the invention, the IIR filter circuitries or secondary filter circuitries operate at a sample rate of 812.5 kHz, although one may use other clock rate and sample rate arrangements, as desired.

Figure 26:
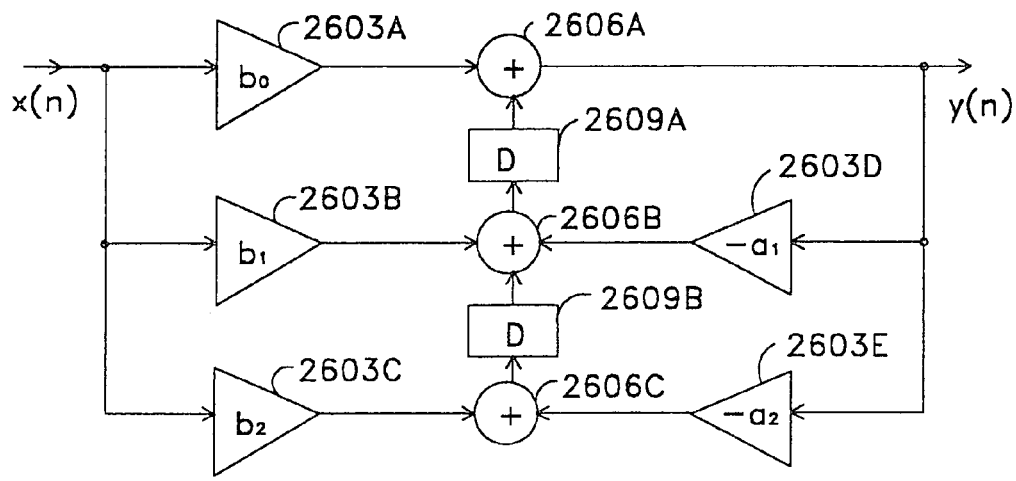
FIG. 26 shows a conceptual or functional block diagram of a second-order filter circuitry for use in exemplary embodiments of digital filter circuitry according to the invention.

FIG. 26 shows a conceptual or functional block diagram of a biquad filter circuitry for use in exemplary embodiments of the invention. The biquad filter circuitry includes five gain circuitries 2603A-2603E, three combiner circuitries 2606A-2606C, and two delay circuitries 2609A-2609B. Gain circuitries 2603A-2603C have gain values (or coefficients) of $b_0$, $b_1$, and $b_2$, respectively. Similarly, gain circuitries 2603D-2603E have gain values of $-a_1$ and $-a_2$, respectively. Note that delay circuitries 2609A-2609B operate at the sample rate of the biquad filter circuitry, i.e., 812.5 kHz in exemplary embodiments of the invention.

Gain circuitry 2603C scales the input signal by $b_2$ and provides the result to combiner circuitry 2606C. Combiner circuitry 2606C also receives as a second input signal the output signal (i.e., the output signal of the combiner circuitry 2606A), scaled by $-a_2$ by gain circuitry 2603E. Combiner circuitry 2606C provides the sum of its two input signals to delay circuitry 2609B. Combiner circuitry 2606B receives one input from delay circuitry 2609B. Two other inputs to combiner circuitry 2606B constitute the input signal scaled by $b_1$ (provided by gain circuitry 2603B), and the output signal scaled by $-a_1$ (provided by gain circuitry 2603D), respectively. Combiner circuitry 2606B sums its three input signals and provides the resulting quantity to delay circuitry 2609A. Combiner circuitry 2606A provides the output signal of the biquad filter circuitry by summing together the output signal of delay circuitry 2609A and a version of the input signal scaled by $b_0$ (provided by gain circuitry 2603A).

The overall biquad filter circuitry has the following transfer function:

$$H_B(D) = \frac{b_0 + b_1 D + b_2 D^2}{1 + a_1 D + a_2 D^2}.$$

As the above transfer function indicates, the biquad filter circuitry has two zeros and two poles.

The values of $b_0$, $b_1$, and $b_2$ control the location of the zeros of the biquad filter circuitry, whereas the values of $a_1$ and $a_2$ control its pole locations.

Figure 27:
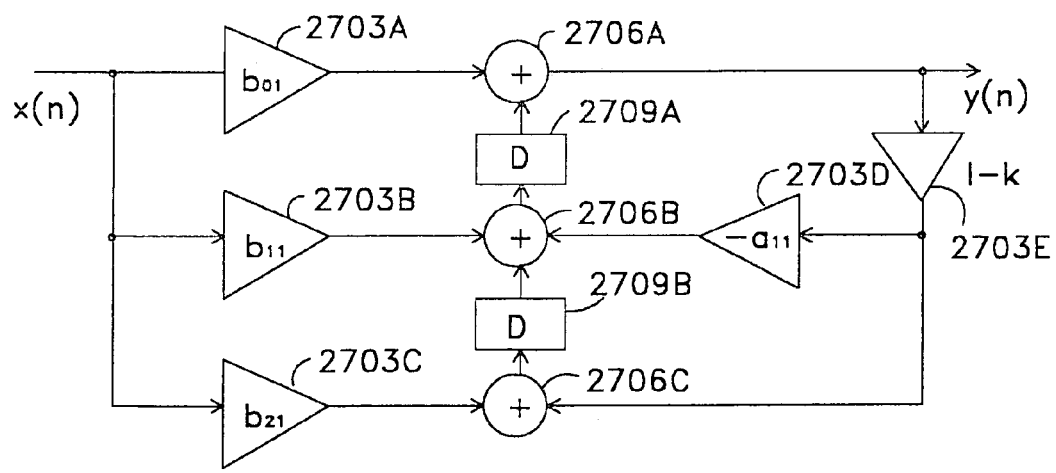
FIG. 27 depicts a conceptual or functional block diagram of a notch filter circuitry for use in exemplary embodiments of digital filter circuitry according to the invention.

FIG. 27 depicts a conceptual or functional block diagram of a notch filter circuitry for use in exemplary embodiments of the invention. The notch filter circuitry has a similar signal-flow architecture to the signal-flow architecture of the biquad filter circuitry in FIG. 26. The notch filter circuitry includes five gain circuitries 2703A-2703E, three combiner circuitries 2706A-2706C, and two delay circuitries 2709A-2709B. Gain circuitries 2703A-2703C have gain values of $b_{01}$, $b_{11}$, and $b_{21}$, respectively. Gain circuitry 2703D has again value of $-a_{11}$, and gain circuitry 2703E has a gain value of 1−k. Gain circuitry 2703E controls some of the characteristics of the notch filter circuitry, as described below in more detail.

Gain circuitry 2703C scales the input signal by $b_{21}$ and provides the result to combiner circuitry 2706C. A version of the output signal, scaled by 1−k by gain circuitry 2703 E, constitutes a second input to combiner circuitry 2706C. Combiner circuitry 2706C provides the sum of its input signals to delay circuitry 2709B. Combiner circuitry 2706B receives one input from delay circuitry 2709B. Two additional inputs to combiner circuitry 2706B constitute, respectively, the input signal scaled by $b_{11}$, (provided by gain circuitry 2703B), and the output signal of gain circuitry 2703E (i.e., the output signal of the notch filter circuitry scaled by 1−k) scaled by $-a_{11}$, (provided by gain circuitry 2703D). Combiner circuitry 2706B sums its three input signals and provides the resulting quantity to delay circuitry 2709A. Combiner circuitry 2706A provides the output signal of the notch filter circuitry by summing together the output signal of delay circuitry 2709A, and the input signal scaled by $b_{01}$ (provided by gain circuitry 2703A), respectively.

Figure 28A:
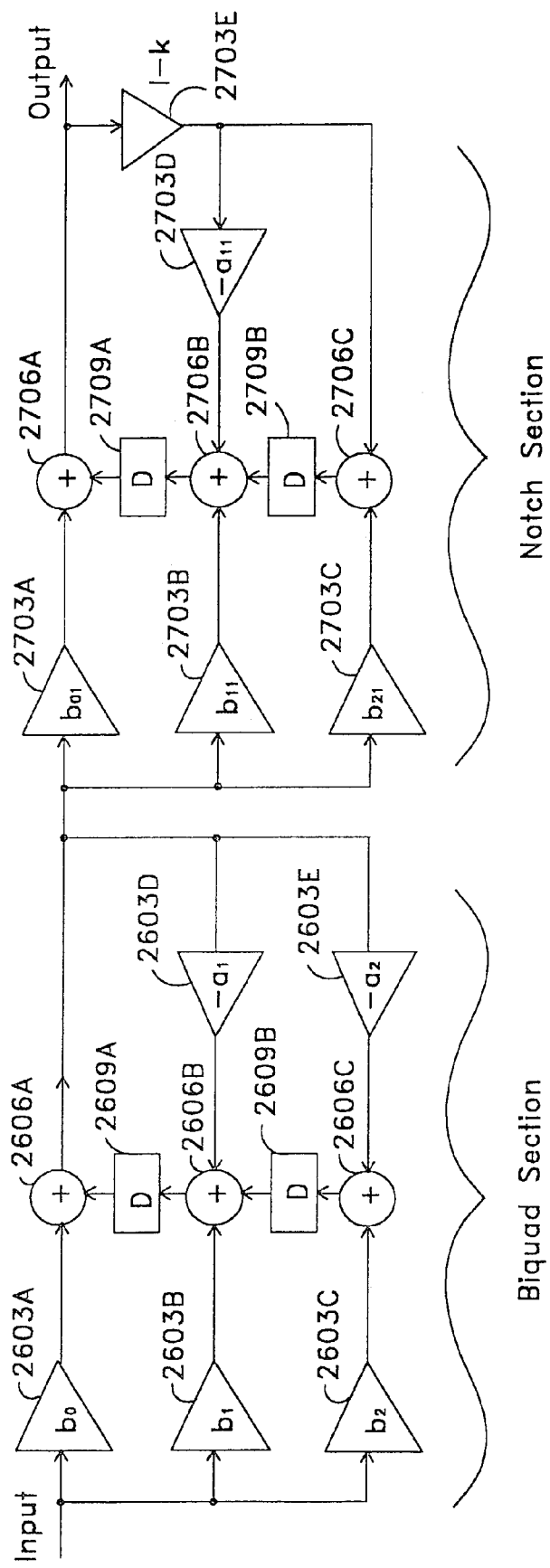
FIG. 28A illustrates a conceptual or functional block diagram of a cascade arrangement of a biquad filter circuitry and a notch filter circuitry for use in digital filter circuitry according to the invention.
Figure 28B:
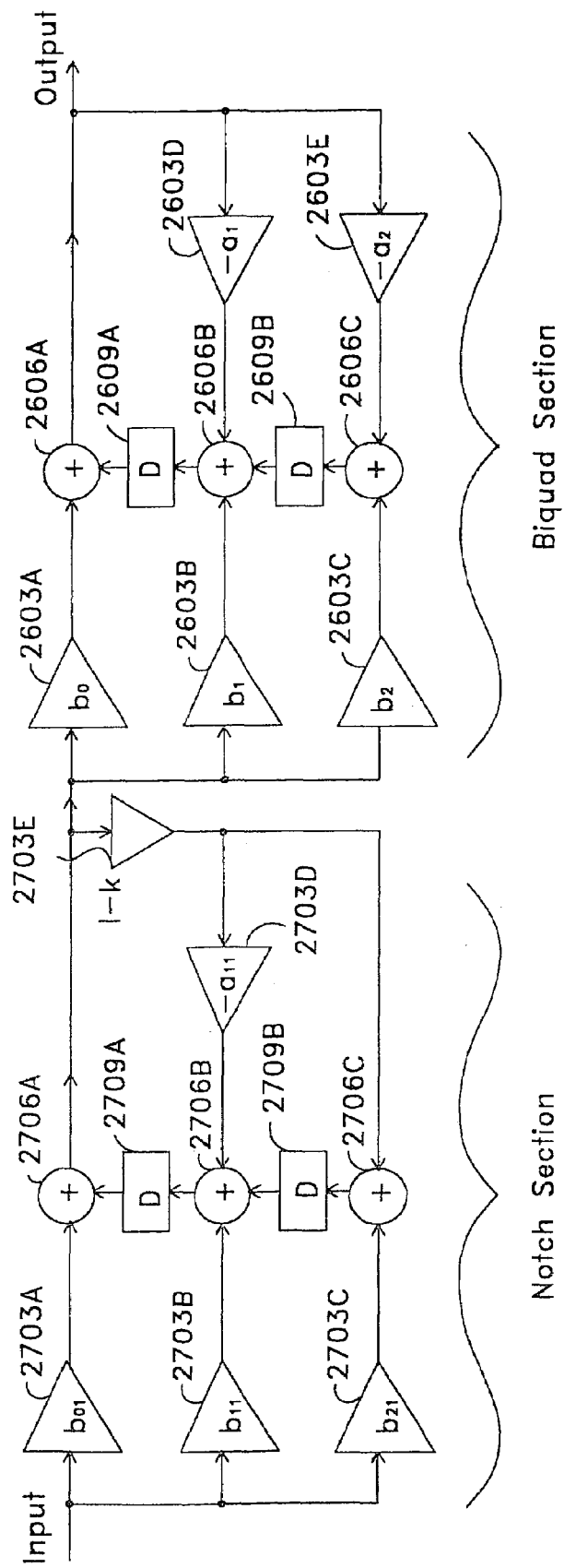
FIG. 28B illustrates a conceptual or functional block diagram of a cascade arrangement of a notch filter circuitry and a biquad filter circuitry for use in digital filter circuitry according to the invention.

As noted above, in exemplary embodiments, the secondary filter circuitries or IIR filter circuitries in FIGS. 17 and 18 use cascade arrangements of biquad and notch filter circuitries. FIGS. 28A and 28B illustrates examples of such cascade arrangements. As persons of ordinary skill in the art who read the description of the invention will understand, depending on design and performance specifications, one may use either arrangement, as desired. The arrangement in FIG. 28A includes one biquad filter circuitry and one notch filter circuitry. The biquad filter circuitry appears before the notch filter circuitry. The arrangement in FIG. 28B also includes one biquad filter circuitry and one notch filter circuitry. Unlike the arrangement in FIG. 28A, however, the notch filter circuitry in the arrangement in FIG. 28B appears before the biquad filter circuitry.

The biquad and notch filter circuitries may constitute the biquad filter circuitry and the notch filter circuitry that FIGS. 26 and 27 depict, respectively. The arrangements in FIGS. 28A and 28B are fourth-order filter circuitries overall. One, however, may use a different number of filter circuitries to provide a desired overall order for the filter circuitry, as FIG. 29 and its description below illustrate.

One may implement the biquad and notch filter circuitries using a variety of digital filter hardware realization techniques, as persons of ordinary skill in the art would understand. For example, one may use dedicated hardware, finite-state machines, standard cells, programmable hardware (e.g., PLDs, CPLDs, or FPGAs), or a combination of hardware and software, as desired.

Exemplary embodiments of the invention realize the biquad filter circuitry and the notch filter circuitry using DSP engines. The DSP engines constitute custom hardware, designed to perform a relatively limited set of signal processing operations. A control logic circuitry includes hard-wired, pre-selected operations. Depending on the design and performance specifications for a particular implementation, however, one may use other arrangements, such as signal processing hardware with programmable operations, as desired. The choice of the signal processing hardware for a particular implementation falls within the knowledge of persons skilled in the art who read the description of the invention.

The DSP engines have multiply and add capabilities, together with a set of registers for storing operands and the results of calculations. The DSP engines use a clock frequency that is a multiple (16 in exemplary embodiments) of the filter circuitries' data sample rate. For example, in some embodiments, the DSP engines use a 13 MHz clock, whereas the filter circuitries have an 812.5 kHz clock, although one may use other clocking arrangements, as desired. Using different clocking rates for the DSP engines and the filter circuitries allows time-multiplexing the multiply and add operations used to realize the filter circuitries.

In exemplary embodiments of the invention, each DSP engine can implement the functionality of two biquad filter circuitries, or one biquad filter circuitry and one notch filter circuitry, and the programmable-gain circuitries for both the in-phase and quadrature signal paths. Note, however, that one may implement different numbers of filter circuitries by each DSP engine, as desired. Exemplary embodiments of the invention use three DSP engines, thus providing the capability for filter circuitries up to 12th order. Note, however, that one may use different numbers and/or types of DSP engines to realize other filter orders, as desired, by making modifications that persons of ordinary skill in the art understand.

DSP engines in exemplary embodiments of the invention use coefficient values stored in ROM circuitries. In those embodiments, one may change the coefficient values by modifying the contents of the ROM circuitries. Note, however, that one may implement and/or store the coefficient values in a variety of ways, as persons skilled in the art would understand. For example, one may store the coefficient values in register circuitries that an accompanying baseband processor circuitry programs. As another example, one may store the coefficient values in erasable programmable ROM (EPROM), electrically erasable programmable ROM (EEPROM), or electrically erasable ROM (EEROM) circuitries, or flash memory circuitries, as desired.

One may use coefficient values and state variables with a desired bit precision in the digital filter circuitry. Exemplary embodiments of the invention use bit precisions that tend to reduce quantization noise in typical applications. In those embodiments, the state variables each include 26 bits. Filter coefficients, with the exception of $b_0$ and $b_{01}$ in FIGS. 26-28, use a simple floating-point representation, with a 12-bit mantissa and a 3-bit exponent.

Coefficients $b_0$ and $b_{01}$ result from simple shift operations on the input data, x(n), of the biquad filter circuitry and the notch filter circuitry, respectively. In other words, to realize coefficients $b_0$ and $b_{01}$, the hardware shifts the input data corresponding to x(n). As persons of ordinary skill in the art understand, a right-shift operation corresponds to a divide-by-two operation. Thus, by using N right-shift operations, one may in effect multiply the input samples x(n) by $\frac{1}{2}^N$. Conversely, by using M left-shift operations, one may multiply the input samples by $2^M$. Using the shift operations to realize multiplication or division by powers of 2, rather than using a full multiplier, provides hardware savings and circuit simplification in exemplary embodiments of the invention. Note, however, that one may use multipliers in order to implement arbitrary filter coefficients $b_0$ and $b_{01}$, as desired. Because the shift operations do not use a multiplier circuitry in the DSP engines, one may use the multiplier circuitry to implement the functionality of PGA circuitries 836A and 836B.

In exemplary embodiments, coefficient $b_{11}$ has a 19-bit mantissa and a 3-bit exponent. The increased bit precision of the mantissa tends to allow more precise positioning of the notch filter circuitry's notch frequency. The desired precision of the various coefficients may vary, depending on design and specification factors for each particular embodiment of the invention. One may therefore use other precisions and arrangements of the various coefficients, as desired.

FIGS. 29A-29F show exemplary arrangements of biquad filter circuitries and notch filter circuitries to provide various desired overall order for the secondary filter circuitry. The overall order of the filter circuitry influences the characteristics of the filter circuitry, such as its magnitude response and group-delay characteristics, as persons of ordinary skill in the art would understand.

Figure 29A:
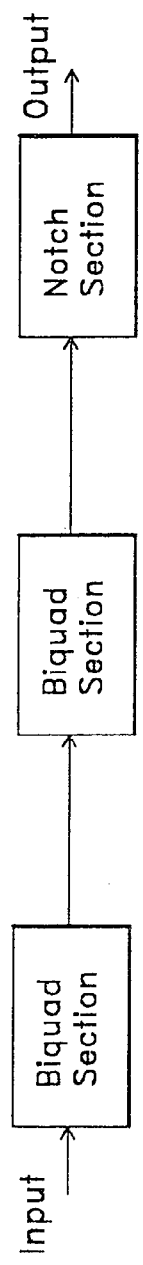
FIG. 29A shows a conceptual or functional block diagram of a digital filter circuitry for use in RF apparatus according to the invention, which includes two biquad filter sections and a notch filter section.
Figure 29B:
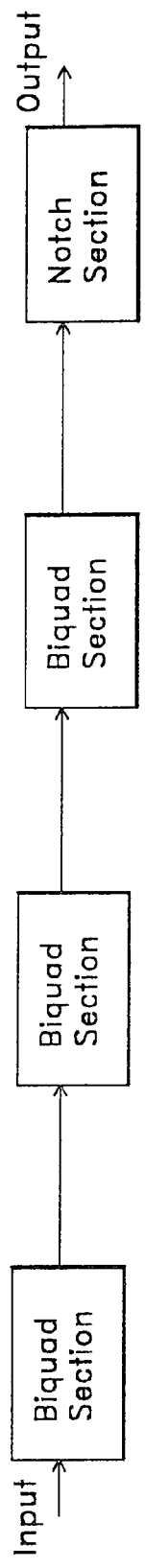
FIG. 29B depicts a conceptual or functional block diagram of a digital filter circuitry for use in RF apparatus according to the invention that includes three biquad filter sections and a notch filter section.
Figure 29C:
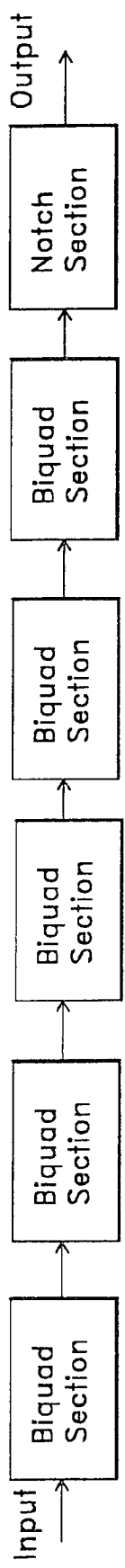
FIG. 29C illustrates a conceptual or functional block diagram of digital filter circuitry for use in RF apparatus according to the invention that includes five biquad filter sections and a notch filter section.

FIGS. 29A-29C illustrate a cascade arrangement of biquad and notch sections where the notch section appears after the biquad sections. FIG. 29A illustrates a cascade arrangement of two biquad filter circuitries and a notch filter circuitry. The overall filter circuitry constitutes a 6th-order filter. FIG. 29B depicts a similar arrangement. The cascade arrangement in FIG. 29B includes three biquad filter circuitries and a notch filter circuitry. Thus, the overall filter circuitry is an 8th-order filter. FIG. 29C shows a cascade arrangement of five biquad filter circuitries and a notch filter circuitry. The overall cascade arrangement constitutes a 12th-order filter.

Figure 29D:
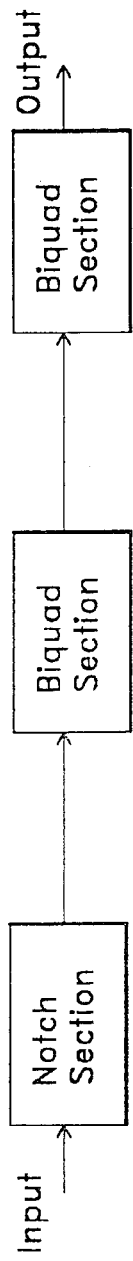
FIG. 29D shows a conceptual or functional block diagram of a digital filter circuitry for use in RF apparatus according to the invention, which includes a notch filter section and two biquad filter sections.
Figure 29E:
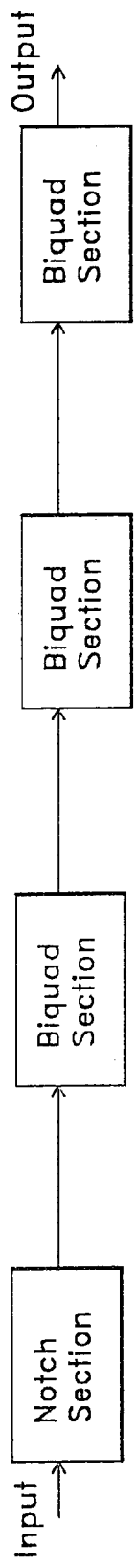
FIG. 29E depicts a conceptual or functional block diagram of a digital filter circuitry for use in RF apparatus according to the invention that includes a notch filter section and three biquad filter sections.
Figure 29F:
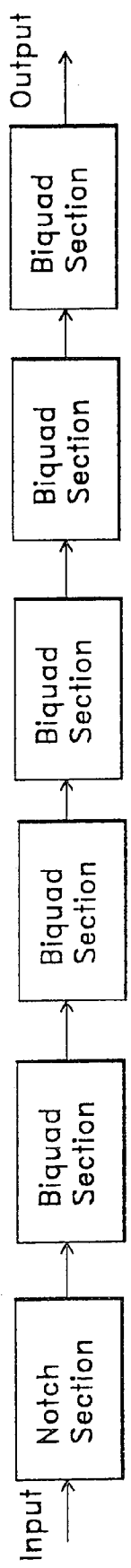
FIG. 29F illustrates a conceptual or functional block diagram of digital filter circuitry for use in RF apparatus according to the invention that includes a notch filter section and five biquad filter sections.

FIGS. 29D-29F illustrate a cascade arrangement of notch and biquad sections where the notch section appears before the biquad sections. Placing the notch filter circuitry before the biquad filter circuitries may lead to a quicker settling time when used in combination with the adjustment of the notch filter circuitry, described below in detail. FIG. 29D illustrates a cascade arrangement of a notch filter circuitry and two biquad filter circuitries. The overall filter circuitry constitutes a 6th-order filter. FIG. 29E depicts a similar arrangement, where the cascade arrangement includes a notch filter circuitry and three biquad filter circuitries. Thus, the overall filter circuitry is an 8th-order filter. FIG. 29F shows a cascade arrangement of a notch filter circuitry and five biquad filter circuitries. The overall cascade arrangement constitutes a 12th-order filter.

Note that FIG. 29 illustrates filter circuitry arrangements in exemplary embodiments of the invention. One, however, may use other arrangements that use different numbers of biquad and notch filter circuitries, as desired, depending on various design and performance criteria, as persons skilled in the art would understand. For example, one may use different numbers of biquad filter circuitries and/or different numbers of notch filter circuitries, as desired. Furthermore, one may reverse the order of the biquad section (or sections) and the notch section. In other words, the notch section may appear between two biquad sections, as desired. As one example, the notch filter in FIGS. 29A and 29D may appear between the two biquad sections, rather than either before them (as in FIG. 29D) or after them (as in FIG. 29A).

Tables 5-7 provides the values of filter circuitry coefficients for various exemplary embodiments of the invention, as shown in FIGS. 29D-29F. The "Block" column refers to the position of a block within FIG. 29. For example, "Biquad 1" refers to the first biquad section in FIGS. 29D-29F. Table 5 below lists the various coefficient values for the filter circuitry arrangement of FIG. 29D:

TABLE 5

| Block | Coefficient | Value |
| --- | --- | --- |
| Notch | $b_{01}$ | 1/2 |
|  | $b_{11}$ | −93795/131072 |
|  | $b_{21}$ | 1/2 |
|  | $a_{11}$ | −(1550/1024) * (15/16) |
|  | 1 − k | 15/16 |
| Biquad 1 | $b_0$ | 1/16 |
|  | $b_1$ | 1204/65536 |
|  | $b_2$ | 4092/65536 |
|  | $a_1$ | −4880/4096 |
|  | $a_2$ | 1483/4096 |
| Biquad 2 | $b_0$ | 1/4 |
|  | $b_1$ | −53920/65536 |
|  | $b_2$ | 45248/65536 |
|  | $a_1$ | −5704/4096 |
|  | $a_2$ | 2552/4096 |

Table 6 lists the various coefficient values for the filter circuitry arrangement of FIG. 29E:

TABLE 6

| Block | Coefficient | Value |
| --- | --- | --- |
| Notch | $b_{01}$ | 1/2 |
|  | $b_{11}$ | −93795/131072 |
|  | $b_{21}$ | 1/2 |
|  | $a_{11}$ | −(1563/1024) * (15/16) |
|  | 1 − k | 15/16 |
| Biquad 1 | $b_0$ | 1/32 |
|  | $b_1$ | 3210/65536 |
|  | $b_2$ | 1995/65536 |
|  | $a_1$ | −2786/2048 |
|  | $a_2$ | 1095/2048 |
| Biquad 2 | $b_0$ | 1/2 |
|  | $b_1$ | −86208/65536 |
|  | $b_2$ | 59744/65536 |
|  | $a_1$ | −2752/2048 |
|  | $a_2$ | 1403/2048 |
| Biquad 3 | $b_0$ | 1/8 |
|  | $b_1$ | 3434/65536 |
|  | $b_2$ | 7692/65536 |
|  | $a_1$ | −2956/2048 |
|  | $a_2$ | 1123/2048 |

Finally, Table 7 lists the coefficient values for the filter circuitry arrangement shown in FIG. 29F:

TABLE 7

| Block | Coefficient | Value |
|---|---|---|
| Notch | $b_{01}$ | 1/2 |
| | $b_{11}$ | −93795/131072 |
| | $b_{21}$ | 1/2 |
| | $a_{11}$ | −(1526/1024) * (15/16) |
| | 1 − k | 15/16 |
| Biquad 1 | $b_0$ | 1/32 |
| | $b_1$ | 1443/65536 |
| | $b_2$ | 1937/65536 |
| | $a_1$ | −3198/2048 |
| | $a_2$ | 1660/2048 |
| Biquad 2 | $b_0$ | 1/8 |
| | $b_1$ | −4640/65536 |
| | $b_2$ | 7372/65536 |
| | $a_1$ | −2986/2048 |
| | $a_2$ | 1088/2048 |
| Biquad 3 | $b_0$ | 1/2 |
| | $b_1$ | −75072/65536 |
| | $b_2$ | 48064/65536 |
| | $a_1$ | −3144/2048 |
| | $a_2$ | 1246/2048 |
| Biquad 4 | $b_0$ | 1/2 |
| | $b_1$ | −89920/65536 |
| | $b_2$ | 61664/65536 |
| | $a_1$ | −3198/2048 |
| | $a_2$ | 1396/2048 |
| Biquad 5 | $b_0$ | 1/4 |
| | $b_1$ | −6640/65536 |
| | $b_2$ | 14848/65536 |
| | $a_1$ | −2950/2048 |
| | $a_2$ | 1683/2048 |

Figure 30A:
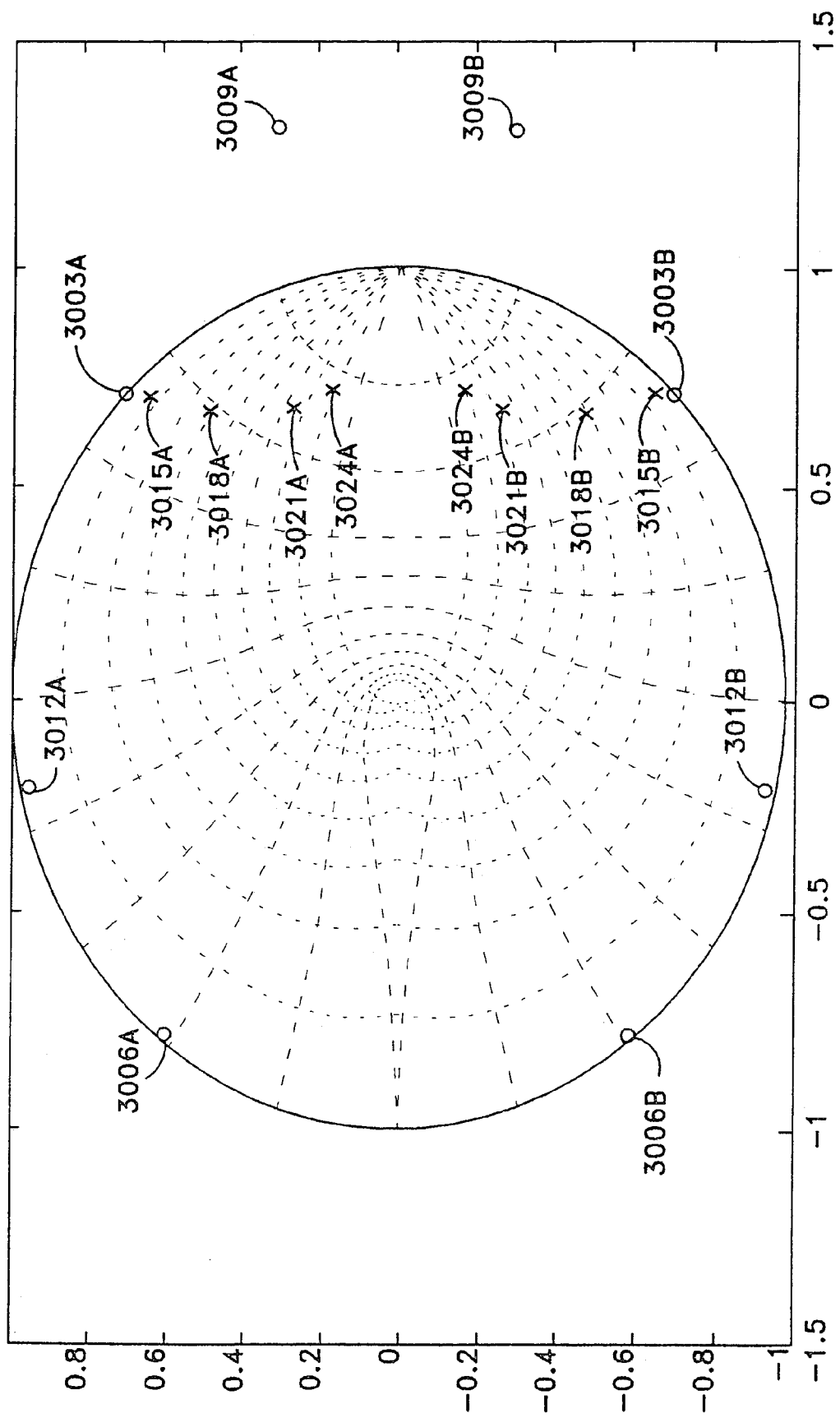
FIG. 30A shows a pole-zero diagram on a unit circle for the IIR filter circuitry illustrated in FIG. 29E.

FIG. 30 illustrates various characteristics of an 8th-order filter circuitry arrangement, such as the filter circuitry shown in FIG. 29E. The filter circuitry includes three biquad sections and one notch section, thus providing an 8th-order overall transfer function. FIG. 30A depicts a pole-zero map in the z-plane. The pole-zero map includes eight zeros, grouped as zero pairs 3003A-3003B, 3006A-3006B, 3009A-3009B, and 3012A-3012B. The pole-zero map also shows eight poles, grouped as pole pairs 3015A-3015B, 3018A-3018B, 3021A-3021B, 3024A-3024B. The paired zeros and poles indicate that the filter circuitry has a real transfer function.

Figure 30B:
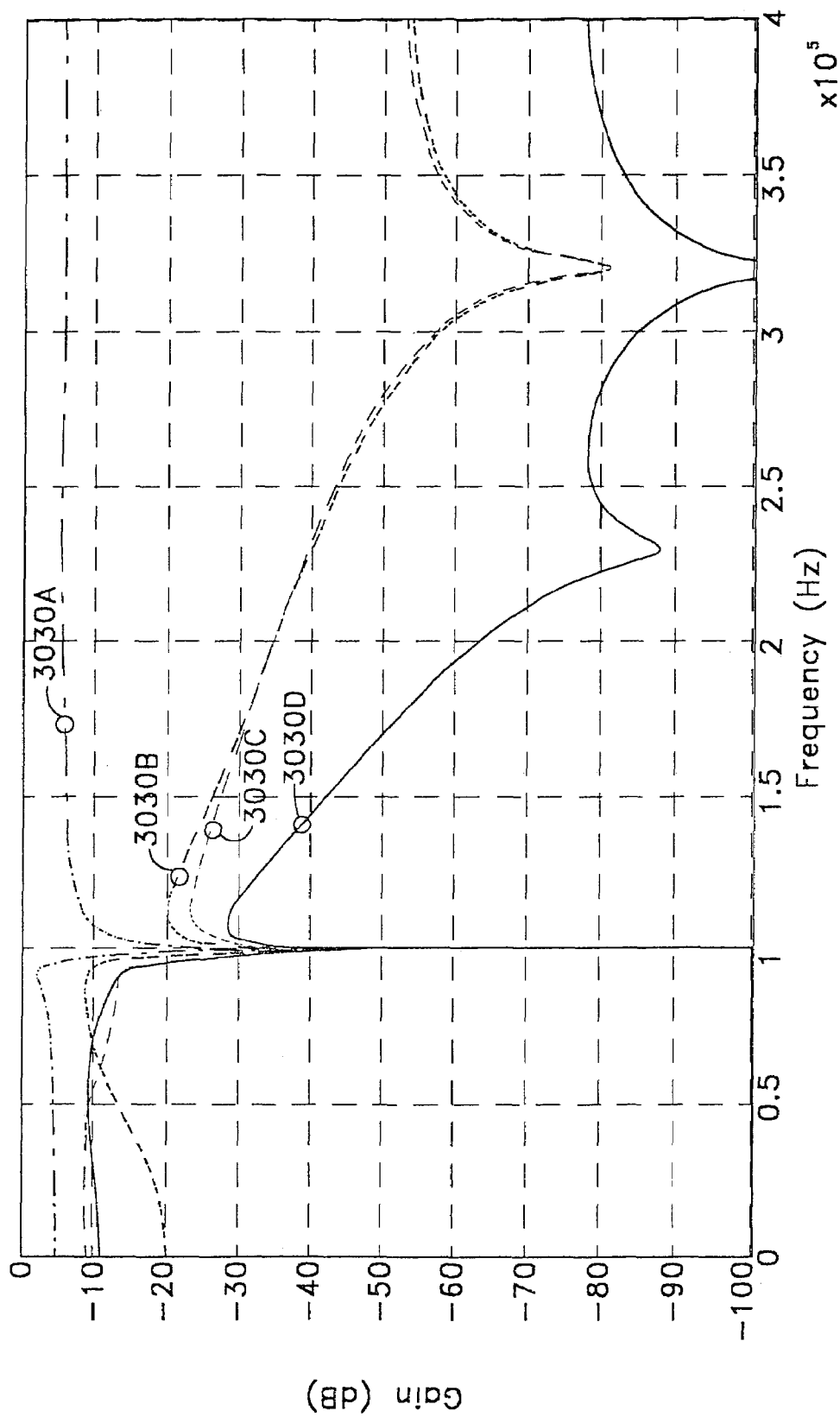
FIG. 30B depicts plots of magnitude response curves for the IIR filter circuitry illustrated in FIG. 29E.

FIG. 30B illustrates a single-sided magnitude response (i.e., symmetrical around zero frequency, or DC) of the 8th-order filter circuitry. FIG. 30B includes four plots, each corresponding to the cumulative input-output magnitude response of the blocks in FIG. 29E. In other words, plots 3030A, 3030B, 3030C, and 3030D provide the magnitude responses between the input to the notch section and the outputs of the notch section, the first biquad section, the second biquad section, and the third biquad section, respectively, of the embodiment shown in FIG. 29E. Hence, plot 3030D corresponds to the transfer function from the input of the notch section to the output of the last biquad section. As plot 3030D shows, the filter circuitry provides a low-pass transfer function. Furthermore, the notch section provides a notch at 100 kHz.

Note that the circuit arrangements in FIG. 29 contemplate a real filter circuitry for the in-phase signal-path and a real filter circuitry for the quadrature signal-path. Consequently, the overall filter circuitry constitutes a real filter that has symmetrical characteristics (around DC or zero frequency) in the frequency domain.

Figure 30C:
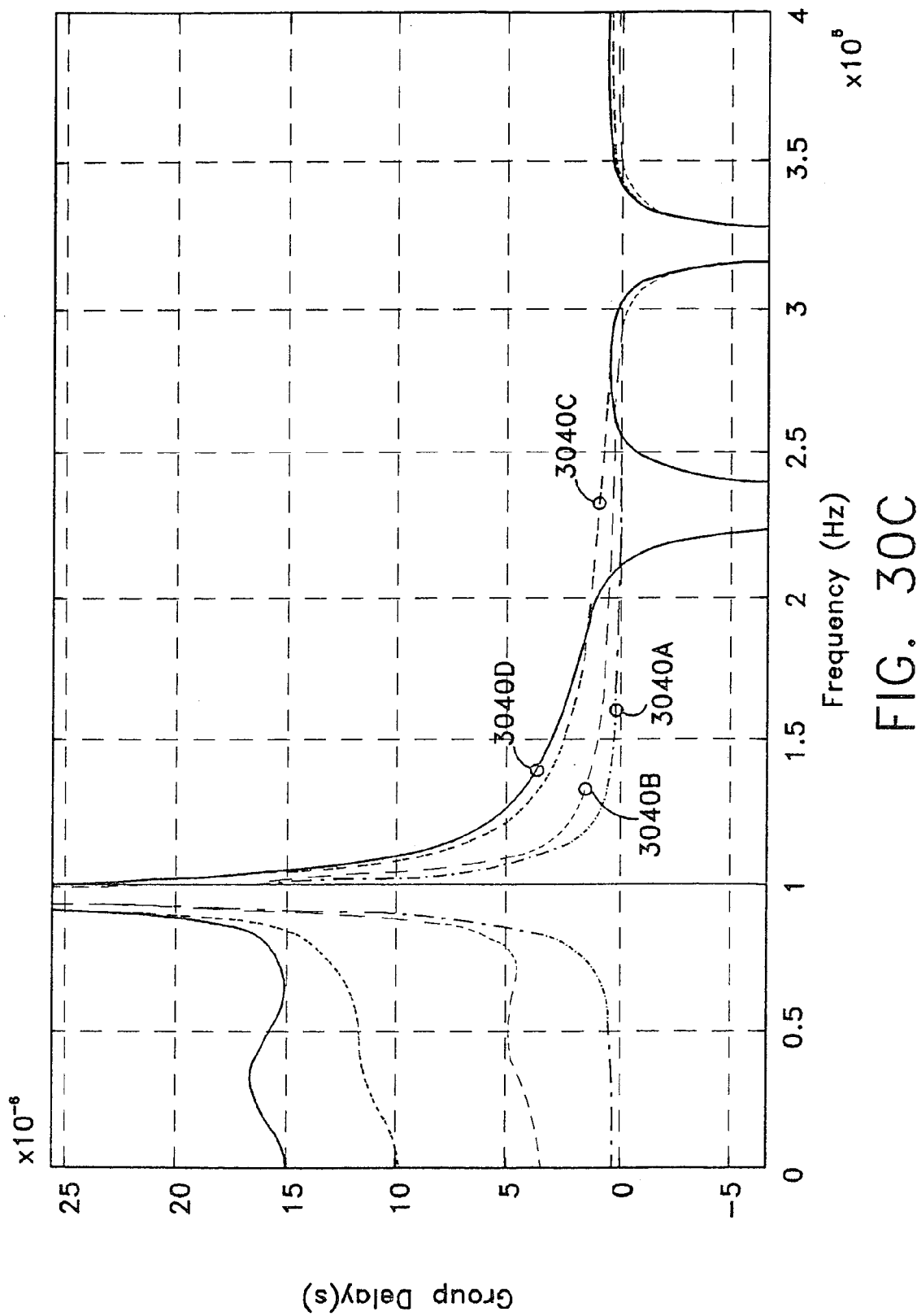
FIG. 30C illustrates plots of group delay response curves for the IIR filter circuitry illustrated in FIG. 29E.

FIG. 30C shows the group delay response of the 8th-order filter circuitry. FIG. 30C includes four plots, each corresponding to the cumulative group delay of the blocks in FIG. 29E. Thus, plots 3040A, 3040B, 3040C, and 3040D provide the group delay responses between the input to the notch section and the outputs of the notch section, the first biquad section, the second biquad 1 section, and the third biquad section, respectively, of the embodiment shown in FIG. 29E. Accordingly, plot 3040D corresponds to the group delay from the input of the notch section to the output of the last biquad section.

One may use different bit precisions for the digital signals in various embodiments of the invention, as desired. In one exemplary embodiment of the invention, the IF LO in-phase signal 1718 and the IF LO quadrature signal 1721 each contain 18 bits, and the output signals of the multiplier circuitries 1903, 1906, 1909, and 1912 each include 18 bits. The output signals 1730A-1730B of the digital down-converter circuitry 427 each have 19 bits of resolution. The secondary filter circuitry 1710A-1710B (IIR-type filters) use 26-bit state variables and have 26-bit output signals 1740A-1740B, and the PGA circuitries 836A-836B have 10-bit output signals 869, 872. Furthermore, the CIC circuitries 1705A-1705B use 6th-order integrator and differentiator chain sections, as shown in FIG. 25. The integrator chain section uses different bit precisions for each of the integrator circuitries within the chain. Table 8 below describes the bit precisions for the loop signal and the output signal of each of the six integrator circuitries:

TABLE 8

| Integrator No. | Loop Signal | Output Signal |
|---|---|---|
| 1 | 43 bits | 39 bits |
| 2 | 39 bits | 35 bits |
| 3 | 35 bits | 31 bits |
| 4 | 31 bits | 27 bits |
| 5 | 27 bits | 23 bits |
| 6 | 23 bits | 18 bits |

The differentiator circuitries in the differentiator chain section use 18-bit signals and has 18-bit output signals (i.e., the CIC circuitries 1705A-1705B have 18-bit output signals 1735A-1735B).

Note, however, that, rather than using the above bit precisions, one may use other number of bits to provide signals with various resolutions, as desired, by making modifications that persons of ordinary skill in the art would understand. Furthermore, generally, the signals in exemplary embodiments of the invention use two's complement signed number notation. One, however, may use other number representation formats, as desired, by making modifications that artisans who read the description of the invention will understand.

The notch filter circuitry within the digital filter circuitry 437 operates to remove residual DC offsets from the signal of interest. As noted above, the removal of the residual DC offsets according to the invention operates in the presence of interference signals (e.g., interferers and blockers) and the desired signal. Because of circuit non-idealities and non-ideal circuit behavior, DC offsets appear within, and at the outputs of, the receiver analog circuitry. The receiver analog circuitry includes DC offset reduction or cancellation circuitry, as described in co-pending, commonly owned patent application Ser. No. 10/074,676, Attorney Docket No. SILA:098, titled "DC Offset Reduction in Radio-Frequency Apparatus and Associated Methods." Some residual DC offsets, however, may appear at the outputs of the receiver analog circuitry and therefore enter the receiver digital circuitry. The signal processing in the receiver digital circuitry, for example, as shown in FIG. 17, translates or shifts the DC offsets to a frequency of −100 kHz. The notch filter provides a notch at −100 kHz, thus removing any residual DC offsets, as described below in detail.

Because RF apparatus according to the invention use a relatively low IF frequency (100 kHz in exemplary embodiments), the low-pass filtering by the low-pass sections of the digital filter circuitry (i.e., the circuitry besides the notch filter circuitry) by themselves would not easily remove the DC offsets. A low-pass filter circuitry for removing the residual DC offset would typically have a high order, require more signal processing (thus, more hardware or longer processing time, and/or higher power consumption), and have long transient-response characteristics. A long transient-response characteristic would lead to the receiver digital circuitry having to power up long before the beginning of the reception of a burst of data.

The notch filter circuitry in exemplary embodiments constitutes a 2nd-order filter that provides a relatively narrow and relatively deep notch at −100 kHz. The notch filter circuitry removes the −100 kHz signal, thus canceling or reducing the effects of any residual DC offsets that enter the receiver digital circuitry. Moreover, the notch filter circuitry can adjust the location of its poles, which tends to reduce its settling time. The reduced settling time allows the receiver digital circuitry to power up at a later time during the reception phase. Delaying the powering up of the receiver digital circuitry helps to save power in portable or battery-operated applications. The reduced settling time also provides more time for the transmit and receive operations and, thus, higher data transfer rates (for example, when using GPRS techniques).

Figure 31:
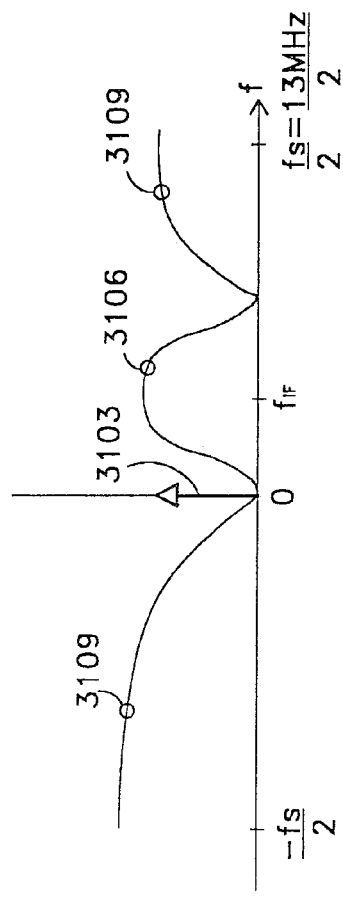
FIG. 31 shows a typical spectrum of the signal at the input of the receiver digital circuitry in exemplary embodiments of the invention.

The notch filter circuitry removes a tone at −100 kHz, which results from the operation of the digital down-converter circuitry 427. FIGS. 31-35 show the waveforms corresponding to the frequency spectrum of signals at various points in the receiver digital circuitry in exemplary embodiments of the invention, for example, as shown in FIG. 17. FIG. 31 illustrates a spectrum of input signals (i.e., in-phase and quadrature signals) of the receiver digital circuitry. The residual DC offset 3103 appears at DC, or zero frequency. The signal band of interest 3106, centered at the IF frequency, appears to the right of the residual DC offset 3103. Noise and interference spectra 3109 fall below DC and to the right of the signal band of interest 3106. The sampling frequency, $f_s$, is 13 MHz, with a Nyquist rate of 13/2 MHz, or 6.5 MHz.

Figure 32:
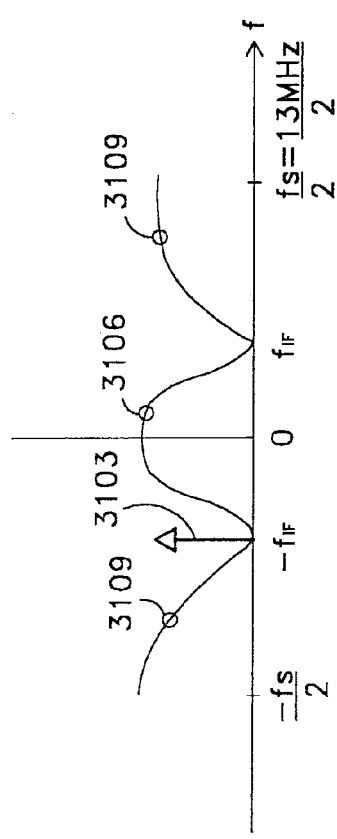
FIG. 32 depicts a typical spectrum of the signal at an output of a digital down-converter circuitry in exemplary embodiments of the invention.

FIG. 32 depicts the spectrum of the output signals of the digital down-converter circuitry 427. Because of the mixing with the IF LO signals 1718 and 1721 in the digital down-converter circuitry 427, the tone corresponding to the residual DC offset 3103 shifts to −100 kHz. Also because of the mixing within the digital down-converter circuitry 427, the signal band of interest 3106 falls within the band from −$f_{IF}$ to $f_{IF}$, and centers around DC. The noise and interference spectra 3019 occupy the region below −$f_{IF}$ and above $f_{IF}$.

Figure 33:
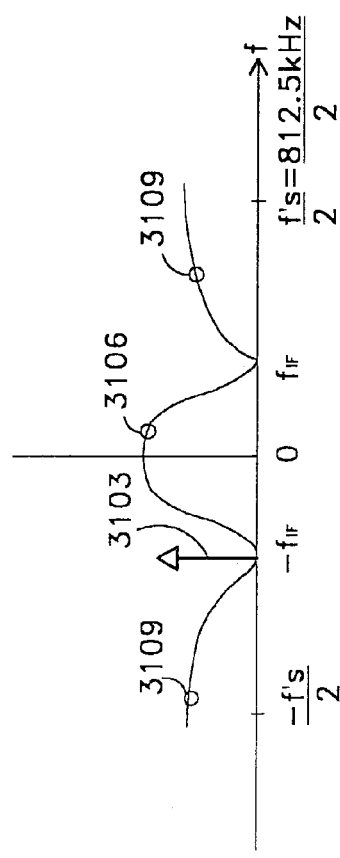
FIG. 33 illustrates a typical spectrum of the signal at an output of a decimator circuitry in exemplary embodiments of the invention.

FIG. 33 shows the frequency spectrum of the output signal of the CIC circuitry, such as CIC circuitries 1705A-1705B in FIG. 17. Note that the decimator circuitry, such as decimator circuitry 2509 in FIG. 25, reduces the sampling frequency from $f_s$ to $f_s'$ (from 13 MHz to 812.5 kHz in exemplary embodiments). Accordingly, the Nyquist rate reduces from $f_s/2$ to $f_s'/2$. The residual DC offset 3103 still results in a −100 kHz tone, and the signal band of interest 3106 occupies the region between −$f_{IF}$ to $f_{IF}$, centered around DC. The CIC filter circuitry reduces the amplitude of the noise and interference spectra 3109, which occupy the region below −$f_{IF}$ and above $f_{IF}$.

Figure 34:
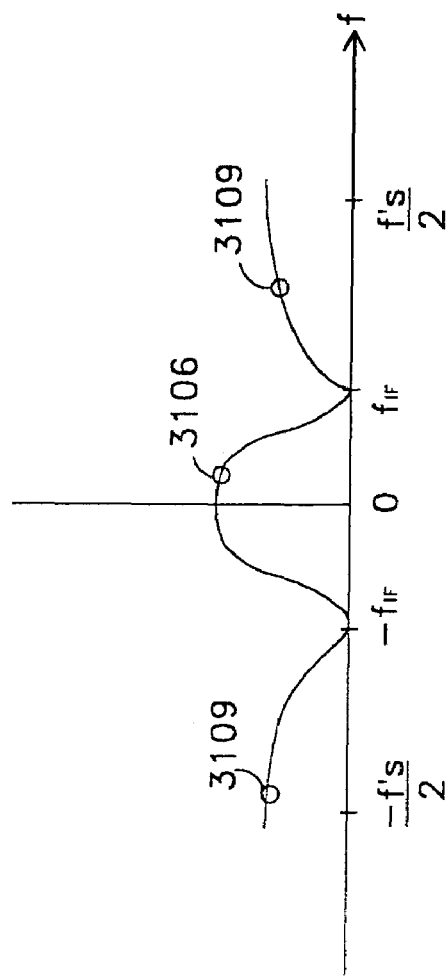
FIG. 34 shows a typical spectrum of the signal at an output of a notch-filter circuitry in exemplary embodiments of the invention.
Figure 35:
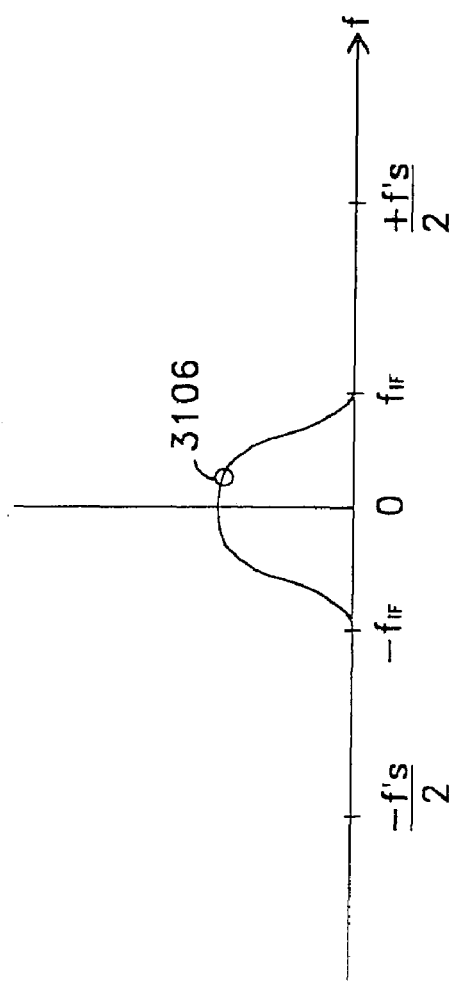
FIG. 35 depicts a typical spectrum of the signal at an output of the IIR filter circuitry in exemplary embodiments of the invention.

FIG. 34 shows the spectrum of the signals at the output of the notch filter circuitry. The notch filter circuitry has removed the residual DC offset, thus leaving the signal band of interest 3106 in the region between −$f_{IF}$ and $f_{IF}$. Note that the noise and interference spectra 3109, which occupy the region below −$f_{IF}$ and above $f_{IF}$, remain. FIG. 35 shows the spectrum of the signals at the output of the final biquad section of the IIR filter circuitry, for example, one of the final biquad sections in FIGS. 29D-F. Note that compared to FIG. 33, the biquad sections of the IIR filter circuitry have attenuated the noise and interference spectra 3109. The signal band of interest 3106, which occupies the range between −$f_{IF}$ and $f_{IF}$, remains.

The plots presented in FIGS. 31-35 correspond to a receiver digital circuitry (e.g., the architecture shown in FIG. 17) that first down-converts the input signal to the receiver digital circuitry and then uses a notch filter circuitry to remove the tone corresponding to the residual DC offset. One, however, may reverse the order of those operations by using a notch filter circuitry to remove the residual offset at DC before the mixing operation of the digital down-converter circuitry 427. One may use such a signal-flow architecture with a receiver digital circuitry as shown in FIG. 18, as desired.

The notch filter circuitry in exemplary embodiments constitutes a real filter, and therefore has notches at both −100 kHz and +100 kHz, but the residual DC offset translates to a tone at −100 kHz. One may use a complex filter (e.g., a filter that has a notch at −100 kHz), as desired. The choice of the type of filter depends on design and performance considerations, as persons of ordinary skill in the art would understand. In general, however, real filters tend to be easier and simpler to implement than complex filters.

Figure 36A:
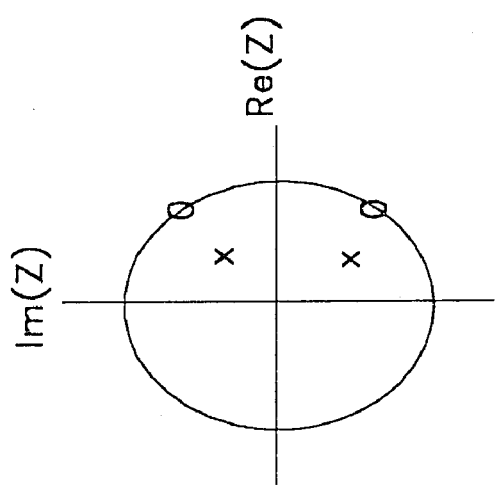
FIG. 36A illustrates a pole-zero diagram of a double-sided notch-filter circuitry for use in exemplary embodiments of the invention.
Figure 36B:
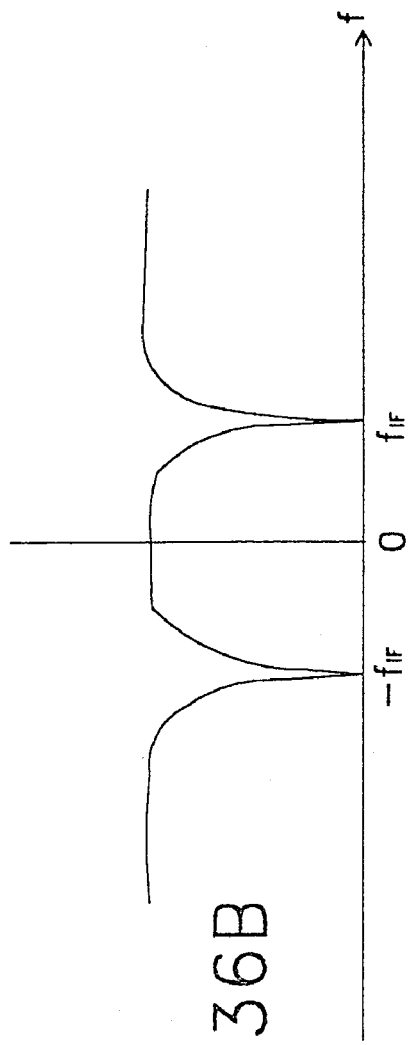
FIG. 36B shows a frequency-domain response spectrum for the double-sided notch-filter circuitry for use in exemplary embodiments of the invention.

FIGS. 36 and 37 show, respectively, the characteristics of a real notch filter circuitry and a complex notch filter circuitry for use in RF apparatus according to the invention. FIG. 36A illustrates a typical pole-zero diagram for a 2nd-order real notch filter circuitry. The pole-zero diagram includes two zeros and two poles. The zeros reside on the unit circle. The poles fall inside the unit circle to ensure stability of the filter. The relative closeness of the poles to the unit circle tends to affect the settling time of the notch filter circuitry. FIG. 36B provides a frequency response diagram for the notch filter circuitry of FIG. 36A. The notch filter circuitry has two notches, one at −$f_{IF}$, and another at $f_{IF}$. The notch filter circuitry substantially transmits signals in the frequency band between −$f_{IF}$ and $f_{IF}$ as well as frequencies outside that range, while substantially attenuating tones at the notch frequency.

FIG. 37A depicts a typical pole-zero diagram for a complex notch filter circuitry. The pole-zero diagram includes a single zero 3705 and a single pole 3710, rather than the complex-conjugate poles of the real notch filter circuitry of FIG. 36. The zero 3705 resides on the unit circle. The pole 3710 resides inside the unit circle. The location of the pole 3710 within the unit circle tends to affect the settling time of the notch filter circuitry. The zero 3705 has a location given by:

$$z_{zero} = e^{-j2\pi \frac{f_W}{f_s}}.$$

The pole 3710 has a location given by:

$$z_{pole} \approx \alpha e^{-j2\pi \frac{f_W}{f_s}},$$

where α is a function of k. The angle θ, which denotes the angle between the locations of zero 3705 and pole 3710 and the real axis, has the value:

$$\theta = -2\pi \frac{f_W}{f_s}.$$

Note hat the zero 3705 resides on the unit circle. Furthermore, note that the location of the pole 3710 depends on the value of k (1−k constitutes one of the coefficients of the notch filter circuitry, as FIGS. 27 and 28 show). The location of the pole 3710 controls the width of the notch.

FIG. 37B provides a frequency response diagram for the notch filter circuitry of FIG. 37A. The notch filter circuitry has a single notch at $-f_{IF}$. The notch filter circuitry substantially transmits signals in the frequency bands below and above $-f_{IF}$.

Figure 38:
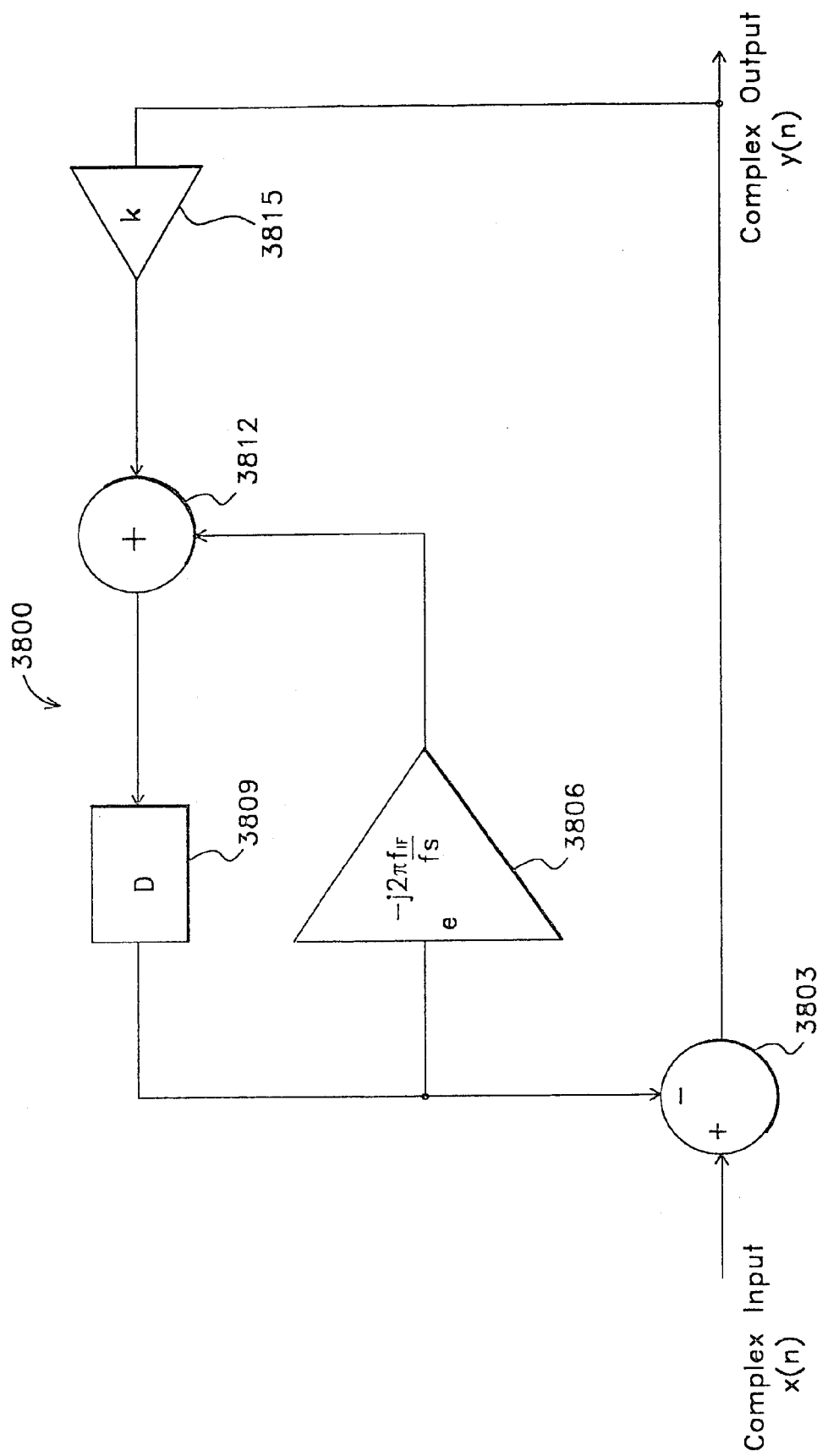
FIG. 38 shows a conceptual or functional block diagram of an alternative notch-filter circuitry for use in exemplary embodiments of the invention.

One may use a number of different topologies and architectures for the notch filter circuitry. FIG. 38 shows one example of an alternative notch filter circuitry 3800. The notch filter circuitry 3800 constitutes a complex notch filter realized by means of a complex band-pass filter circuitry arranged within a feedback loop. All signals within the notch filter circuitry 3800 are complex signals. The notch filter circuitry 3800 includes combiner circuitry 3803, gain circuitry 3806, delay circuitry 3809, combiner circuitry 3812, and gain circuitry 3815.

Gain circuitry 3815, having a gain value of k, scales the output signal of the notch filter circuitry to provide a scaled output signal. The scaled output signal constitutes one operand for combiner circuitry 3812. Combiner circuitry 3812 provides an output signal to delay circuitry 3809. The output of delay circuitry 3809 feeds an input of gain circuitry 3806. An output of gain circuitry 3806 constitutes another operand for combiner circuitry 3812. Gain circuitry 3806 provides a gain of $$e^{-j2\pi \frac{f_W}{f_s}}.$$

The output of delay circuitry 3809 also serves as one operand for combiner circuitry 3803. The input signal of the notch filter circuitry provides a second operand for combiner circuitry 3803. Combiner circuitry 3803 subtracts the output of delay circuitry 3809 from the input signal and provides the result as the output signal of the notch filter circuitry.

As noted above, one may adjust or modify the characteristics of the notch filter circuitry by, among other things, adjusting the location of its poles. More particularly, adjusting the location of the poles of the notch filter circuitry affects the width of the notch and the settling time of the notch filter circuitry. Ideally, one would use a notch filter circuitry that has both a relatively narrow notch and a relatively fast settling time. The width of the notch and the settling speed of the notch filter circuitry, however, have an inverse relationship. Put another way, placing the poles so as to decrease the width of the notch increases the settling time of the notch filter circuitry, and vice-versa.

Notch filter circuitry in exemplary embodiments of the invention include provisions for adjusting the width of the notch (also called "gear-shifting") and, hence, the settling time of the notch filter circuitry. Although exemplary embodiments of the invention use adjustable notch filter circuitries, depending on performance and design considerations, one may use notch filter circuitries with fixed pole locations, as desired. The adjustment feature of the notch filter circuitry, however, provides a notch with a programmable or adjustable width and settling speed. The adjustment feature also helps the notch filter circuitry to perform its function of canceling or reducing the residual DC offset in the presence of the desired signal, interference, blockers, sweeping interference (for example, resulting from settling operation of the local oscillator circuitry), sweeping blockers, and quantization noise, while maintaining a relatively fast acquisition. By adjusting the width of the notch, notch filter circuitries in exemplary embodiments of the invention provide a trade-off between noise immunity and acquisition speed and accuracy.

In exemplary embodiments, the notch filter circuitry has an adjustment cycle during which the location of the poles of the filter circuitry vary. In the beginning of the adjustment cycle, the poles reside relatively close to the origin of the z-plane, thus providing a relatively wide notch, but a relatively fast settling time. Subsequently in the adjustment cycle, the poles of the notch filter circuitry move progressively away from the origin of the z-plane. The movement of the poles progressively decreases the width of the notch to a relatively narrow notch and less distortion to the in-band signal. At the end of the adjustment cycle, the notch stays relatively narrow.

In exemplary embodiment, the adjustment cycle of the notch filter circuitry ends before the reception of a data burst by the receiver digital circuitry begins. Note, however, that more generally the adjustment cycle of the notch filter circuitry may not end before the reception of a data burst begins. The adjustment of the width of the notch occurs by modifying the values of k (1−k constitutes one of the coefficients of the notch filter circuitry). In exemplary embodiments, the time instances when the value of k changes are programmable (e.g., through instructions from the baseband processor circuitry). A relatively large initial value of k provides faster acquisition of the DC offset, albeit with more susceptibility to noise, interference, blockers, and quantization noise. Relatively smaller subsequent values of k provide more noise-resistant, more accurate acquisitions of the DC offset.

Figure 39:
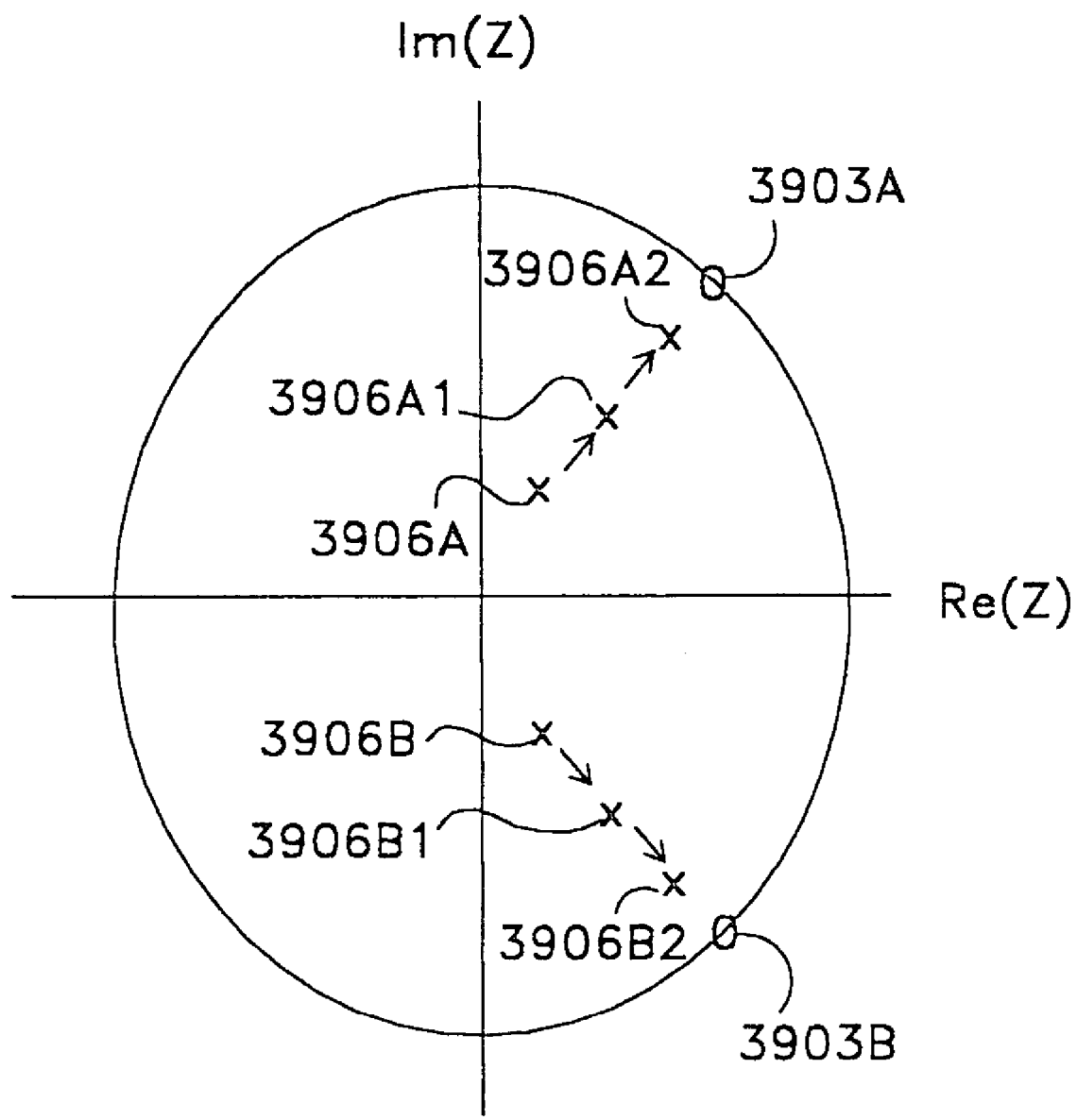
FIG. 39 illustrates a typical pole-zero diagram that demonstrates adjustment or gear-shifting of a notch-filter circuitry in exemplary embodiments of the invention.

FIG. 39 illustrates the adjustment of the poles of the notch filter circuitry, such as the embodiment shown in FIG. 27, as a function of k. FIG. 39 represents a pole-zero diagram on a z-plane for an adjustable notch filer circuitry in exemplary embodiments of the invention. The notch filter circuitry has two zeros 3903A and 3903B, as well as a pole pair 3906A and 3906B. During the adjustment process, the value of k decreases as a function of time, thus causing the location of the poles 3906A-3906B to change.

Initially, the pole pair 3906A-3906B resides relatively close to the origin of the unit circle. The initial location of the pole pair 3906A-3906B corresponds to k=¼. As the value of k decreases, pole pair 3906A-3906B moves toward the periphery of the unit circle. In other words, the pole pair 3906A-3906B moves to locations denoted by 3906A1 and 3906B1 as k decreases from ¼ to ⅛. A further decrease in the value of k from ⅛ to ¹⁄₁₆ causes the pole pair 3906A-3906B to migrate to locations 3906A2 and 3906B2.

As noted above, in exemplary embodiments, the times at which the value of k changes are also adjustable. The time instances, however, have default values in those embodiments of the invention. Table 9 below provides the default times and the corresponding values of k:

TABLE 9

| Time (μs) | k |
|---|---|
| 0 | 1/4 |
| 60 | 1/8 |
| 80 | 1/16 |
| >80 | 1/16 |

For time values of time larger than about 80 μs until the end of the operation cycle of the notch filter circuitry, the value of k remains at 1/16.

Figure 40:
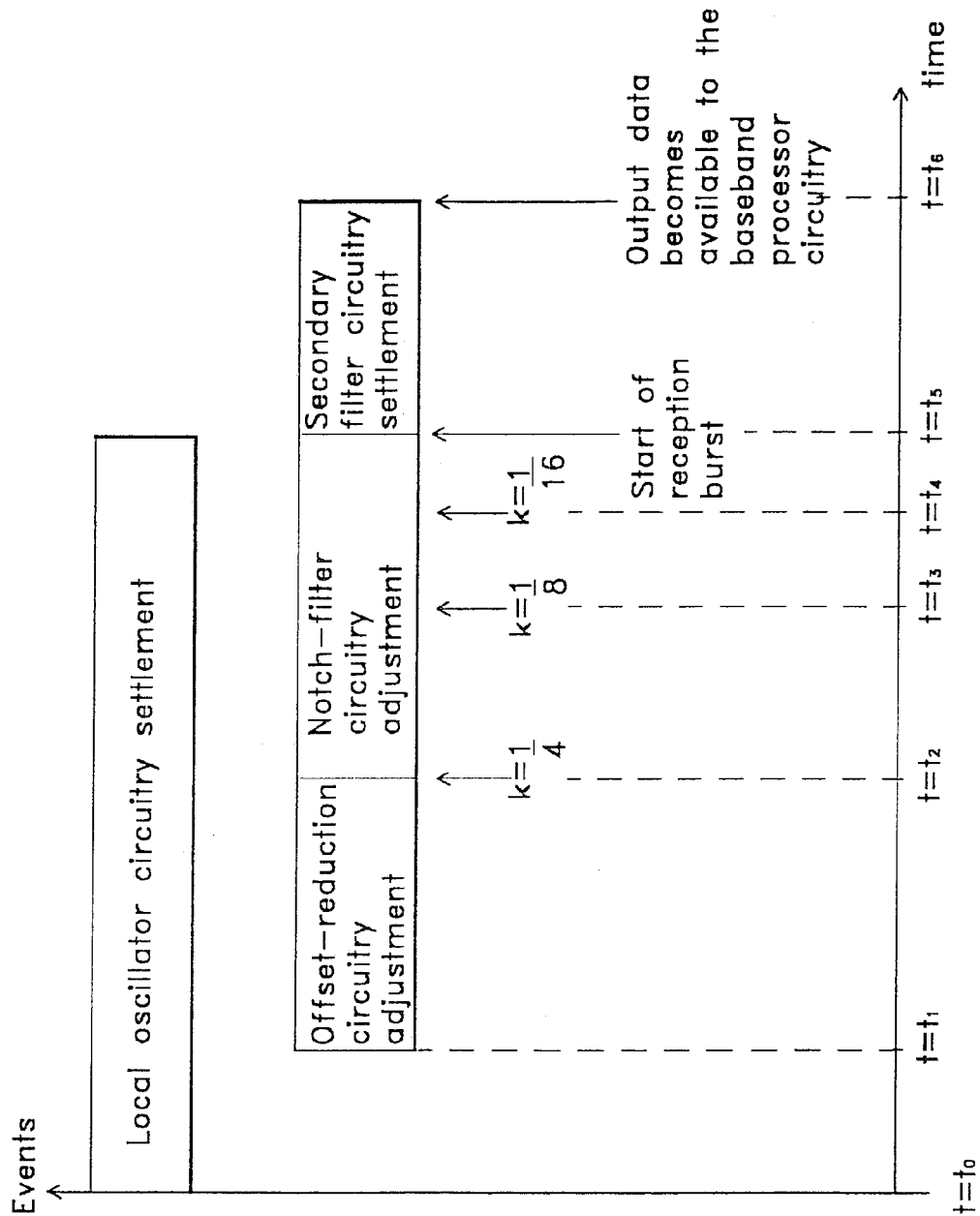
FIG. 40 shows a timeline for the operation of various blocks, including the notch filter circuitry, in exemplary embodiments of the invention.

FIG. 40 depicts a timeline for the adjustment of the notch filter circuitry with respect to several other events within RF apparatus according to the invention. In preparation for the commencement of a data reception burst, the local oscillator circuitry powers up and begins to settle. In FIG. 40, the local oscillator circuitry powers up at t=$t_0$. At t=$t_1$, DC offset cancellation or reduction begins in the receiver analog circuitry. DC offset cancellation or reduction in the receiver analog circuitry uses an adjustment technique similar to the adjustment of the notch filter circuitry, as described in detail in patent application Ser. No. 10/074,676, Attorney Docket No. SILA:098, titled "DC Offset Reduction in Radio-Frequency Apparatus and Associated Methods," referenced above.

Subsequently, at t=$t_2$, adjustment of the notch filter circuitry starts with an initial value of k=1/4. As part of the adjustment process, the value of k changes to 1/8 and 1/16 at t=$t_3$ and t=$t_4$, respectively. At t=$t_5$, the local oscillator circuitry has settled and the data reception burst starts. Also at t=$t_5$, the secondary filter circuitry begins to settle. Finally, at t=$t_6$, output data becomes available to the DAC circuitries and, subsequently, to the baseband processor circuitry. Note that, rather than providing final output data, one may output intermediate data (i.e., data available before the secondary filter circuitry settles) to the DAC circuitries and the baseband processor circuitry, as desired.

The description of the invention refers to providing a notch at minus the intermediate frequency, or −100 kHz in exemplary embodiments of the invention. Note that that discussion applies to a receiver digital circuitry that has an architecture similar to the architectures in FIGS. 17A-17B. If one uses an architecture that performs the digital filtering operations (including the notch filtering operation) before the digital down-conversion operation, however, the notch filter circuitry should provide a notch at a correspondingly different frequency. For example, if one chooses to use the alternative architectures shown in FIGS. 18A-18B, the notch filter circuitry should provide a notch at zero frequency, or DC. Because in the alternative architectures in FIG. 18A-18B the notch filter circuitry operates on signals that the digital down-converter circuitry 427 has not yet shifted, the notch filter provides the notch at zero frequency.

Referring to FIGS. 17-29 and 38, the various blocks shown in those figures depict mainly the conceptual functions and signal flow. The actual circuit implementation may or may not contain separately identifiable hardware for the various functional blocks. For example, one may combine the functionality of various blocks into one circuit block, as desired. Furthermore, one may realize the functionality of a single block in several circuit blocks, as desired. The choice of circuit implementation depends on various factors, such as particular design and specifications for a given implementation, as persons of ordinary skill in the art who read the disclosure of the invention will understand.

Note that one may use the inventive digital architecture and DC offset reduction apparatus and methods in a variety of RF apparatus, such as those described above with respect to partitioning and digital interface concepts, by making modification within the knowledge of persons of ordinary skill in the art who read the description of the invention. Further modifications and alternative embodiments of the invention will be apparent to persons skilled in the art who read this description of the invention. Accordingly, this description teaches those skilled in the art the manner of carrying out the invention and are to be construed as illustrative only.

The forms of the invention shown and described should be taken as the presently preferred embodiments. Persons skilled in the art may make various changes in the shape, size and arrangement of parts without departing from the scope of the invention described in this document. For example, persons skilled in the art may substitute equivalent elements for the elements illustrated and described here. Moreover, persons skilled in the art who have the benefit of this description of the invention may use certain features of the invention independently of the use of other features, without departing from the scope of the invention.

We claim:

1. A radio-frequency (RF) apparatus, comprising:
a first circuit partition, comprising:
an amplifier that receives an RF signal, and provides an amplified RF signal;
a down-converter that mixes the amplified RF signal to generate a down-converted signal; and
an analog-to-digital converter that converts the down-converter signal to a digital signal; and
a second circuit partition, comprising:
a digital down-converter that converts the digital signal to generate a baseband signal;
a digital channelization filter that filters the baseband signal to generate a filtered baseband signal; and
a digital programmable-gain amplifier that amplifies the filtered baseband signal, using a prescribed gain.

2. The radio-frequency (RF) apparatus according to claim 1, wherein the analog-to digital converter provides the digital signal as a one-bit digital signal.

3. The radio-frequency (RF) apparatus according to claim 1, wherein the first and second circuit partitions are isolated from each other.

4. The radio-frequency (RF) apparatus according to claim 1, wherein each of the first and second circuit partitions comprises a thin-film module.

5. The radio-frequency (RF) apparatus according to claim 1, wherein each of the first and second circuit partitions comprises a thick-film module.

6. The radio-frequency (RF) apparatus according to claim 1, wherein each of the first and second circuit partitions comprises a module.

7. The radio-frequency (RF) apparatus according to claim 1, wherein the first and second circuit partitions are part of a low-intermediate-frequency (low-IF) receiver.

8. A digital receive-path circuit in a radio-frequency (RF) apparatus, the digital receive-path circuit comprising:
an interface circuit that receives a complex one-bit digital signal;
a digital down-converter that mixes the complex one-bit digital signal with a complex digital intermediate frequency (IF) local oscillator signal to generate a complex digital down-converted signal;
a cascaded integrator/comb (CIC) filter that filters the complex digital down-converted signal to generate a first filtered complex digital signal;

an infinite-impulse-response (IIR) filter that filters the first filtered complex digital signal to generate a second filtered complex digital signal; and a notch filter that removes a residual direct-current (DC) offset from the second filtered complex digital signal.

9. The digital receive-path circuit according to claim 8, wherein the interface circuit further comprises an interface controller.

10. The digital receive-path circuit according to claim 8, wherein the digital down-converter comprises a plurality of multipliers.

11. The digital receive-path circuit according to claim 8, further comprising a digital IF local oscillator circuit that supplies the complex digital IF local oscillator signal.

12. The digital receive-path circuit according to claim 8, wherein the CIC filter comprises a decimator circuit, and a plurality of delay circuits.

13. The digital receive-path circuit according to claim 8, wherein the IIR filter comprises a plurality of biquad circuits.

14. The digital receive-path circuit according to claim 8, wherein the notch filter comprises a plurality of delay circuits, and a plurality of combiner circuits.

15. The digital receive-path circuit according to claim 8, wherein the notch filter comprises a complex band-pass filter circuitry arranged within a feedback loop.

16. A method of processing a radio-frequency (RF) signal, the method comprising:

amplifying the RF signal within a first circuit partition to generate an amplified RF signal;

mixing the amplified RF signal within the first circuit partition to generate a down-converted signal;

converting, within the first circuit partition, the down-converted signal to a digital signal;

supplying the digital signal to a second circuit partition;

converting the digital signal to a baseband signal within a second circuit partition;

digital channelization filtering the baseband signal within the second circuit partition; and digitally amplifying the filtered baseband signal within the second circuit partition, using a programmable gain.

17. The method according to claim 16, wherein the digital signal comprises a one-bit signal.

18. The method according to claim 16, wherein the first and second circuit partitions are isolated from one another.

19. The method according to claim 16, wherein each of the first and second circuit partitions comprises a module.

20. The method according to claim 16, wherein the first and second circuit partitions are part of a low-intermediate-frequency (low-IF) receiver.

* * * * *